TRAINING EQUIPMENT FOR TELEPHONE OPERATORS

Filed Sept. 13, 1963 34 Sheets-Sheet 1

INVENTORS D. F. JOHNSTON R. D. KRONING J. OROST

BY F. A. McCorkendale

ATTORNEY

TRAINING EQUIPMENT FOR TELEPHONE OPERATORS

Filed Sept. 13, 1963

July 19, 1966 D. F. JOHNSTON ET AL 3,261,111

TRAINING EQUIPMENT FOR TELEPHONE OPERATORS

Filed Sept. 13, 1963 34 Sheets-Sheet 3

TRAINING EQUIPMENT FOR TELEPHONE OPERATORS

Filed Sept. 13, 1963 34 Sheets-Sheet 4

TRAINING EQUIPMENT FOR TELEPHONE OPERATORS

Filed Sept. 13, 1963 34 Sheets-Sheet 6

TRAINING EQUIPMENT FOR TELEPHONE OPERATORS

July 19, 1966 D. F. JOHNSTON ET AL 3,261,111

TRAINING EQUIPMENT FOR TELEPHONE OPERATORS

Filed Sept. 13, 1963 34 Sheets-Sheet 13

TRAINING EQUIPMENT FOR TELEPHONE OPERATORS

July 19, 1966 D. F. JOHNSTON ET AL 3,261,111

TRAINING EQUIPMENT FOR TELEPHONE OPERATORS

Filed Sept. 13, 1963 34 Sheets-Sheet 19

TRAINING EQUIPMENT FOR TELEPHONE OPERATORS

Filed Sept. 13, 1963 34 Sheets-Sheet 21

TRAINING EQUIPMENT FOR TELEPHONE OPERATORS

Filed Sept. 13, 1963

TRAINING EQUIPMENT FOR TELEPHONE OPERATORS

Filed Sept. 13, 1963

TRAINING EQUIPMENT FOR TELEPHONE OPERATORS

July 19, 1966 D. F. JOHNSTON ET AL 3,261,111

TRAINING EQUIPMENT FOR TELEPHONE OPERATORS

Filed Sept. 13, 1963 34 Sheets-Sheet 34

United States Patent Office 3,261,111
Patented July 19, 1966

3,261,111
TRAINING EQUIPMENT FOR TELEPHONE OPERATORS

Donald F. Johnston, Red Bank, Robert D. Kroning, Neptune Township, Monmouth County, and Joseph Orost, West End, N.J., assignors to Bell Telephone Laboratories, Incorporated, New York, N.Y., a corporation of New York Filed Sept. 13, 1963, Ser. No. 308,716
23 Claims. (Cl. 35—6)

This invention relates to training equipment and more particularly to automatic training equipment for use in training operators of telephone switchboards.

Innovations and improvements in telephone facilities in recent years have resulted in a marked increase in the number of telephone calls which are customer dialed as contrasted with those which are operator completed. While there has obviously been a resulting decrease in the use of conventional operator attended cord switchboards, it has at the same time become necessary to provide in vastly increased numbers key-operated switchboard positions of the so-called assistance type. Attendants, or operators, at these positions assist in many different ways in the completion of various kinds of customer dialed calls which do not go through on a fully automatic basis such, for example, as person-to-person, collect, credit card, and coin distance dialing. The duties of the attendants at these assistance positions, or traffic service positions as they are also commonly designated are varied and are far more complex than those of the operators attending the conventional cord switchboard. For example, the tasks of the assistance operators may include setting up the proper charge indications, controlling the start of AMA timing, supervising the deposit of coins and the collection or return of the deposited coins. The problems presented to the attendants, or to state it differently, the questions asked, are usually by distinctive lamp indications, while her responses or answers may be by key operations, voice responses, or both. Even the most experienced and skillful cord switchboard operators are not usually qualified to act efficiently as assistance operators without a substantial amount of special training.

Since the need for operators for assistance switchboards is increasing at a rapid rate, the desirability of providing proper training equipment for such personnel is apparent. In view of the varied and complex nature of the tasks performed by the assistance operators, the equipment and methods previously utilized for training operators for the conventional cord switchboards are entirely inadequate for the training of assistance operators.

Accordingly, it is an object of our invention to improve operators' training equipment.

Another object of our invention is to facilitate teaching persons unfamiliar with cordless telephone switchboards the proper manner of operation of such equipment.

Another object of our invention is to minimize the amount of assistance needed from an instructor in the training procedure.

A further object of the invention is to simulate different types of calls normally handled at the switchboard.

A still further object of the invention is to facilitate varying the program of simulated calls presented to the trainee.

A still further object of the invention is to indicate to the instructor or supervisor the degree of proficiency of the trainee.

Yet another object of the invention is to facilitate routine maintenance procedures in connection with operators' training equipment.

The novel arrangement contemplated by our invention introduces the use of a stored program for the control of simulated training calls. The program, contained on punched paper tape of the type used in the teletypewriter field, controls circuits which, in turn, control visual displays and audible signals at the training position, or console, that is the "problems" or "questions" for the trainee. The circuits also detect and record students' operating errors. Voices of customers and distant operators are simulated as they would occur on actual calls and are recorded on a magnetic tape that is played back to the trainee in conjunction with the signals controlled by the proper tape. The services of an instructor are required only when the trainee experiences unusual difficulty as might occur, for example, early in the training. In such event, manual control of the various steps may be temporarily exercised by the instructor.

This technique represents a major advance in the training field. The advantages from an economic standpoint are obvious. Further, the trainee is more apt to be relaxed than she would be when under direct surveillance of an instructor and can therefore concentrate more fully on her task. The automated "teacher" has unlimited patience, is tireless, immune to distraction, and can have, through careful programming, as thorough a "knowledge" of the subject matter as any expert in the field.

In accordance with a specific embodiment of the invention, the automatic training equipment includes as program elements a tape reader, preferably in the form of a printing telegraph transmitter-distributor, and a magnetic tape reproducer. Also included are the training position, or console, which has substantially the same key and lamp arrangement as an actual working assistance position, and the necessary control circuitry. The control circuitry includes a matching and advance circuit.

The teletypewriter tape, a punched paper tape, is the program source of all code signals to light, flash and extinguish training position lamps and to start signal tones and to stop the same when they are not self-limiting. These signals are termed the WRITE codes and, in general, they present the "problems" or "questions" to the trainee. This tape is also the source of the READ codes which serve to set up or store in the matching and advance circuit the checking conditions for the trainee's response anticipated in the first segment of the call, that is the conditions which require appropriate matching action by the trainee, or in other words, the "correct answers." The READ codes are transmitted first followed by the WRITE codes, the PRIME relays being operated between the two transmission periods in a manner and for a purpose which will be discussed subsequently.

The WRITE codes, first referred to above, also control the starting of the magnetic tape which is preferably of the two channel type, simulated speech of customers and distant operators being recorded on one channel, and control pulses being recorded on the other channel. These control pulses may be of two different types, one being used to stop the tape at the end of each voice message and the other being used as an end of program mark for synchronizing the two tapes at the start of a new program.

Each call program on the punched paper tape is divided into discrete parts or segments; each segment controls one function, or one group of functions, performed by the equipment and it also checks the trainee's response to them. At the start of a training period, the two tapes are synchronized as described in detail subsequently, after which the punched paper tape starts the program by transmitting READ codes as described above whereby to set up in the matching and advance circuit the checking conditions for the anticipated trainee responses. The WRITE codes are then transmitted whereby to present the problem or question to the trainee, and the paper tape stops at the end of the segment. The magnetic tape may also be started during this period by the WRITE codes in which event it will run to the end of the segment and then stop. If the trainee responds properly, that is by correct key operation and/or verbal response, and does so within a predetermined time interval, a MATCH has been accomplished and the paper tape is advanced into the next segment.

This alternating situation-and-response-by-play between the program and the trainee continues smoothly through one call and into the next unless the trainee "fails." That is, if she operates a "wrong key," or fails to operate a key or respond vocally within a prescribed interval, the circuit action stops immediately, a FAILURE lamp lights and a register scores the error. The trainee then operates her ADVANCE key and the tapes are skipped over the rest of the incorrectly handled call and then advance normally into the next call on the paper tape.

In view of their respective functions the WRITE codes will be referred to on occasion as the "problem" or "question" codes and the READ codes will be referred to as the "answer" or "response" codes.

A feature of our invention is transfer means which permits use of the same code leads for transmission of both the READ and the WRITE codes.

Another feature of the invention is variable timing means whereby the permissible time for responses by the attendant may be varied under control of a program code in accordance with the complexity of the particular task to be performed.

A further feature of the invention is a W–Z relay divider means for combining translated alphabetic code into pairs.

Yet another feature of the invention is means effective upon occurrence of a failure by the trainee to cancel the remainder of the program.

A still further feature is means whereby the training supervisor on occasion may take over the training procedure and manually advance the program segments step by step.

A full understanding of the arrangement contemplated by the present invention as well as appreciation of the various advantageous features thereof may be gained from consideration of the following detailed description in connection with the accompanying drawing in which.

A detailed description of one specific illustrative embodiment of the invention will be given subsequently with reference to FIGS. 2 to 33. However, it is believed that it will be of interest first to consider an overall description of the arrangement in general terms with particular reference to the schematic showing of the major elements afforded by FIG. 1.

Figure 1:
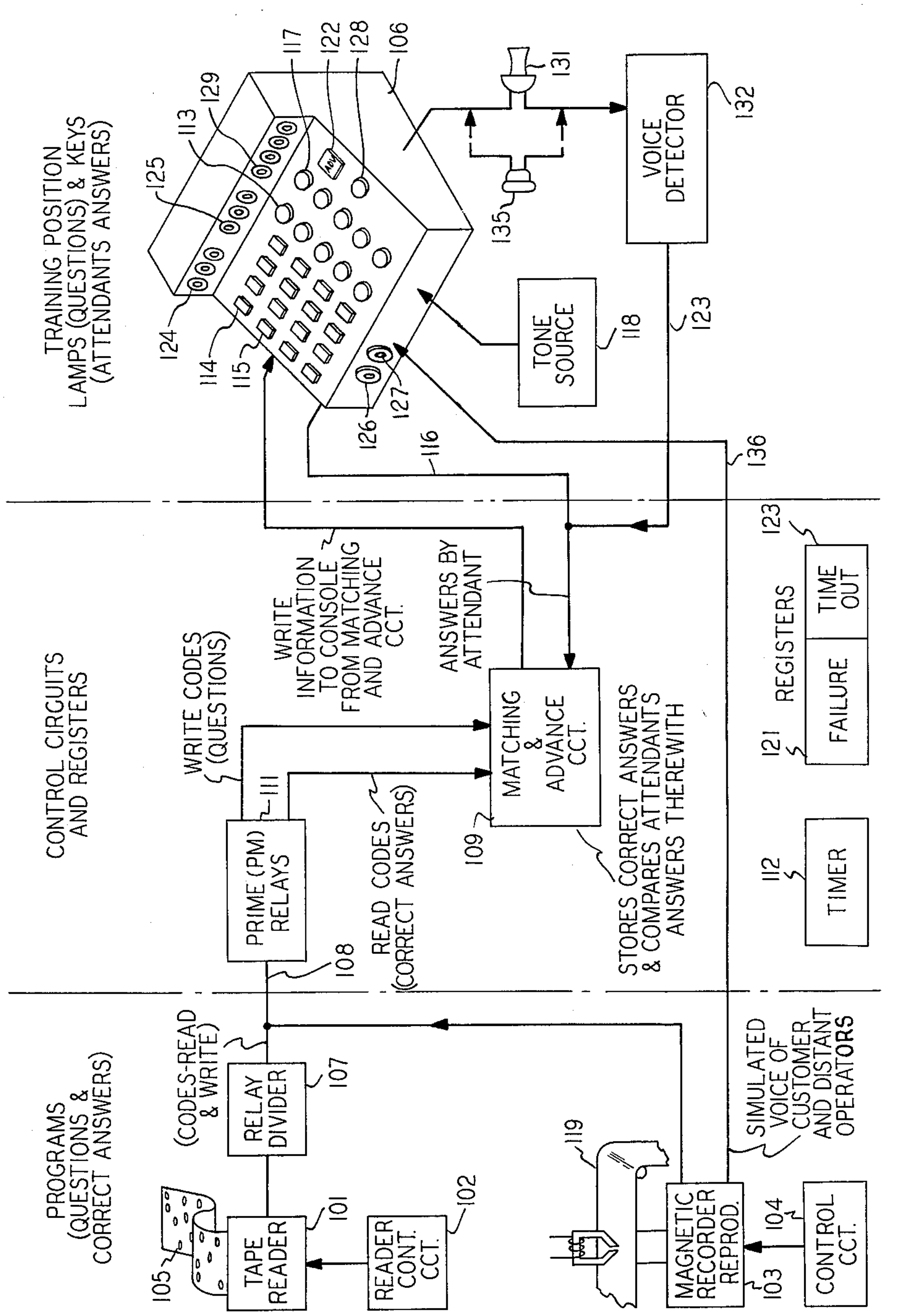
FIG. 1 shows schematically the general over-all arrangement of one specific illustrative embodiment of our invention.
Figure 2:
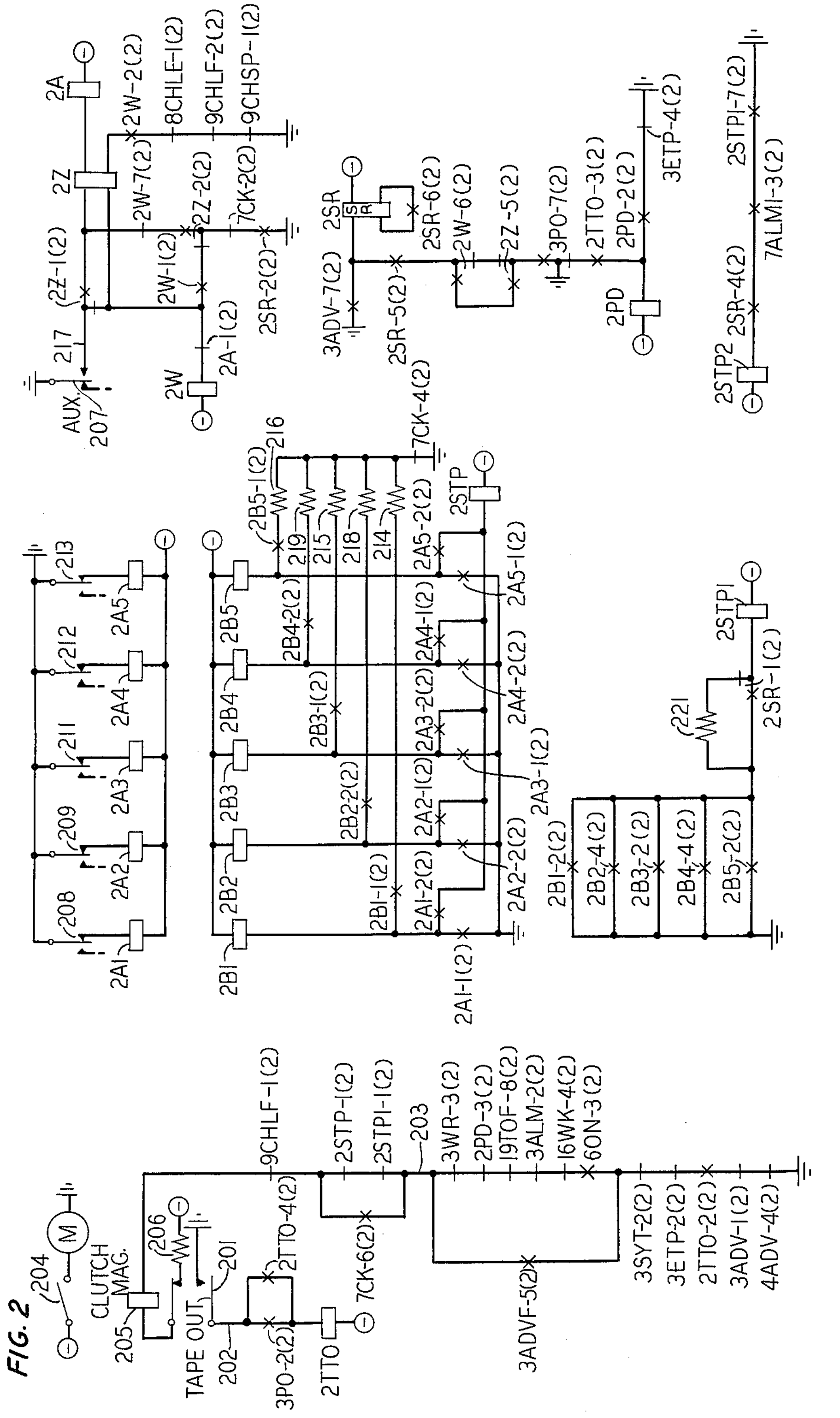
FIG. 2 shows particularly the tape reader control path and the code contact leads of the tape reader with associated —A and —B relays.

Referring, therefore, to FIG. 1, there are shown schematically as program sources, a tape reader 101, which may comprise a teletypewriter transmitter-distributor, a tape reader control circuit 102, and a magnetic recorder-reproducer 103 with control circuit 104. The tape reader is shown loaded with program tape 105 and the magnetic recorder-reproducer with program tape 119.

Teletypewriter transmitter-distributor 101 may be of the type well known in the telegraph art which transmits ground on $n$-out-of-5 leads, depending on the particular character, and which also includes in its output a grounded auxiliary contact which is operated in every cycle. (It will be understood that, while a five-line tape with $n$-out-of-5 transmission is shown and described, other tapes may be used in the same general manner, for example a seven-line tape with $n$-out-of-7 transmission.) In the instance of the specific illustrative embodiment it will be assumed that the transmitter-distributor or tape reader 101 is geared for a speed whereby one revolution takes 100 ms. and that, during each revolution or cycle, outputs are produced from approximately the 20 ms. point to the 80 ms. point. Further, it is assumed that the device will cycle indefinitely as long as its clutch magnets are held operated, producing outputs as long as punched paper tape 105 is passed over the sensing fingers; that when clutch magnets are released, the contact actuating mechanism will complete the cycle in which the magnets released, stopping at the zero point provided the release occurred before half the cycle had been completed and otherwise running through the complete succeeding cycle; and that the clutch magnets may be released and reoperated within a revolution without interrupting the continuous running of the reader. General features of the transmitter-distributor may be as disclosed, for example, in Patent 2,348,214, issued May 9, 1944, to E. A. Gubisch.

Teletypewriter tape 105 may be punched to contain in coded form all the information for setting up training calls for a given period of time, for example one-half hour. Several simulated calls will be on a single tape. These may all be the same type of call or a mixture of types of calls depending upon the training requirements. The tape may be considered to be divided into programs, which is that portion covering one call, and segments, which are parts of a program consisting of information required by the trainee up to the point where she must respond by appropriate action such as key operation and/or speech. A segment may be considered to be divided into two parts, READ codes and WRITE codes; these terms have been referred to above and will be further explained subsequently.

The program under control of the punched tape 105 presents to the trainee a training situation that exactly duplicates an actual working situation, and the tape is prepared in advance with a number of such situations in mind. The call to be simulated is analyzed as a number of natural groups of events that occur between its initiation and its completion. For example, a group of lamps light at the switchboard accompanied by an audible signal to the operator indicating that a customer has initiated a call, whereupon the operator offers assistance. Each program segment of the tape constitutes one such group of events. The lighting of the lamps and the audible signal comprise the "problem" and are effected through the WRITE codes, while the offer of assistance represents the "response" and is controlled by the key operations and/or verbal response by the trainee. In the meantime, the correct response has been "stored" under control of the READ codes for comparison with the trainee's response.

The magnetic reproducer 103, with magnetic tape 119, supplies the "voice" normally furnished by the customer and/or distant operator. The magnetic tape is started during certain parts of certain segments under control of the WRITE codes, and, once started, it runs to the end of the segment and then stops. As pointed out above, the tape is preferably of the two-channel type, the voice being recorded on one channel and control pulses, or tones, recorded on the other channel. These tones may be utilized for synchronization purposes and as an end-of-program indication. The magnetic tape is also utilized on occasion to obtain a "delay" for example to simulate "answering time."

A suitable attendant's console 106 is provided at the training position which preferably is similar, with regard to number and location of keys and lamps, to the actual assistance position for which the trainee is being prepared. Such a position, by way of example, may utilize upwards of fifty lamps which must be controlled, all being lighted or extinguished at various times and some being flashed. The position is also provided with keys which the attendant is required to operate from time to time, the number of keys provided being approximately the same as the number of lamps. As described subsequently, the position may also be provided with a plurality of gas-filled numerical indicator tubes, or lamps, for visually indicating rates, time, etc. Such indicators, as indicators 124, 125 and 129, are shown on console 106.

A relay is provided for lighting each of the lamps at the training position which responds to a particular code from the tape reader 101. When the lamp is required to flash, a second relay is provided which responds to another code. Still another relay responding to a different code is provided for extinguishing the lamp in most instances, although in the instance of certain groups of lamps a relay common to the group may serve the purpose. The codes which operate these relays are the WRITE codes referred to above.

A match relay is provided in the matching and advance circuit 109 for each of the keys referred to, each of which match relays operate in response to a READ code. The READ codes are also referred to above.

The codes transmitted are composed of a combination of two teletypewriter code characters. The first tape character of a pair is translated into one out of twenty-six possible characters designated by letters of the alphabet and is stored on the first tape reader revolution or cycle. On the next revolution the second character is translated to an alphabetic code and the two codes are then combined in a pair by relay divider 107 for transmission.

The READ codes, which may be considered the "correct answer" codes, are transmitted first over the code leads represented by single lead 108, and serve to set up, by relay operations in the matching and advance circuit 109, conditions which the attendant is required to match by appropriate action. Upon completion of the transmission of the READ codes of the particular segment, one or more of the PM (PRIME) relays 111 operate and close certain transfer contacts whereby to permit use of the same code leads for transmission of both the READ codes and the WRITE codes. By virtue of this transfer action, which will be fully described in connection with the subsequent detailed description of the arrangement, the READ and WRITE codes, while transmitted over the same code leads, are properly directed to their respective ultimate destinations, that is the READ relays and the WRITE relays, respectively, of the matching and advance circuit.

The WRITE codes, which may be considered the "questions" codes, are now transmitted over the code leads 108 and control the lighting of the lamps at the console 106 whereby to present the question or problem to the attendant for appropriate action. The WRITE codes also serve to start the magnetic recorder-reproducer 103, to set the timer 112 into operation, and to connect any necessary tones from source 118 to the attendant's circuit. Simulated "voice" may also be transmitted over line 136 at this time to the trainee position. At the completion of transmission of the WRITE codes the tape is stopped awaiting successful MATCH.

Generally speaking and as pointed out above, a match relay is provided in the matching and advance circuit 109 for each "responding" key of console 106. The trainee, alerted to the "question" by the lamp lighted by the WRITE codes, now answers or responds to operation of the particular key which in her opinion represents the proper response. For example, assuming that the COIN COLLECT lamp 113 was lighted, the attendant should respond by operating the corresponding COIN COLLECT key 114. If the attendant does, in fact, operate key 114, and does so within the particular time interval measured by timer 112, the corresponding operated match relay in the matching and advance circuit 109, that is, the relay representing the stored correct answer, will be released over lead 116 indicating a match and causing tape 105 to advance to the next simulated call problem. However, assuming that the attendant, through error or inadvertence, operates another key, for example COIN RETURN key 115, the match relay will not release and the FAILURE register 121 will be scored. In this instance, through means which will be fully described subsequently in connection with the detailed description of the specific illustrative embodiment of the invention, the tape is prevented from advancing until the trainee operates her ADVANCE key 122. This same preventing action would have resulted, and time out register 123 would have been scored, had the attendant's response, even though correct, not have been made within the particular time interval measured by timer 112. The timer intervals are adjustable under control of the program tapes whereby different permissible intervals may be prescribed for different types of problems.

FAILURE lamp 126, which lights steady when a failure is registered, and which flashes when a time-out is registered, is provided at console 106 to advise the trainee that a failure or time-out has occurred. Another failure lamp 128 also may be provided, if desired, on the console and, if desired, a separate time-out lamp, as lamp 127, may be provided in which event lamp 126 may be used solely as a failure indicator.

In certain instances a correct answer by the trainee may require the inclusion of a spoken response. In such event, if the trainee does, in fact, respond verbally the speech will be picked up by her microphone 131, detected and amplified by voice detector 132, and applied over lead 123 to the matching and advance circuit 109 whereby to satisfy the match conditions set up by the program. A receiver 135 is provided in order that the trainee may hear tones and conversation incoming to her position.

In the detailed drawings, the so-called "detached contact" representation of relays is utilized wherein, generally speaking, the respective contacts are shown separated from the relay windings, suitable designations being provided to properly indicate the association between the respective contacts and the controlling windings. This type of disclosure permits functional groups of circuits to be shown separately thereby facilitating an understanding of the operational features embodied in the system. Normally open or "make" contacts are represented by an X with proper identifying designation and normally closed or "break" contacts are represented by a short straight line with proper identifying designation. A showing of a make and a break contact respectively arranged across circuit leads at their point of intersection represents a "transfer" pair, and where the continuity is important, for example, make-before-break, this will be brought out in the description at typical points.

Figure 3:
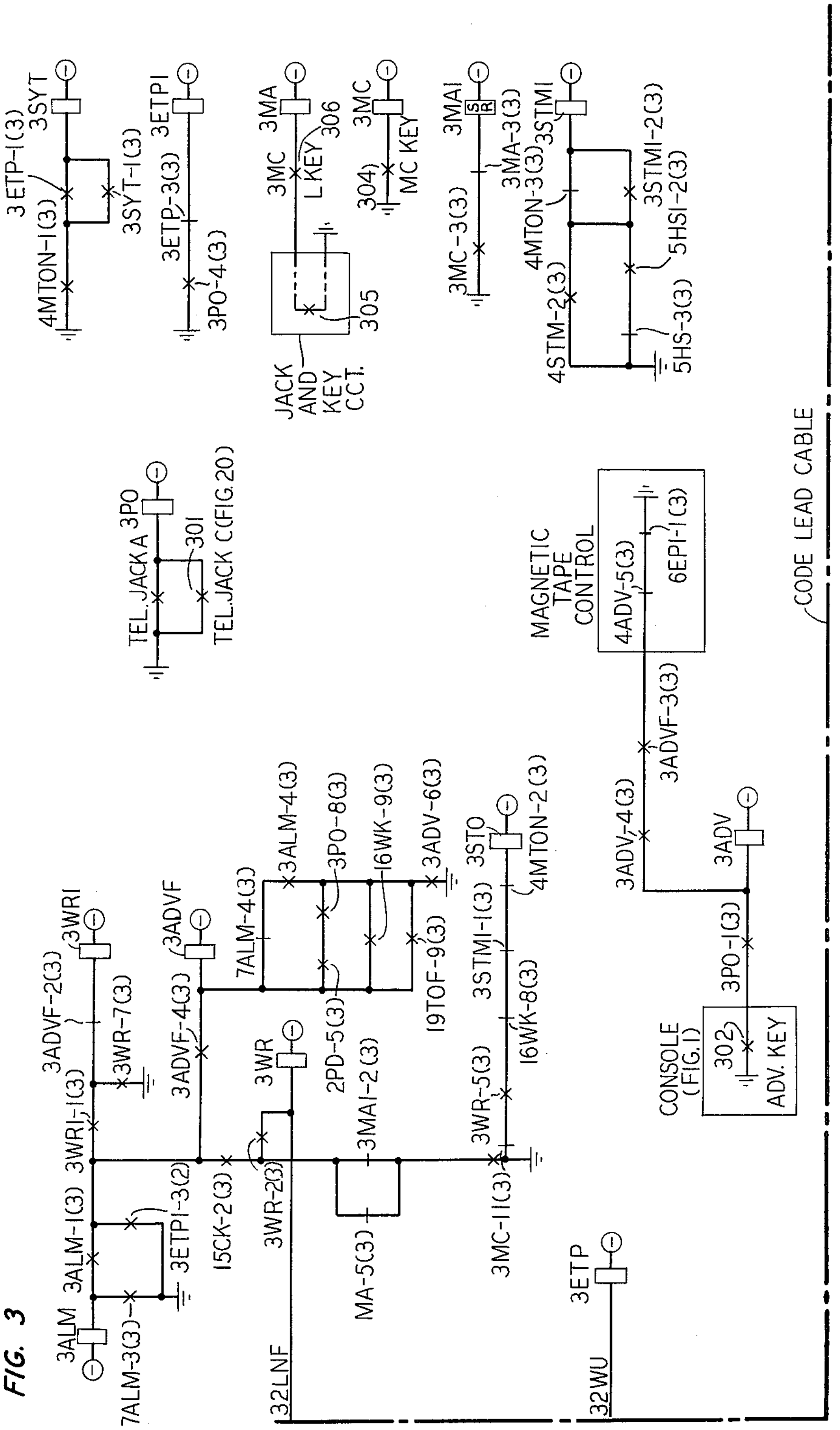
FIG. 3 shows particularly relay circuits involved in the reader tape start and advance and in the manual control embodiment.
Figure 4:
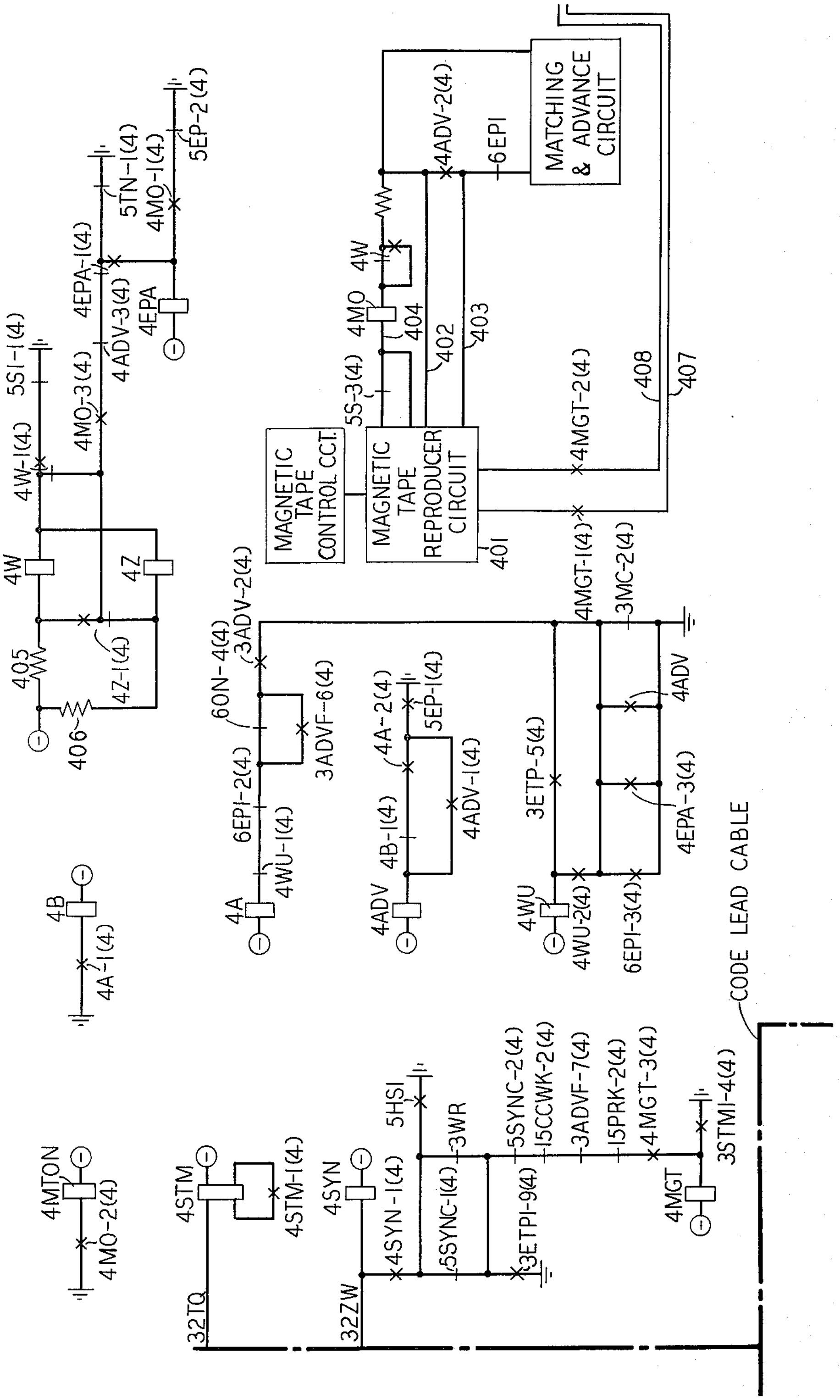
FIGS. 4 and 5 show relay circuits particularly involved in the magnetic reproducer control.
Figure 5:
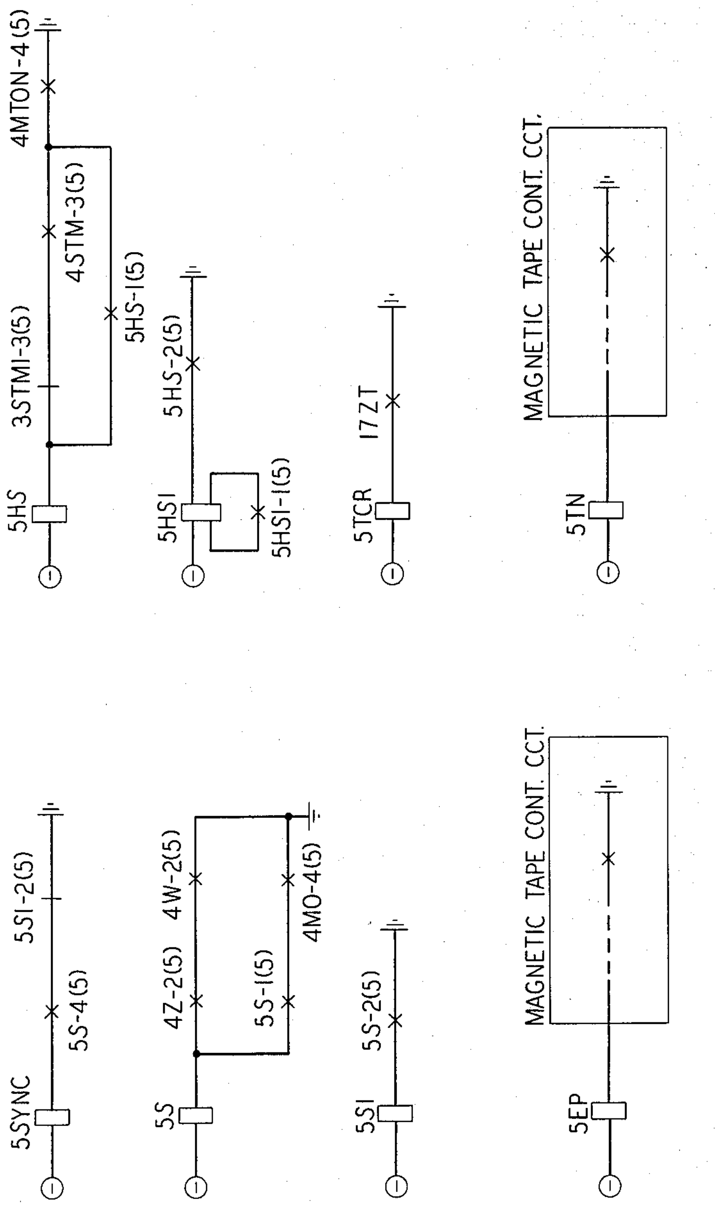
Figure 6:
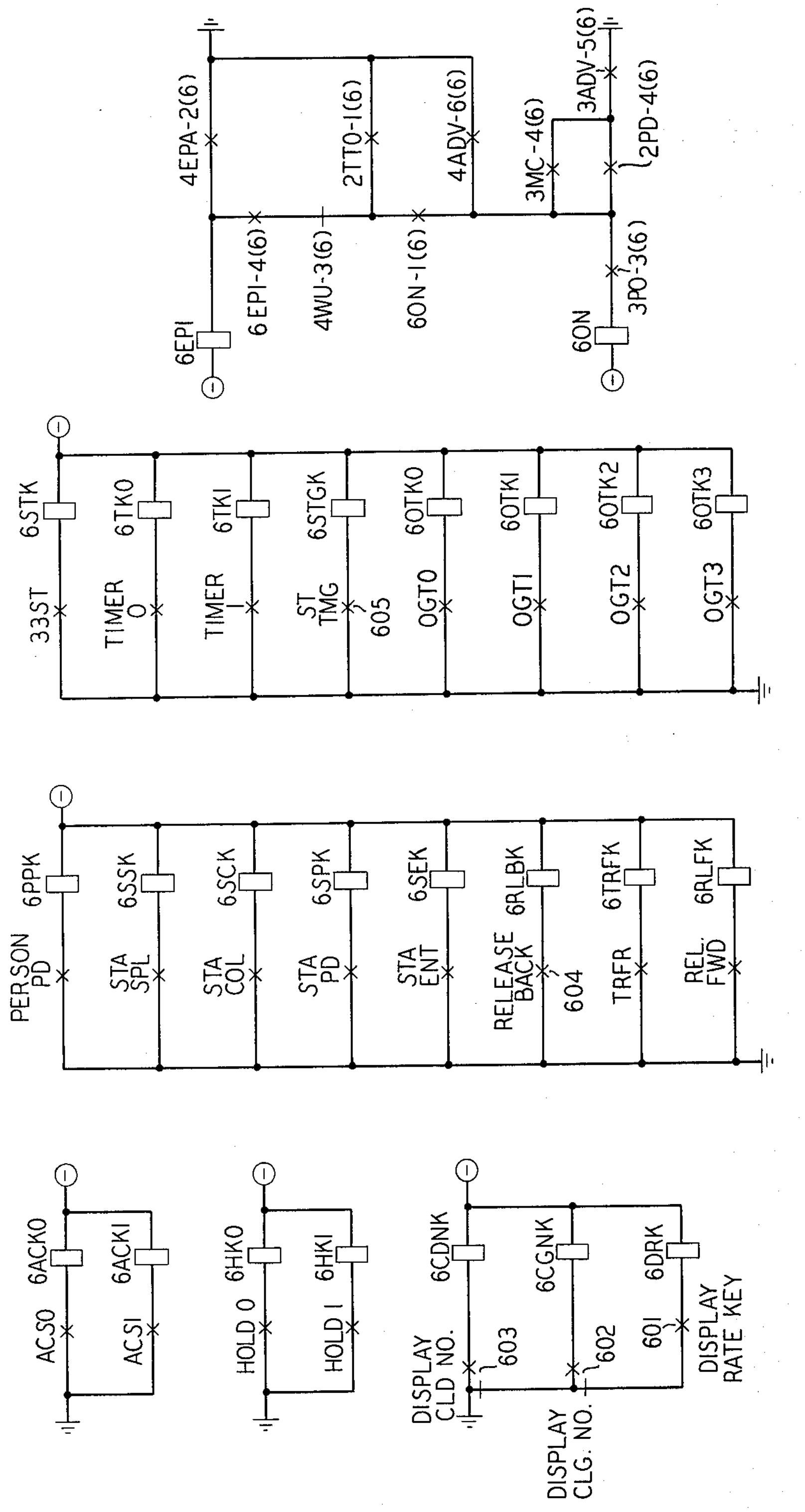
FIG. 6 shows particularly position key and relay circuits used by the trainee in her responses to the problem presented.
Figure 7:
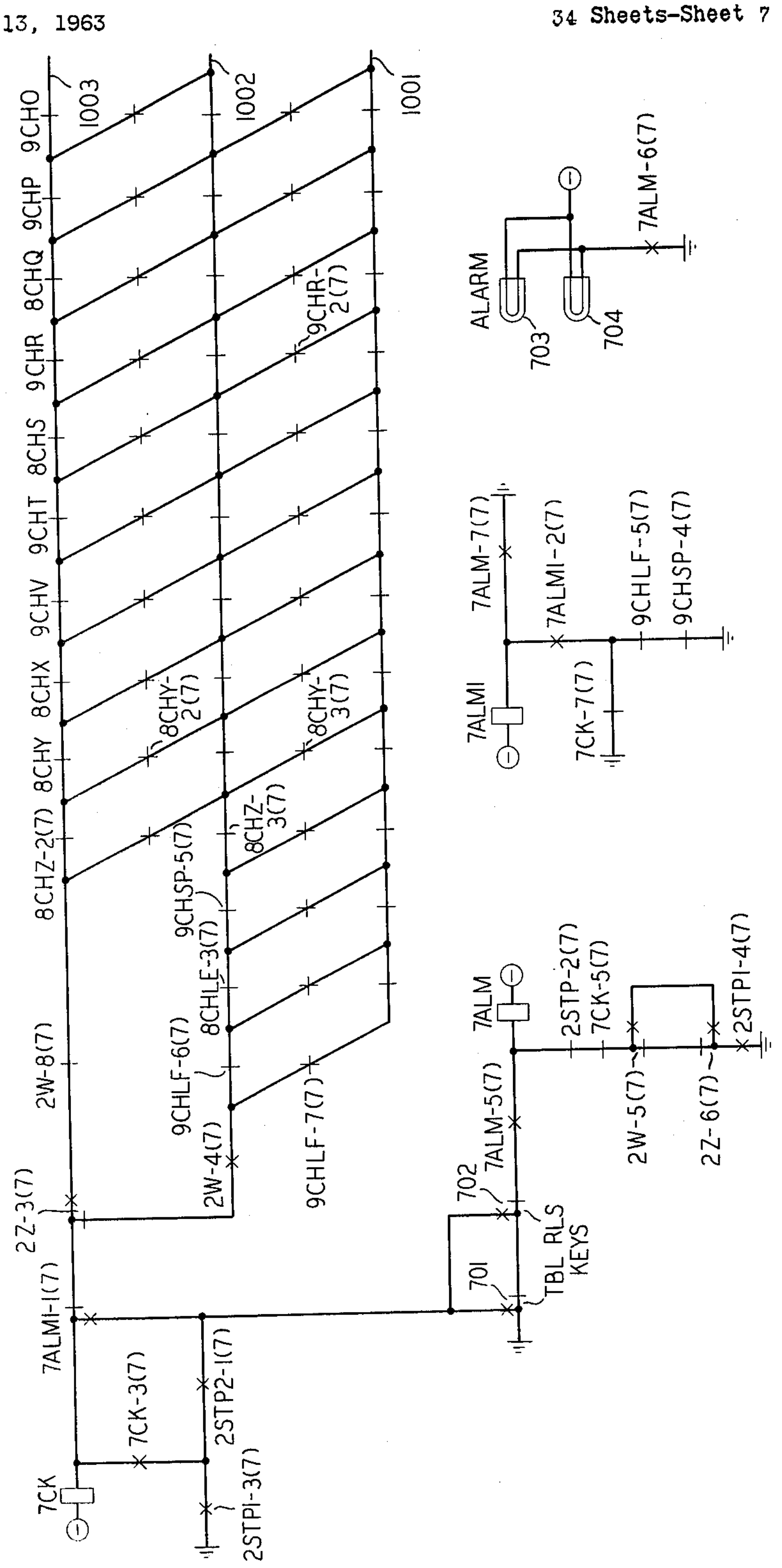
FIG. 7 shows a portion of the 1-out-of-$n$ and 2-out-of-$n$ check circuit together with an alarm relay circuit.
Figure 8:
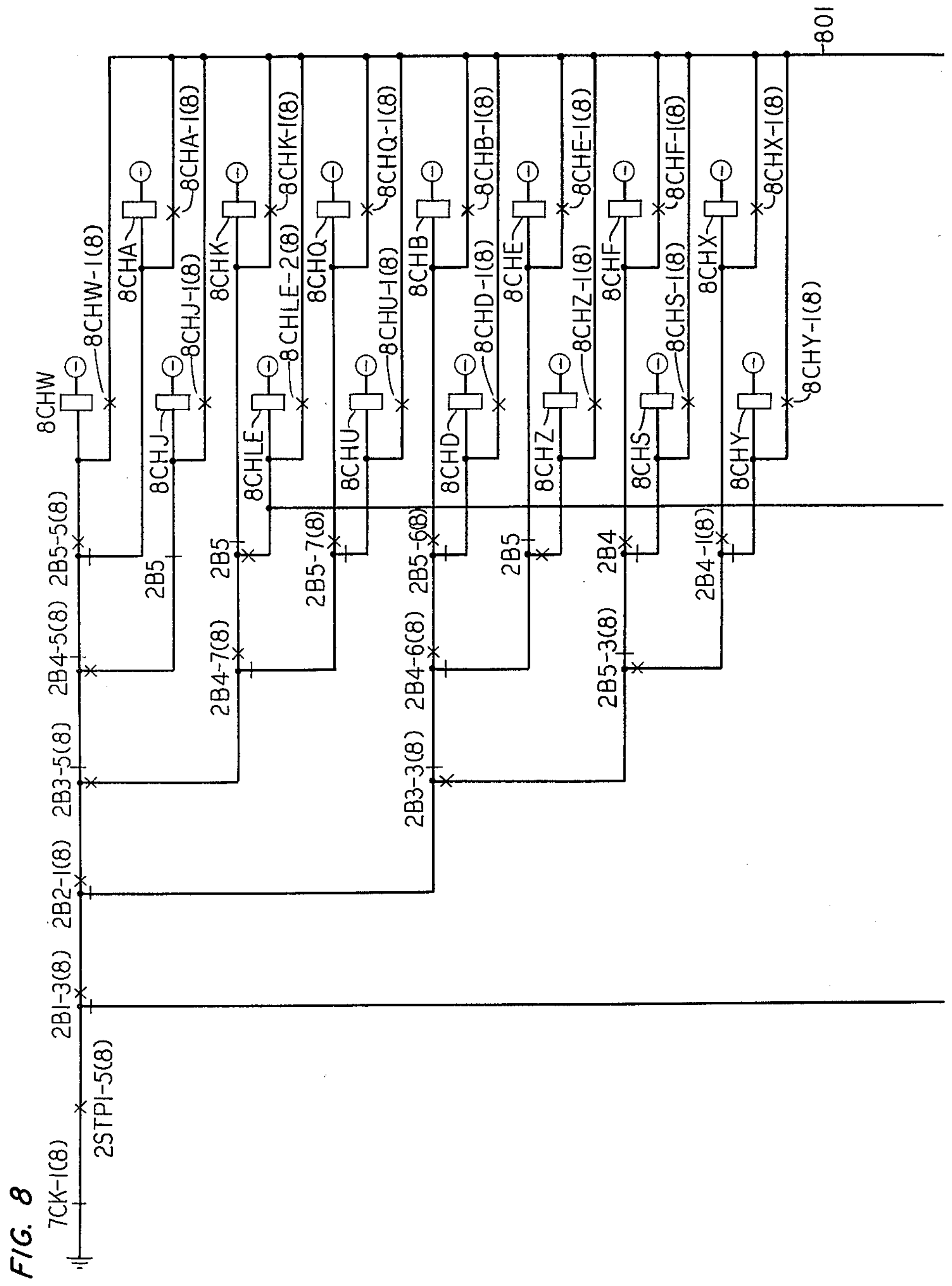
FIGS. 8 and 9 show the character relays of the translator circuit.
Figure 9:
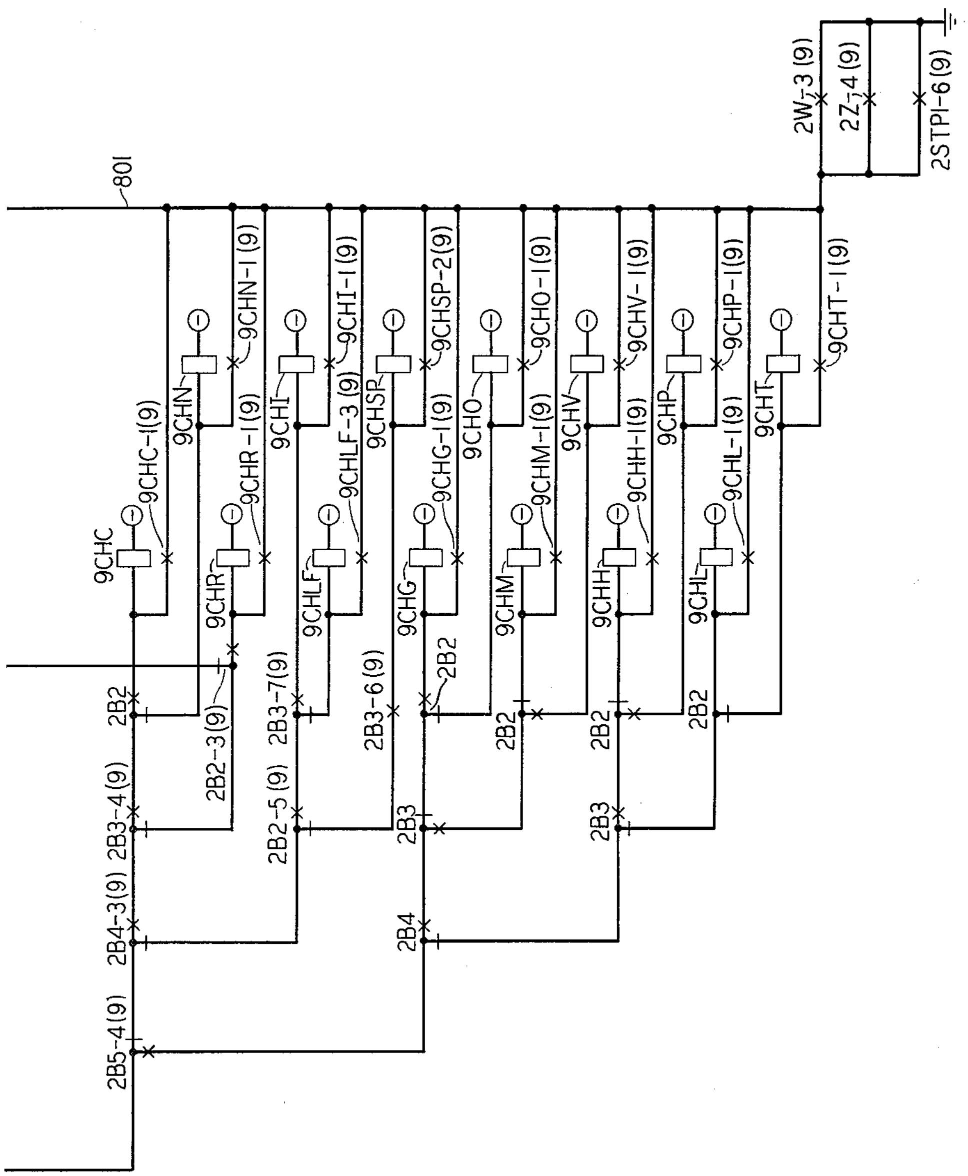
Figure 10:
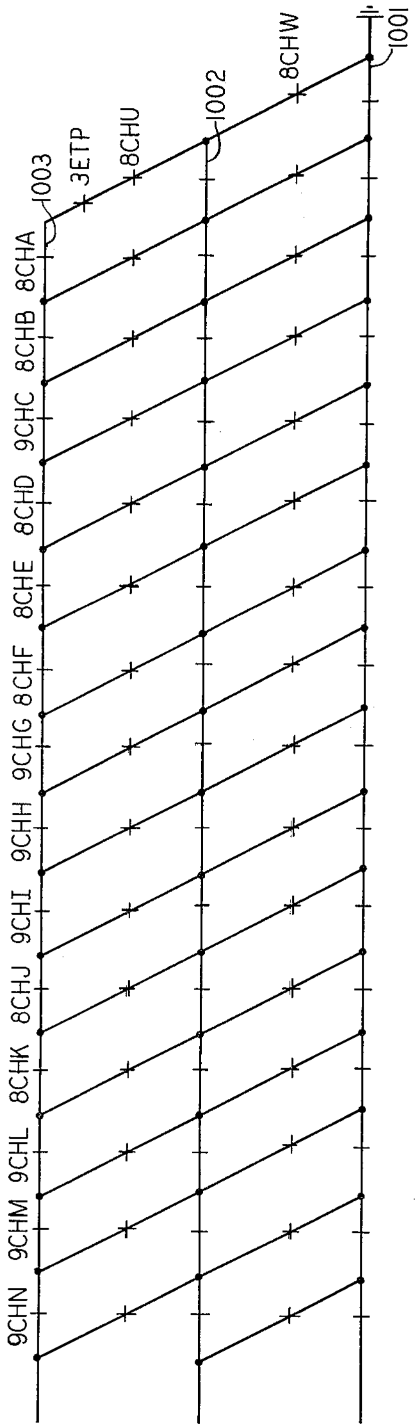
FIG. 10 shows the other portion of the check circuit of FIG. 7.

To further facilitate consideration of the specification in connection with the drawing, each illustrated item, such as relay, lamp or key, is preceded by a suffix indicating the figure of the drawing in which it appears, for example, relay winding 3ADV appearing in FIG. 3. Further, each relay contact designation is followed by a reference digit in parenthesis indicating the figure in which the particular contact appears; for example, the contact designation 3ADV–1(2), which indicates that the No. 1 contact of relay 3ADV appears in FIG. 2 while the relay winding, as pointed out above, appears in FIG. 3.

*Operation and synchronization of program tapes*

Coming now to a more detailed description of the specific illustrative embodiment of the invention and assuming that the teletypewriter program tape 105 (FIG. 1) has been placed in the transmitter-distributor or tape reader (101, FIG. 1), this will close the tape-out contact 201 (FIG. 2) whereby to connect ground to lead 202. At the same time it will be assumed that the trainee has plugged her telephone set into telephone jack C (FIG. 20) at the console thereby closing contact 301 thereof and operating relay 3PO (FIG. 3). Relay 3ETP1 operates following operation of relay 3PO from ground, make contact 3PO–4(3) of relay 3PO, break contact 3ETP–3(3) of relay 3ETP and winding of relay 3ETP1 to battery. The trainee now closes the advance key provided at the console (122, FIG. 1) whereby to complete a path for operating relay 3ADV (FIG. 3) from ground, contact 302 of the advance key, make contact 3PO–1(3) of relay 3PO, winding of relay 3ADV to battery.

Relay 2SR operates following operation of relay 3ADV, from ground, make contact 3ADV–7(2) of relay 3ADV, upper winding of relay 2SR to battery; relay 2SR, operated, closes a shunt path through make contact 2SR–6(2) around its lower winding whereby to impart a slow-to-release characteristic, and locks to ground through its own make contact 2SR–5(2), either the make or break contacts of transfer pairs 2W–6(2) and 2Z–5(2), (relays 2W and 2Z are either both operated or both released), and the make contact of transfer pair 3PO–7(2) of relay 3PO.

The leading edges of both the teletypewriter program tape (105 of FIG. 1) and of the magnetic taje (119, FIG. 1) of reproducer 103 (FIG. 1) will have "dead space" containing no useful information. Each of the tapes therefore must first be advanced to the points where the "useful" information starts and both must be at that exact point before the first program information is transmitted. To accomplish this the magnetic tape is advanced to the starting line first (as will be described below). When it reaches this point, the reproducer transmits an "end of program" signal to the magnetic tape control circuit and the tape stops. The signal causes the control circuit to connect ground to the control circuit for the teletypewriter tape, as described subsequently, which then starts and runs to its "starting line." When it reaches that point an "end of program" signal is sent to the matching and advance circuit (109 of FIG. 1). The tapes are synchronized and the teletypewriter tape is advanced into the first program.

Relay 2TTO operates from ground, tape-out contact 201, lead 202, make contact 3PO–2(2) of relay 3PO, winding of relay 2TTO to battery, and upon operating, locks to the ground through its make contact 2TTO–4(2). Relay 3ADV, operated, opens tape reader start lead 203 at break contact 3ADV–1(2) and closes, through make contact 3ADV–2(4) and break contacts of certain unoperated relays, an operate path for relay 4A. Relay 4A operated, completes at its 4A–1(4) make contact an operate path for relay 4B.

Relays 5TN and 5EP are normally operated so that when relay 4A operates, and before the resulting operation of relay 4B, a path is closed for operation of relay 4ADV traced from ground, make contacts 5EP–1(4) and 4A–2(4), break contact 4B–1(4) of relay 4B (not yet operated), winding of relay 4ADV to battery. Relay 4ADV, upon operating, locks to ground through its 4ADV–1(4) make contact so that it remains operated even though relay 4B operates as previously described.

With relay 4ADV operated, a path is completed for operation of relay 60N from battery, winding of relay 60N, make contacts 3PO–3(6) and 4ADV–6(6) to ground, relay 60N operates and locks to ground through its own make contact 60N–1(6) and make contact 2TTO–1(6) of relay 2TTO.

Upon release of the advance key, and following operation of relay 4ADV, relay 3ADV releases.

Relay 4ADV, operated, closes at its 4ADV–2(4) make contact a loop through leads 402 and 403 for energizing reproducer circuit 401 (103 of FIG. 1) whereby to start the magnetic reproducer. Also at this time the operate paths for relays 4W and 4Z are opened at break contact 4ADV–3(4) of relay 4ADV, and relay 4MO is operated over lead 404 from the reproducer circuit 401. The magnetic reproducer now continues to advance until an "end of program" pulse is received.

Upon receipt of an "end of program" pulse, normally operated relay 5EP releases. Relay 5EP, released, completes a path for operating relay 4EPA from ground, break contact 5EP–2(4), make contact 4MO–1(4), winding of relay 4EPA to battery. Also, relay 5EP upon releasing opens the holding path of relay 4ADV at make contact 5EP–1(4), and relay 4ADV releases. Relay 4EPA operated, opens at the break contact of its transfer pair 4EPA–1(4) a path to relays 4W and 4Z and provides a holding path (for relay 4EPA) to ground through the make contact of the same transfer pair and break contact 5TN–1(4) of relay 5TN.

Further, relay 4EPA operated, completes through its 4EPA–2(6) make contact an operate path for relay 6EP1.

When relay 4ADV releases, as above described, and assuming that power switch 204 has previously been closed, a path is closed over lead 203 for operating the tape reader (101, FIG. 1) from ground, break contacts 4ADV–4(2) of relay 4ADV and 3ADV–1(2) of relay 3ADV (now also released), make contact 2TTO–2(2), break contacts 3ETP–2(2) and 3SYT–2(2), make contact 60N–3(2), break contacts 16WK–4(2), 3ALM–2(2), 19TOF–8(2), 2PD–3(2) of relay 2PD, 3WR–3(2), 2STP1–1(2), 2STP–1(2), and 9CHLF–1(2), operating winding 205 and contacts of magnet 205, resistor 206 to battery. While only one clutch magnet 205 is shown, a plurality of magnets may, of course, be provided. The teletypewriter tape (105, FIG. 1) is now advanced and when its "starting line" is reached, ground is applied to code lead 32WU (in a manner described in detail subsequently) operating relay 3ETP. If at this time the magnetic tape is still in motion, relay 4MTON will be operated since the operate path will be closed through make contact 4MO–2(4) of relay 4MO; relay 4MO is held operated from the reproducer circuit 401. Under these conditions, relay 3SYT will operate from ground, make contacts 4MTON–1(3) and 3ETP–1(3), winding of relay 3SYT to battery; relay 3SYT locks to ground through its own make contact 3SYT–1(3) and the make contact of the 4MTON relay.

When the ground is subsequently removed from code lead 32WU, relay 3STP releases, but start lead 203 is held open at break contact 3SYT–2(2) of relay 3SYT and the tape reader does not start. When the magnetic tape subsequently stops, relay 4MTON releases, releasing in turn relay 3SYT whereby to close start lead 203 and start the tape reader.

In the above instance, had the magnetic tape already been at rest when the "starting line" pulse had been transmitted on code lead 32WU and relay 3ETP operated, relay 3SYT would not have been operated and, when relay 3ETP subsequently released, start lead 203 would have been closed and the teletypewriter tape started into the first program segment.

It will be apparent from the above that the novel arrangement provided is such that both tapes are first automatically advanced to the proper start line, i.e., the beginning of the useful information, and that the program transmission proper is not started until both tapes have been properly synchronized at the program start position.

*Production and combining of codes—Operation of character relays of translator circuit*

When the tape reader (101, FIG. 1) is set into operation and the teletypewriter tape (105, FIG. 1) has reached the "start line" as described above, outputs are produced, as also described previously, from approximately the 20 ms. point of rotation or cycle to approximately the 80 ms. point. The output paths include a grounded auxiliary contact 207, which is operated in every cycle, and some combination of the five multiple wire output contacts, or tape sensing fingers, 208, 209, 211, 212, 213, the combination in each instance depending upon the tape character "read."

As previously stated, the READ codes are transmitted first and with two exceptions, which will be discussed subsequently, each code consists of two characters which are transmitted serially by the tape reader. During the first rotation of the tape reader, respective relays of the group 2A1, 2A2, 2A3, 2A4, 2A5 are operated depending upon the "grounds" transmitted by the multiple wire output contacts 208, 209, 211, 212, 213. This depends in turn, of course, upon the program punchings in the teletypewriter tape (105, FIG. 1). The selective operation of the 2A1–2A5 relays will, in turn, govern the operation of respective relays in the group 2B1, 2B2, 2B3, 2B4, 2B5.

By way of description, let us assume that in the above instance relays 2A1, 2A3 and 2A5 operate. Obvious operating paths for respective relays 2B1, 2B3 and 2B5 are now completed through make contacts 2A1–1(2) of relay 2A1, 2A3–1(2) of relay 2A3, and 2A5–1(2) of relay 205. The 2B1 relay, upon operating, locks to ground through its make contact 2B1–1(2), resistor 214 and break contact 7CK–4(2) of relay 7CK; relay 2B3 locks to ground through its make contact 2B3–1(2), resistor 215 and break contact 7CK–4(2) of relay 7CK, and relay 2B5 locks to ground through its make contact 2B5–1(2), resistor 216 and break contact 7CK–4(2) of relay 7CK. Also, for each operated relay in the 2A group an operate path is completed for the 2STP relay, these respectively completed paths in the present instance being through make contacts 2A1–2(2) and 2A1–1(2) of relay 2A1, 2A3–2(2) and 2A3–1(2) of relay 2A3 and 2A5–2(2) and 2A5–1(2) of relay 2A5.

Relay 2STP, operated, opens at its 2STP–1(2) break contact the operate path over lead 203 for the clutch magnet 205 of the tape reader whereby to release the clutch magnet (or magnets). However, as described above, the reader tape advance and output contact mechanisms will continue to function; they will stop at the end of the cycle unless the clutch magnets are reoperated before that point is reached. Also, relay 2STP, upon operating, opens at its break contact 2STP–2(7) the operate path for alarm relay 7ALM whereby to prevent false operation of the relay which might otherwise occur early in the cycle.

Operation of relays 2B1, 2B3 and 2B5, as above described, establishes parallel operating paths for relay 2STP1 through respective make contacts 2B1–2(2), 2B3–2(2) and 2B5–2(2), the make contact of transfer pair 2SR–1(2) of relay 2SR, winding of relay 2STP1 to battery. In addition to its functions in the translator circuit (FIGS. 8 and 9) referred to immediately below, the 2STP1 relay, operated, prepares at its make contact 2STP1–3(7) a locking path for the check relay 7CK, partially completes at its 2STP1–4(7) make contact an operate path for relay 7ALM, and opens at a second point, at its break contact 2STP1–1(2), the start lead 203 for clutch magnet 205.

A respective one of the twenty-nine "character" relays of the translator circuit (FIGS. 8 and 9) is operated depending upon the particular relays of the 2B1–2B5 group which are operated as described above. It will be recalled that relays 2B1, 2B3 and 2B5 operated during the first rotation of the tape reader (101, FIG. 1). An operating path for character relay 8CHY of the translator circuit is accordingly completed, traced as follows: Relay 8CHY is operated over a path from ground, break contact 7CK–1(8), make contact 2STP–5(8), the make contact of the transfer pair 2B1–3(8), the break contact of the transfer pair 2B2–1(8), the make contact of transfer pair 2B3–3(8), the make contact of transfer pair 2B5–3(8), the break contact of transfer pair 2B4–1(8), winding of relay 8CHY to battery. Relay 8CHY operates and locks to ground through its 8CHY–1(8) make contact, lead 801, make contact 2STP1–6(9) to ground.

This operation of relay 8CHY takes place, it will be recalled, as a result of the first rotation of the tape reader. It will be noted that this relay is now locked operated under control of the 2STP1 relay.

It will be evident from the above description that an important feature is inherent in the functioning of the 2STP1 relay which, as described, operates following operation of the 2B1–2B5 relays. It assures through the control exercised by its make contact 2STP–5(8) that there will be no output from the translator network until the affected relays of the 2B1–2B5 group have had ample time to operate.

When auxiliary contact 207 closes to lead 217, relay 2W operates from ground through the break contact of transfer pair 2Z–1(2) of relay 2Z and break contact 2A–1(2) of relay 2A. This ground is also applied to one side of the lower winding of relay 2Z. Relay 2W, operated, connects ground to this same point through make contact 2SR–2(2) of relay 2SR, break contact 7CK–2(2) of relay 7CK, the break contact of transfer pair 2Z–2(2) of relay 2Z, and make contact 2W–1(2) of relay 2W. Relay 2W also locks to ground over this path traced. At this same time, that is, upon the operation of relay 2W, ground is applied to the other side of the lower winding of relay 2Z through make contact 2W–2(2) of relay 2W and through break contacts of the three "single character" relays of the translator circuit, that is, break contacts 8CHLE–1(2) of relay 8CHLE, 9CHLF–2(2) of relay 9CHLF and 9CHSP–1(2) of relay 9CHSP. Relay 2Z is accordingly short-circuited and prevented from operating in the first of a pair of tape reader rotations, or cycles, until the auxiliary contact 207 opens on the one hand and either relay 7CK operates or the 2SR relay releases, on the other hand.

Relays 2W and 2Z, as will be apparent from subsequent description, act to combine the codes produced by the first and the second reader rotations or cycles, that is, functions performed by relay divider 107, FIG. 1.

Also, relay 2W, upon operating, establishes through its 2W–3(9) make contact a second locking path through lead 801 common to all the character relays of the translator circuit; partially completes at its 2W–4(7) make contact the 1-out-of-*n* check circuit (FIGS 7 and 10); opens at the break contact of its transfer pair 2W–5(7) the operate path of alarm relay 7ALM; and opens at the break contact of its transfer pair 2W–6(2) the previously traced locking path of relay 2SR. Relay 2SR is slow-to-release and does not restore immediately.

With relay 2W operated and with the character relay 8CHY also operated as above described, the check relay 7CK now operates over a path from ground, lower rail or lead 1001, through break contacts of character relays included therein as series elements, make contact 8CHYZ–3(7) of relay 8CHY to center rail 1002, break contacts 8CHZ-3(7) of relay 8CHZ, 9CHSP–5(7) of relay 9CHSP, 8CHLE–3(7) of relay 8CHLE, 9CHLF–6(7) of relay 9CHLF, make contact 2W–4(7) of relay 2W, the break contact of transfer pair 2Z–3(7) of relay 2Z, the break contact of transfer pair 7ALM1–1(7) of relay 7ALM1, winding of relay 7CK to battery. Relay 7CK operates and locks to ground through its make contact 7CK–3(7) and make contact 2STP1–3(7) of relay 2STP1.

Relay 7CK, operated, opens at its break contact 7CK–2(2) the locking path for relay 2W and one of the short-circuiting paths on the lower winding of relay 2Z; opens at its break contact 7CK–4(2) the locking paths for the operated relays in the 2B1–2B5 group; opens at its 7CK–1(8) break contact the common ground connection for the translator circuit contact network of the same group of relays whereby to open the operating paths of all the character relays, as 8CHY for example, and prevent false operation of the translator relays upon release of the 2B1–2B5 relays; opens at its break contact 7CK–5(7) the operate path of alarm relay 7ALM; and closes at its make contact 7CK–6(2) a shunting path around the open contacts 2STP1–1(2) of relay 2STP1 and 2STP–1(2) of relay 2STP whereby to reclose operate path 203 of clutch magnet 205.

The purpose of the last described function of the 7CK relay is to assure that clutch magnet 205 is operated when the tape reader mechanism reaches the zero point of the cycle whereby to prevent a momentary stoppage at this point.

When approximately 80 ms. of the first tape reader cycle have elapsed, the code contacts and the auxiliary contact 207 are opened. Removal of ground from the code contacts releases the operated relays in the 2A1–2A5 group, in this instance the 2A1, the 2A3 and the 2A5.

Removal of the auxiliary contact ground from lead 217 opens the operating path of the 2W relay and also removes a short-circuiting path on the lower winding of relay 2Z leaving the winding effectively in series with the previously traced locking path of the 2W relay. Under these conditions, relay 2W holds operated and relay 2Z operates through make contact 2W–2(2) of relay 2W and break contacts of the single-character relays, that is, 8CHLE–1(2) of relay 8CHLE, 9CHLF–2(2) of relay 9CHLF and 9CHSP–1(2) of relay 9CHSP.

Relay 2Z, operated, closes through its make contact 2Z–4(9) still another locking path over lead 801 for the character relays of the translator circuit; opens at the break contact of its transfer pair 2Z–3(7) the 1-out-of-*n* operating path of relay 7CK; closes at the make contact of its transfer pair 2Z–5(2) the locking path of relay 2SR, maintaining this slow-to-release relay operated; partially completes at the make contact of its transfer pair 2Z–6(7) an operate path for relay 7ALM; and transfers the two now opened ground paths, one under control of auxiliary control 207 and the other under control of relays 2W, 7CK and 2SR, from the above-mentioned terminal of the lower winding of relay 2Z to one terminal of its upper winding. This converts these circuit paths from short-circuiting paths on the lower winding to locking paths on the upper winding. During the uncoming second cycle, therefore, relay 2Z will be locked operated until the auxiliary contact 207 opens and relay 7CK operates or relay 2SR releases.

Also, the 2Z relay operated, prepares operating and holding paths for relay 2A in series with its own (2Z) upper winding. The purpose of the 2A relay is to provide a faster release for relay 2W, at break contact 2A–1(2), on the second of a pair of reader cycles, than would be possible with the more common shuntdown arrangements.

Relays 2A1, 2A3 and 2A5, upon releasing as above described, release the respective controlled relays 2B1, 2B3 and 2B5, together with relay 2STP. Release of relays 2B1, 2B3 and 2B5 is followed by release of relay 2STP1. A path is now completed through break contacts 2STP–1(2) and 2STP1–1(2) for holding lead 203 closed when relay 7CK releases. Also, relay 2STP1, released, removes at its 2STP1–5(8) make contact ground from the translator network thereby opening the common operating path of the character relays at still another point.

Also relay 2STP1, released, opens the operate path of relay 7ALM at another point, its 2STP1–4(7) make contact, and opens at its make contact 2STP1–6(9) one of the locking grounds provided on lead 801 for operated character relays. In the specific instance described above, however, the operated relay 8CHY will hold to the grounds supplied through make contacts 2Z–4(9) of relay 2Z and 2W–3(9) of relay 2W.

Also, since relay 2Z is operated, release of relay 2STP1 will be followed by release of relay 7CK since the holding path is opened at make contact 2STP1–3(7). Relay 7CK, released, opens at its 7CK–6(2) make contact the shunt path around break contacts 2STP–1(2) and 2STP1–1(2) in lead 203; prepares at its break contact 7CK–2(2) a locking path for relays 2Z and 2A in series; prepares at its break contact 7CK–4(2) a locking path for subsequently operated relays in the 2B1–2B5 group; partially recloses at its 7CK–1(8) break contact the operating path for the character relays; and partially completes at its break contact 7CK–5(7) the operating path for relay 7ALM.

At this point relays 2W, 2Z and 8CHY remain operated. At approximately the 20 ms. point in the second rotation or cycle of the tape reader, auxiliary contact 207 recloses ground to lead 217 and ground is applied through respective code contacts 208–213 to the 2A1–2A5 group of relays depending upon the program recorded in the tape (105, FIG. 1). In this instance, it will be assumed that ground is closed through contacts 209 and 212 thereby operating code relays 2A2 and 2A4. In the general manner described above in reference to the first cycle, relay 2B2 will now operate through make contact 2A2–2(2) of relay 2A2 and will lock to ground through its make contact 2B2–2(2), resistor 218, and break contact 7CK–4(2) of relay 7CK, and relay 2B4 will operate through make contact 2A4–2(2) and will lock to ground through its make contact 2B4–2(2), resistor 219 and break contact 7CK–4(2) of relay 7CK. Also, relay 2STP will operate over obvious paths through make contacts 2A2–1(2) of relay 2A2 and 2A4–1(2) of relay 2A4. Relay 2STP1 operates over parallel paths through make contacts 2B2–4(2) of relay 2B2 and 2B4–4(2) of relay 2B4.

Also in the general manner described above, character relay 9CHR of the translator circuit will now operate from ground, break contact 7CK–1(8), make contact 2STP1–5(8), the break contact of transfer pair 2B1–3(8), the break contact of transfer pair 2B5–4(9), the make contact of transfer pair 2B4–3(9), the break contact of transfer pair 2B3–4(9), the make contact of transfer pair 2B2–3(9), winding of relay 9CHR to battery. Relay 9CHR operates and locks to ground through its make contact 9CHR–1(9), lead 801 and make contact 2STP1–6(9) of relay 2STP1.

At this point, therefore, we have two of the character relays in the translator circuit which have operated and locked in operated position, relay 8CHY, which operated during the first reader cycle, and relay 9CHR, which operated during the second reader cycle. With the two character relays operated, a particular one of the approximately 200 code output leads (FIGS. 11 and 32) to the matching and advance circuit (109, FIG. 1) is grounded operating a relay in that circuit. This action will be described in detail subsequently, particularly in the section Read Code Transmission.

Auxiliary contact ground applied to lead 217 operates relay 2A in series with the upper winding of relay 2Z. Relay 2A, operated, interrupts at its 2A–1(2) break contact the holding path for relay 2W, which releases. Relay 2W, released, opens at its 2W–2(2) make contact the operating path through the lower winding of relay 2Z and closes at its 2W–7(2) break contact the locking path through the upper winding of the same relay. Relay 2Z is held operated therefore under control of auxiliary contact 207 on the one hand and relays 7CK and 2SR on the other. With relay 2W released and 2Z operated, the locking path for the 2SR relay is opened. Relay 2SR being slow to release does not release immediately. Also, relay 2W, released, opens the operate path of relay 7ALM at the make contact of its transfer pair 2W–5(7), and opens at its make contact 2W–3(9) one of the locking paths through lead 801 for the character relays. Also relay 2W, released, partially completes at its 2W–8(7) break contact the 2-out-of-*n* check operating circuit of the 7CK relay.

Since, as pointed out above, character relays 9CHR and 8CHY of the translator circuit are locked operated at this time, check relay 7CK operates over a path from ground, break contacts in lower rail or lead 1001, make contact 9CHR–2(7) to center rail 1002, break contacts in center rail 1002, make contact 8CHY–2(7) to upper rail 1003, break contacts 8CHZ–2(7) and 2W–8(7) the make contact of transfer pair 2Z–3(7) of relay 2Z, the break contact of transfer pair 7ALM1–1(7) of relay 7ALM1, winding of relay 7CK to battery.

Relay 7CK, operated, opens at its 7CK–5(7) break contact the operate path of relay 7ALM, opens at its 7CK–4(2) break contact the locking paths for relays 2B2 and 2B4, and removes at its 7CK–1(8) break contact ground from the common operating paths of the character relays of the translator circuit. Relays 8CHY and 9CHR remain operated over the locking paths previously traced. Also, relay 7CK, operated, provides at its 7CK–6(2) make contact a shunting path in clutch magnet lead 203 whereby to operate clutch magnet 205 (unless lead 203 is open at contacts controlled from the matching and alarm circuit), and opens at its 7CK–2(2) break contact one of the paths holding relays 2Z and 2A operated.

When the tape reader reaches the 80 ms. point on this second cycle or rotation, the code and auxiliary contacts open and the circuits return to normal as above described; as previously pointed out the operated character relays remain locked in operated position.

*Transmission of READ CODES*

It will be recalled that in the above description of the translator circuit specific translator circuit character relays 8CHY and 9CHR were presumed to be operated by the circuit functions traced. These relays are merely representative and it will be understood that the other character relays of the translator circuit are operated in a generally similar manner. Since it happens that in the detailed circuit arrangement the disclosed contacts of the 8CHY and 9CHR relays are actually involved in the control of gas-filled indicator tubes, a feature which will be described at a further point, the immediate description will be furthered if it be assumed that two of the character relays actually involved in the early READ operations are operated. Accordingly, it will be assumed for purposes of present description that character relays 8CHA and 8CHB had operated as the result of the first and second cycles of the tape reader and had locked in operated position over circuits similar to those described above in connection with relays 8CHY and 9CHR. (It will be obvious from examination of the drawing, FIGS. 8 and 9, that operation of relay 8CHA results from operation of code relays 2B1 and 2B2 over a path from ground, break contact 7CK–1(8), make contact 2STP1–5(8), the make contacts of transfer pairs 2B1–3(8) and 2B2–1(8) and the break contacts of transfer pairs 2B3–5(8), 2B4–5(8) and 2B5–5(8), and that operation of relay 8CHB results from operation of code relays 2B1, 2B4 and 2B5 over a path from ground, break contact 7CK–1(8), make contact 2STP1–5(8), the make contact of transfer pair 2B1–3(8), the break contacts of transfer pairs 2B2–1(8) and 2B3–3(8) and the make contacts of transfer pairs 2B4–6(8) and 2B5–6(8).)

With relays 8CHA and 8CHB operated, therefore, ground is closed over code lead 11BA (FIG. 11) to the matching and advance circuit, this ground being applied to common ground lead 3201 through break contacts 19TOF–1(32) of relay 19TOF, 3ALM–3(32) of relay 3ALM, 16WK–1(32) of 16WK and 2PD–1(32) of relay 2PD and being applied in turn to code lead 11BA through make contacts of the two operated character relays, that is, make contacts 8CHA–2(11) of relay 8CHA and 8CHB–2(11) of relay 8CHB. This ground is applied over code lead 11BA to the lamp control relay circuit, FIG. 12 (WRITE relays); since the PRIME relays, including relay 21PM, are released at this time, the ground is transferred to READ code lead 13BA, through the break contact of transfer pair 21PM–1(12) of relay 21PM, and applied over code lead 13BA to operate relay 13CC of the matching and advance circuit. Relay 13CC, upon operating, locks to ground through the make contact of its transfer pair 13CC–1(13), break contacts 17DL1–1(13) and 15CCK–5(13) in parallel, break contact 3MA–1(33) and make contact 3ETP1–1(33). Transfer pair 13CC–1(13) operates with a make-before-break continuity, that is the make contact closes and completes the locking path for relay 13CC before the break contact of the pair opens code lead 13BA. Code 13BA is opened at this point in order to prevent a ground transmittal back over the code lead with possible false operation of certain of the relays.

Generally speaking, in the instances of all code relays which operate over a code lead and then lock to ground through their own make contact, this contact will be the make contact of a transfer pair having make-before-break continuity; immediately after the locking path has been completed by closure of the make contact of the transfer pair, the respective code lead is opened by the break contact of the pair. This assures against a "back-up" of ground on the code lead and possible false operations.

In order to avoid unnecessary complexity and cluttering-up of the drawing, the connection of the code leads (of which there are a large number), to the WRITE relay circuits, and, in turn, the connection of the READ code leads (with the PRIME relays released) to the READ relay circuits are indicated schematically by heavy broken lines representing, respectively CODE LEAD cables and READ CODE LEAD cables.

Figure 18:
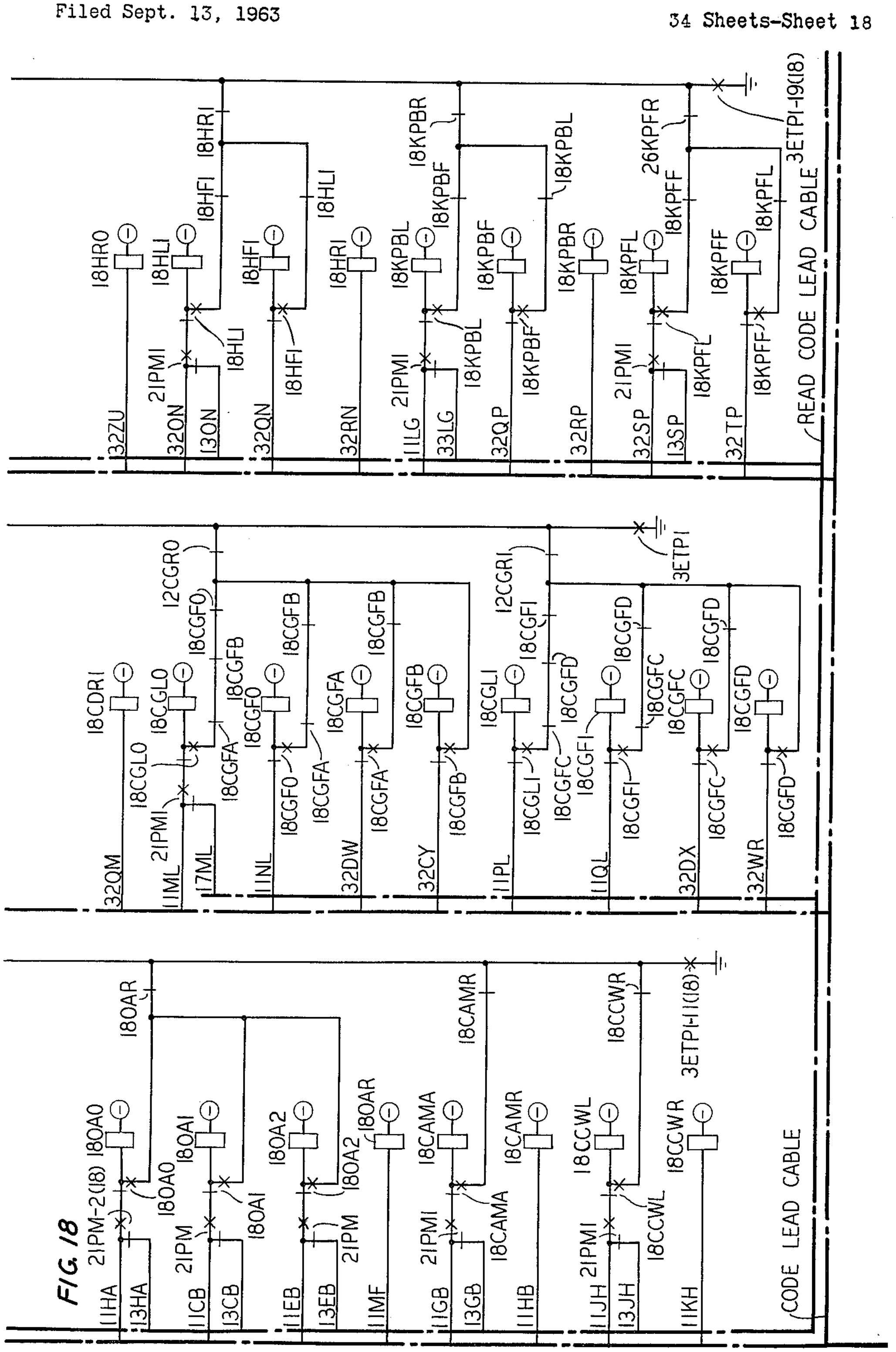
FIG. 18 shows additional WRITE and READ code relays.
Figure 19:
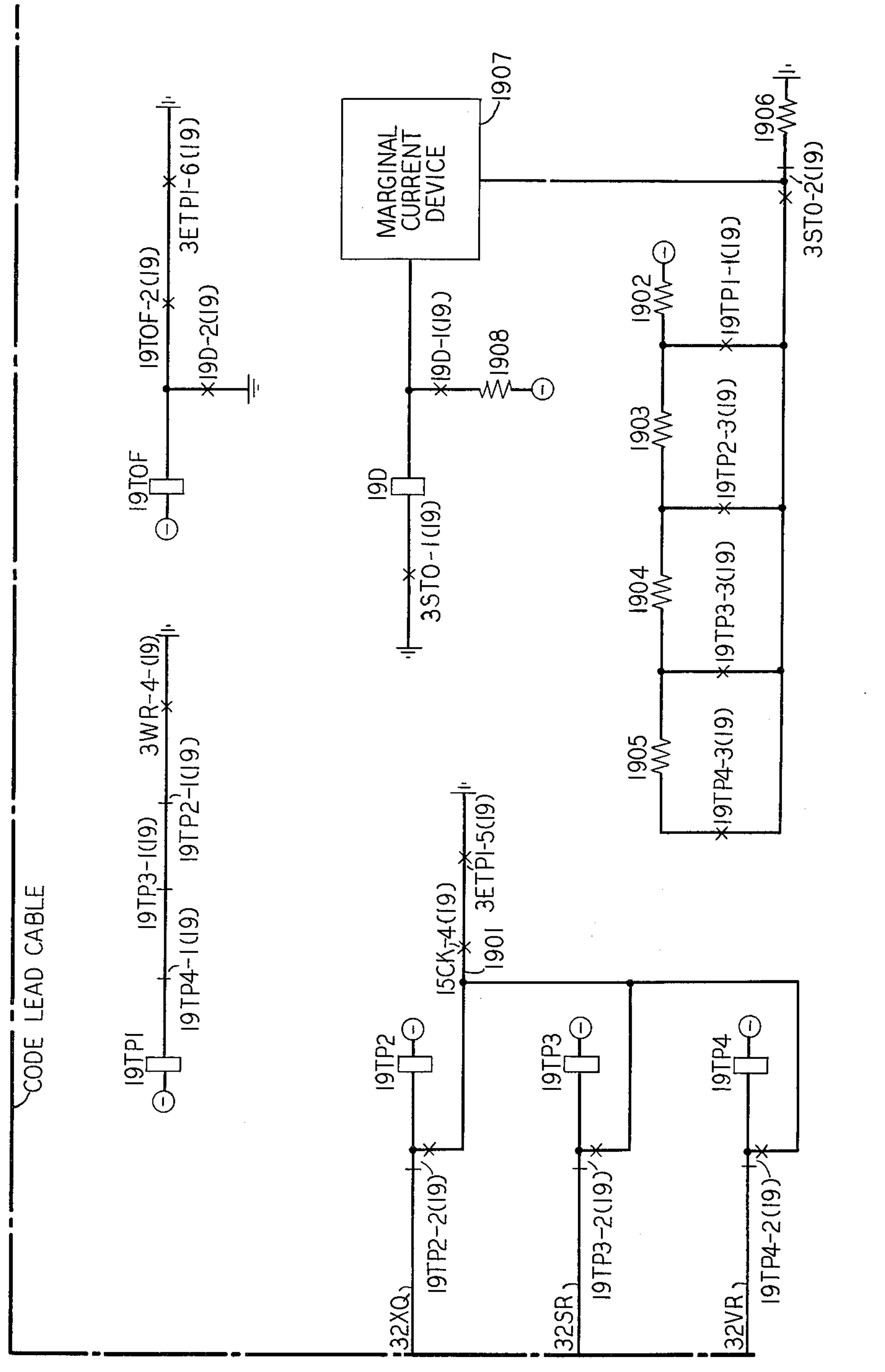
FIG. 19 shows particularly the timing and time-out-failure register circuits.

Relay 13CC is one of the MATCH relays of the matching and advance circuit and stores the correct answer awaiting proper response by the attendant to the problem subsequently transmitted. As pointed out above, the MATCH relays are operated by the READ codes. It will be understood that other MATCH relays are operated in a generally similar manner. For example, assuming that translator relays 8CHA and 9CHH are operated, ground from lead 3201 will then be applied to code lead 11HA through make contacts 8CHA–2(11) of relay 8CHA and 9CHH–2(11) of relay 9CHH and transmitted over code lead 11HA to the lamp control relay circuit (FIG. 18). Since PRIME relay 21PM is released the ground is transferred to READ CODE lead 13HA through the break contact of transfer pair 21PM–2(18) of relay 21PM. The ground applied over code lead 13HA operates MATCH relay 13CTG which, upon operating, locks to ground through the make contact of its transfer pair 13CTG–1(13), break contacts 17DL1–2(13), 15CTGK–1(13) and 3MA–1(33) and make contact 3ETP1–1(33). Here again, as in the instances of relay 13CC referred to above and of other code relays described subsequently, transfer pair 13CTG–1(13) has make-before-break continuity so that the locking path is closed at the make contact before the code lead is opened at the break contact.

*Operation of PRIME (PM) relays—Transmission of WRITE codes*

As previously pointed out, it is a novel and important feature of the present invention that the same code leads may be utilized, first for transmission of the READ codes and next for transmission of the corresponding WRITE codes. In the examples described just above, the ground transmitted over code lead 11BA was diverted to a MATCH relay 13CC and the ground transmitted over code lead 11HA was diverted to a MATCH relay 13CTG since PRIME relay 21PM was in released condition. In the first instance described, had the 21PM relay been operated the ground would have operated WRITE relay 12CMDR and, in the second instance, the ground would have operated WRITE relay 18OAO. These relays are both involved in the lamp control circuits, that is, they are "WRITE" relays which have a part in presenting the problems or questions to the trainee at the position. The operation of the 21PR relay and associated relays 21PM1, 21PM2, 21PM3 and 21PM4 relays which control the READ-WRITE use of the code leads is as follows.

After the last READ code of the particular program section has been transmitted, a "single character" SPACE code is initiated by the tape reader which results in the operation of code relay 2B3. This results, in turn, in the operation of character relay 9CHSP over a path from ground, break contact 7CK–1(8), make contact 2STP1–5(8), the break contacts of transfer pairs 2B1–3(8), 2B5–4(9), 2B4–3(9), and 2B2–5(9), make contact 2B3–6(9), winding of relay 9CHSP to battery. Relay 9CHSP operates and locks to the ground on lead 801 through its make contact 9CHSP–2(9). With relay 9CHSP operated, the ground on lead 3201 is applied through its make contact 9CHSP–3(32) to code lead 32SPA (FIG. 32) and is transmitted thereover to operate relay 21PM. Relay 21PM, upon operating, locks to ground through its make contact 21PM–3(21), break contact 3WR–1(21) of relay 3WR and make contact 3ETP1–2(21) of relay 3ETP1.

Relay 21PM, upon operating, completes operating paths for the associated relays 21PM1, 21PM2, 21PM3 and 21PM4 through respective make contacts 21PM–4(21), 21PM–5(21), 21PH–6(21) and 21PM–7(21). All of the "PRIME" relays, 21PM–21PM4, are similar with regard to function, that is, when operated, to effectively connect the code leads to respective WRITE relays, and, when released, to connect the same code leads to respective READ relays. Since a large number of code leads are involved it is advantageous to distribute the function between the five PRIME relays rather than to attempt to control the necessarily large number of transfer contacts by a single relay. To illustrate, the code leads associated with relay 14CGDR are switched through transfer pair 21PM1–1(14) of relay 21PM1, the code leads associated with relay 14CSR are switched through transfer pair 21PM4–1(14) of relay 21PM4, the code leads associated with relay 27TLO are switched through transfer pair 21PM3–1(27) of relay 21PM3 and so on.

The function performed by the PRIME relays is a particularly valuable one in the present circuit wherein by necessity a large number of code leads are involved. Obviously, the dual use of the leads, permitted by the PRIME relays results in substantial simplification of the overall arrangement.

After the transmission of the WRITE code has been completed, a "single-character" code, "Line Feed" is transmitted whereby to operate the 3WR relay. This code is transmitted by operation of relay 9CHLF which operates following operation of code relay 2B2 over a path from ground, break contact 7CK–1(8), make contact 2STP1–5(8), break contacts of transfer pairs 2B1–3(8), 2B5–4(9), 2B4–3(9), make contact of transfer pair 2B2–5(9), break contact of transfer pair 2B3–7(9), winding of relay 9CHLF to battery. Relay 9CHLF operates and locks through its make contact 9CHLF–3(9) to the ground on lead 801. With relay 9CHLF operated, the ground on lead 3201 is applied to code lead 32LNF (FIG. 32) through make contact 9CHLF–4(32) and transmitted over the code lead to operate relay 3WR. Relay 3WR, upon operating, locks to ground through its make contact 3WR–2(3) and make contacts 15CK–2(3) of relay 15CK and 3ETP1–3(2) of relay 3ETP1. (Relay 15CK operated following operation of MATCH relay 13CC, as above described, through make contact 13CC–3(15) of relay 13CC). Relay 3WR, operated, opens at its break contact 3WR–3(2) lead 203 of clutch magnet 205 (opens at its 3WR–1(21) break lead the holding path of relay 21PM and performs certain other functions which will be described subsequently. The PRIME relays 21PM, 21PM1, 21PM2, 21PM3 and 21PM4 release at this time.

*Response by attendant—Attainment of MATCH*

It will be assumed now that, in the manner described above, the READ codes have been transmitted whereby to operate and lock match relays in the matching and advance circuit (109, FIG. 1) whereby to simulate the the "correct answers" and that the WRITE codes have been transmitted to light certain lamps at the console (106, FIG. 1) whereby to present the problems to the attendant. It will be further assumed that the match relay held operated in the matching and advance circuit is the 13CC relay which in the illustrative embodiment described is the match relay for operation of the coin collect key at the position. Also, it will be assumed that the WRITE code resulted in lighting lamp 113 at the console 106, which, in the illustrative embodiment, in the particular lamp which when lighted, indicates that the proper response by the attendant is operation of coin collect key 114. Relay 15CK, as pointed out above, operated following operation of relay 13CC from ground on lead 1506 through make contact 13CC–3(15) of relay 13CC.

In the present instance it will be assumed that the attendant, upon observing the lighted lamp 113 (FIG. 1), responds properly by operating the "right key," that is, the "coin collect" key 1501 (corresponding to key 114, FIG. 1), and, further, it will be assumed that this operation occurs within the predetermined permissible time interval. The operation of the timer (112, FIG. 1) will not be described at this point, therefore, even though the time of response is, of course, measured. The timer operation will be described subsequently in connection with Failure and Time Out registrations.

When the attendant "responds to the problem" by closing coin collect key 1501, relay 15CCK operates from ground on lead 1502 and break contacts of Ring Back Key 1503, Ring Fwd key 1504 and Coin Return key 1505. Remembering that match relay 13CC of the matching and advance circuit is operated, it will be seen that a path for operating "right key" relay 16RK is now completed from ground, lead 1601, make contact 15CCK–1(16) of relay 15CCK, the make contact of transfer pair 13CC–2(16) of relay 13CC, winding of relay 16RK, resistor 1602 to battery. Also, relay 15CCK, operated, completes through its make contact 15CCK–2(17) an operate path for relay 17DL1. Relay 17DL1, and the relays of similar function 17DL2, 17DL3 and 17DL4, are provided in order to assure, through inclusion of their respective break contacts in the hold circuit of the various match relays, adequate time for operation of the 16RK relay before the pertinent match relay releases. Thus, in the present instance, match relay 13CC is held through a path which includes break contact 17DL1–1(13) of relay 17DL1.

When relay 17DL1 operates, as above described, the holding circuit of match relay 13CC is opened at break contact 17DL1–1(13) and relay 13CC releases. Relay 13CC, released, releases relay 15CK at its make contact 13CC–3(15). Relay 15CK, released, releases relay 3WR by opening its holding path at break contact 15CK–2(3).

"Right Key" relay 16RK, upon operating, as above described, locks to ground through its make contact 16RK–1(16), lead 1603, make contact 15CCK–3(16) and lead 1604. Relay 16RK, while operated, opens at its break contact 16RK–2(16) the operate path for "WRONG KEY" relay 16WK whereby to prevent the possible false operation thereof.

When the attendant releases the coin collect key 1501, relay 15CCK releases, releasing in turn relays 16RK and 17DL1 and a successful "match" has been attained.

Several additional MATCH situations are discussed subsequently in the specification under the heading Additional Match Situations And Lamp Controls.

*WRONG response or delayed response by attendant*

It will now be assumed that in the above instance the attendant responded incorrectly, that is, operated the wrong key, and it will be further assumed that the response, though incorrect, was made within the prescribed interval.

For purposes of present description it will be assumed that the attendant in response to the lighting of lamp 113 at console 106 (FIG. 1) instead of depressing key 114 (the "right key") depressed key 115, the "wrong key." Closing of Coin Return Key 1505 (FIG. 15) corresponding to key 115 (FIG. 1) operates relay 15CRK from the ground on lead 1502, the break contacts of Ring Back key 1503 and Ring Fwd key 1504, the make contact of Coin Return key 1505, winding of relay 15CRK to battery. Relay 15CRK, operated, closes through its 15CRK–1(17) make contact an operate path for relay 17DL1.

A path is now closed from the ground on lead 1601, make contact 15CRK–2(16), the break contact of transfer pair 13CR–1(16), lead 1605, break contacts 16RK–2(16) and 3MC–6(16), winding of relay 16WK to battery. Relay 16WK (wrong key) operates and locks to ground through its 16WK–2(16) make contact and make contacts 60N–3(16) and 3ETP1–4(16). (The proper MATCH relay for Coin Return key 1505 and relay 15CRK is relay 13CR, and it will be apparent that in the event relay 13CR has been operated then an operate path for the Right Key relay 16RK would have been completed through the make contact of transfer pair 13CR–1(16) of relay 13CR.)

Figure 32:
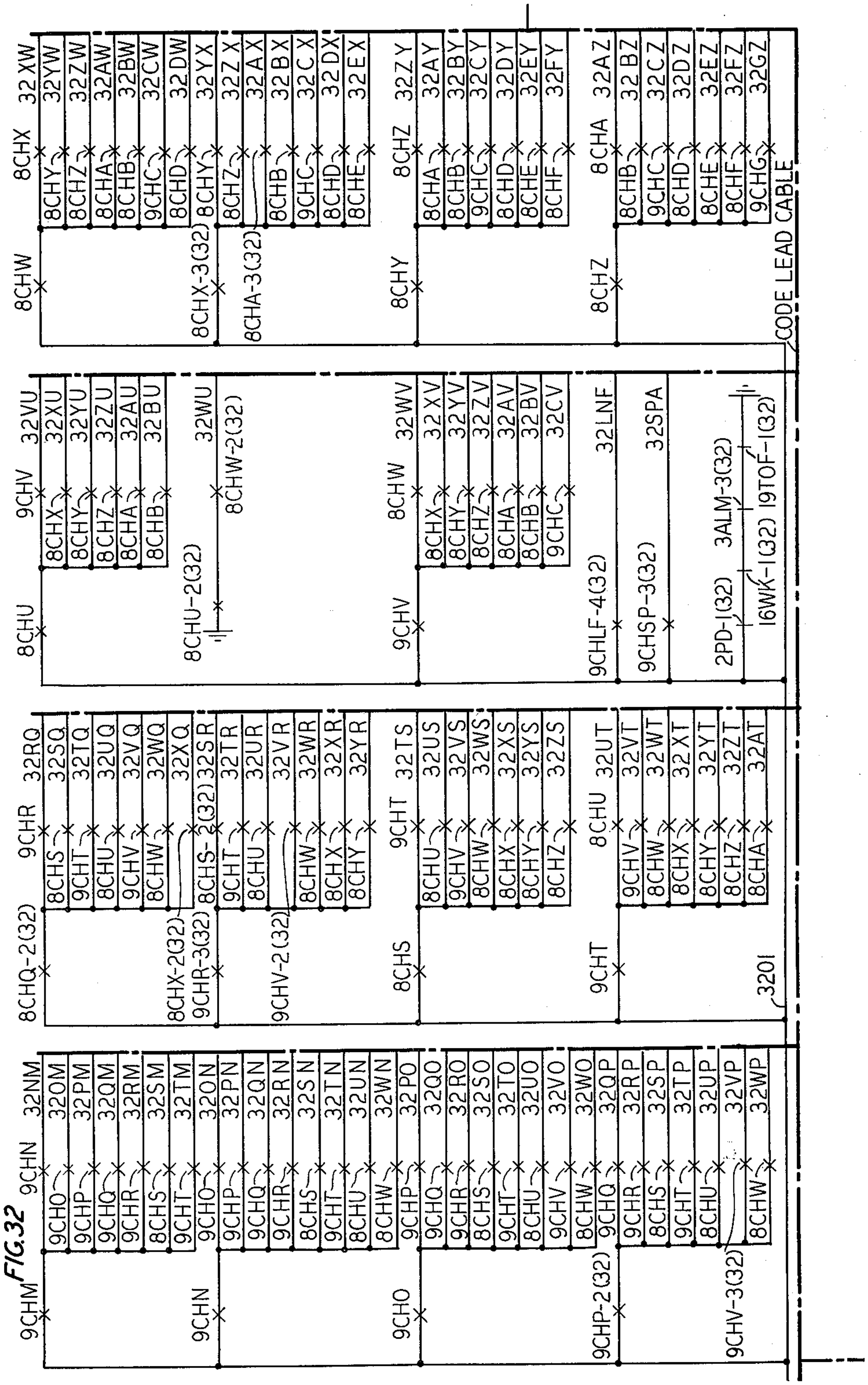
FIG. 32 shows another portion of the code leads, some of which are shown in FIG. 11, together with the controlling contacts of the various character relays.
Figure 33:
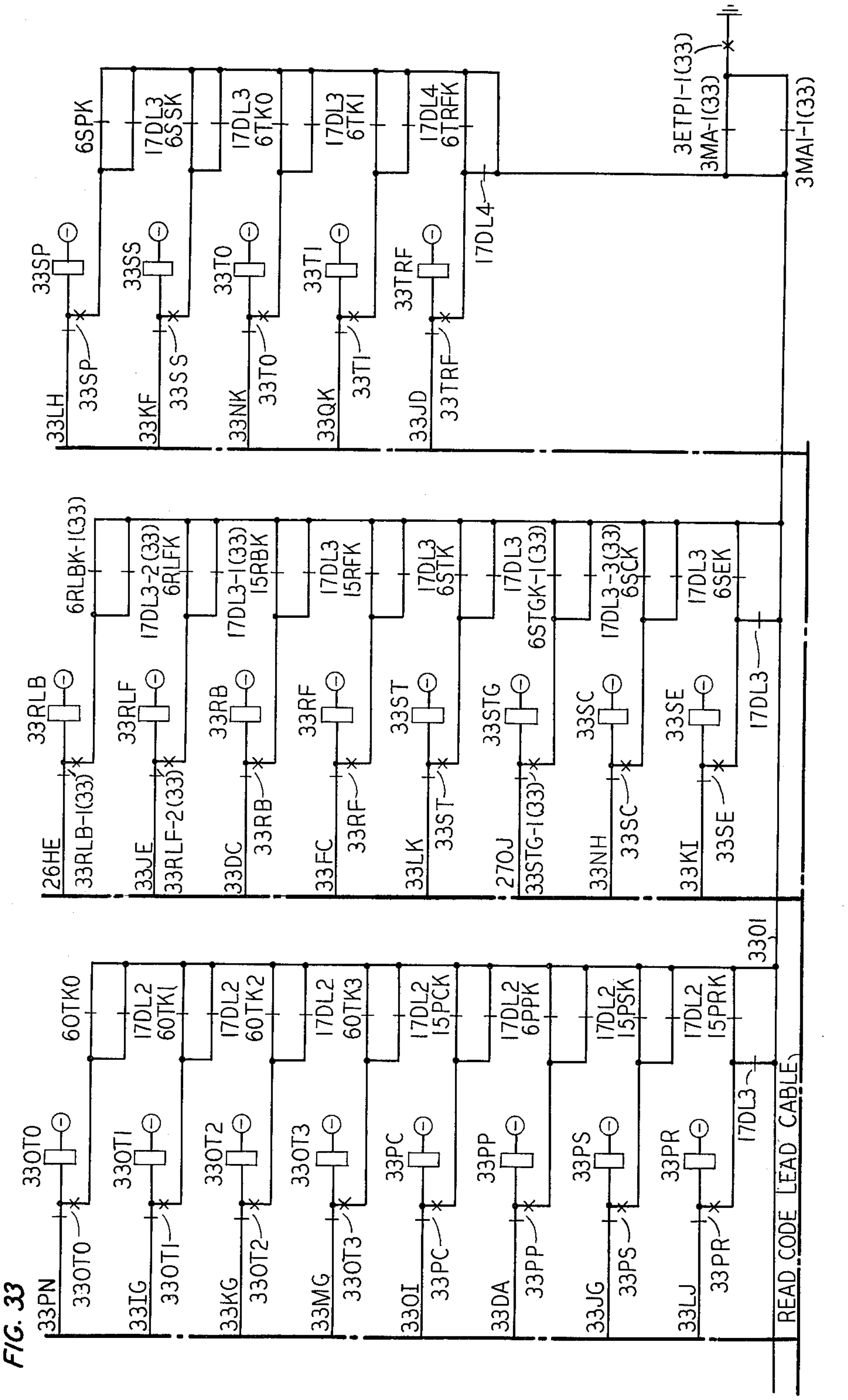
FIG. 33 shows additional WRITE relays.
Figure 34:
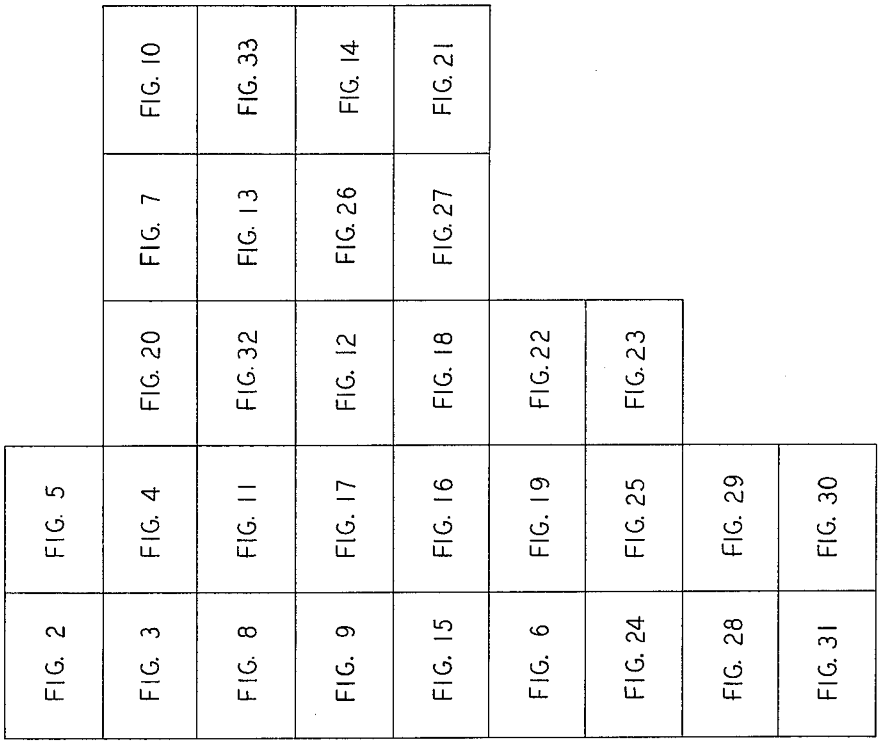
FIG. 34 shows the manner in which the various figures should be arranged to show the specific illustrative embodiment of the invention.

Relay 16WK, operated, removes at its break contact 16WK–1(32) ground from all the code leads except code lead 32WU (FIG. 32). Also, relay 16WK, operated, opens at its break contact 16WK–4(2) start lead 203 to clutch magnet 205 whereby to prevent the reader tape (105, FIG. 1) from advancing, completes at its make contact 16WK–5(29) a path for operating Wrong Key Failure register 29WKR corresponding to register 121, FIG. 1, completes at its 16WK–6(29) make contact a path for lighting "Failure" lamp 2901, corresponding to lamp 128 at console 106 (FIG. 1), and completes at its make contact 16WK–7(29) a path to interrupter 3006 for "flashing" Failure lamp 2902, corresponding to lamp 126, FIG. 1.

The remainder of the specific program involved is thereby cancelled. When the attendant then closes her ADVANCE key, both the magnetic tape and the teletypewriter tapes are advanced to the next program in the manner prevailing at the start of the test as described above. When the tape reader reaches the end of the cancelled program on the tape, character relays 8CHW and 8CHU of the translator circuit are operated whereby to momentarily apply ground to code lead 32WU (FIG. 32) through their respective make contacts 8CHW–2(32) and 8CHU–2(32). This ground, in turn, is connected through code lead 32WU and the code lead cable to relay 3ETP, which operates. Relay 3ETP, operated, releases relay 3ETP1, which was previously operated from ground through make contact 3PO–4(3), and break contact 3ETP–3(3). Relay 3ETP1, released, releases any operated code relay (WRITE or READ) and opens at its make contact 3ETP1–4(16) the holding path for relay 16WK, which releases. Relay 16WK, released, releases register 29WKR and extinguishes Failure lamps 2901 and 2902. The system now proceeds into the next program.

For purposes of further description, it will now be assumed that the attendant's "response," whether correct or incorrect, is not made within the period of time allotted by the program to the particular "problem" involved. As pointed out above, an important feature of our invention is that different permissible periods of time for the attendant's response are provided, depending upon the nature of the specific problem presented. In the specific illustrative embodiment this feature is attained through provision of four different timing relays, 19TP1, 19TP2, 19TP3 and 19TP4. Operation of each of these four relays is effective in setting up a different timing interval, which intervals, for purposes of description, will be assumed to be 5 seconds, 10 seconds, 20 seconds and 40 seconds, respectively. The five-second interval is used unless one of the other intervals is indicated by the program, the "five second" interval relay 19TP1 being operated following operation of relay 3WR, provided no other timer relay is operated, over a path from ground, make contact 3WR–4(19) of relay 3WR and break contacts 19TP2–1(19) of relay 19TP2, 19TP3–1(19) of relay 19TP3 and 19TP4–1(19) of relay 19TP4, winding of relay 19TP1 to battery.

The other three timer relays are selectively operated as required by the program. For example, relay 19TP2 is operated when the program is such that character relays 8CHQ and 8CHX are operated. Relay 8CHQ operates from ground, break contact 7CK–1(8), make contact 2STP1–5(8), the respective make contacts of transfer pairs 2B1–3(8), 2B2–1(8), and 2B3–5(8), the break contact of transfer pair 2B4–7(8), the make contact of transfer pair 25B5–7(8), winding of relay 8CHQ to battery. Relay 8CHQ, upon operating, locks through its make contact 8CHQ–1(8) to the ground on lead 801. Relay 8CHX operates from ground, break contact 7CK–1(8), make contact 2STP1–5(8), the make contact of transfer pair 2B1–3(8), the break contact of transfer pair 2B2–1(8), the respective make contacts of transfer pairs 2B3–3(8), 2B5–3(8), and 2B4–1(8), winding of relay 8CHX to battery. Relay 8CHX operates and locks through its make contact 8CHX–1(8) to the ground on lead 801. With relays 8CHQ and 8CHX operated, the ground on lead 3201 is applied to code lead 32XQ through make contacts 8CHQ–2(32) of relay 8CHQ and 8CHX–2(32) of relay 8CHX, and applied over the code lead through the code lead cable to operate relay 19TP2. Relay 19TP2, upon operating, will lock to ground through the make contact of its transfer pair 19TP2–2(19) and make contacts 15CK–4(19) and 3ETP1–5(19). As in the instance of previously described code relays, transfer pair 19TP2–2(19) has make-before-break continuity.

In a manner similar to that just described, relay 19TP3 will be operated when transistor relays 9CHR and 8CHS are operated whereby to apply ground to code lead 32SR (FIG. 32), and relay 19TP4 will be operated when translator relays 9CHR and 9CHV are operated whereby to apply ground to code lead 32VR (FIG. 32). Relay 19TP3, when operated, will lock to the ground on lead 1901 through the make contact of its transfer pair 19TP3–2(19), and relay 19TP4, when operated, will lock to this same ground through the make contacts of its transfer pair 19TP4–2(19). Both transfer pairs 19TP3–2(19) and 19TP4–2(19) are make-before-break.

Each timer relay, when operated, sets up a particular timing interval by connecting through respective make contacts 19TP1–1(19), 19TP2–3(19), 19TP3–3(19) and 19TP4–3(19) particular combinations of the resistors 1902, 1903, 1904 and 1905 to marginal current device 1907. Device 1907 may be one of several well-known arrangements, for example it may include a capacitor and a breakdown tube which "breaks down" and conducts current after the capacitor has been charged to a certain point. In such case the charging rate would be determined by the particular RC combination set up.

It will be assumed now that, at the end of a program segment, relay 3WR operates as previously described and that operation of timer relay 19TP1 follows (no other timer relays being operated) over a path from ground, make contact 3WR–4(19) of relay 3WR, break contacts 19TP2–1(19) of relay 19TP2, 19TP3–1(19) of relay 19TP3, 19TP4–1(19) of relay 19TP4, winding of relay 19TP1 to battery. Relay 3WR, operated, also completes an operate path for "start timing" relay 3STO traced from ground, break contact of transfer pair 3MC–1(3), make contact 3WR–5(3), break contacts 16WK–8(3), 3STM1–1(3), and 4MTON–2(3), winding of relay 3STO to battery. Relay 3STO operates and connects ground through its 3STO–1(19) make contact to one side of the 19D relay and also connects, through the make contact of its transfer pair 3STO–2(19), battery to marginal current device 1907 through the particular combination of resistors determined by the timer relays.

Had the attendant responded before expiration of the time interval, that is before relay 19D operated, the release of the 15CK relay would release the 3WR relay and any operated relay in the group 19TP2, 19TP3 and 19TP4. Relay 3WR, released, would release relay 19TP1, if operated, and would also release relay 3STO, stopping the timing operation and restoring the timer to normal. In this instance, however, we are assuming that the attendant does not respond within the allotted time interval. Accordingly, at the end of the interval as determined by the particular timer relay operated, marginal current device 1907 will operate relay 19D to the ground applied through make contact 3STO–1(19) of relay 3STO. Relay 19D, upon operating, locks to battery through its make contact 19D–1(19) and resistor 1908. Relay 19D, operated, completes at its 19D–2(19) make contact an operate path for "time out failure" relay 19TOF which operates and locks to ground through its 19TOF–2(19) make contact and make contact 3ETP1-6-(19) of relay 3ETP1.

Relay 19TOF, operated, closes a path at its make contact 19TOF–3(29) for operating time-out register 29TOFR (which corresponds to register 123, FIG. 1), whereby to "score" a "time out failure." Also, relay 19TOF, upon operating, completes a path at the make contact of its transfer pair 19TOF–4(29) and at its make contact 19TOF–5(29) for "flashing" lamp 2901 (corresponding to lamp 128, FIG. 1) from interrupter 3006 as an indication to the attendant of time-out failure and also completes at its make contact 19TOF–6(29) a circuit for flashing lamp 2903 (corresponding to lamp 127, FIG. 1) as an indication to the instructor or supervisor of the time-out failure. Also relay 19TOF, operated, removes at its break contact 19TOF–1(32) ground from all the code leads except code lead 32WU (FIG. 32), and opens clutch magnet lead 203 at break contact 19TOF–8(2) whereby to prevent the reader tape from advancing.

The attendant, observing the flashing lamp 2901, closes her Advance Key which results in operations described above which cause the program tapes to advance into the next program. When the tape reader reaches the end of the cancelled program, relay 3ETP is operated as above described. Relay 3ETP releases relay 3ETP1, at break contact 3ETP–3(3) which, in turn, releases all operated code relays (READ and WRITE), and opens at its make contact 3ETP1–6(19) the holding path for relay 19TOF which releases. Relay 19TOF, released, releases the "time and failure" register 29TOFR, and extinguishes flashing lamps 2901 and 2903.

*Voice detector—Audible response by attendant*

As previously pointed out, in some instances the program may require that a correct response by the attendant must include an audible response spoken into microphone 131 (FIG. 1).

Figure 11:
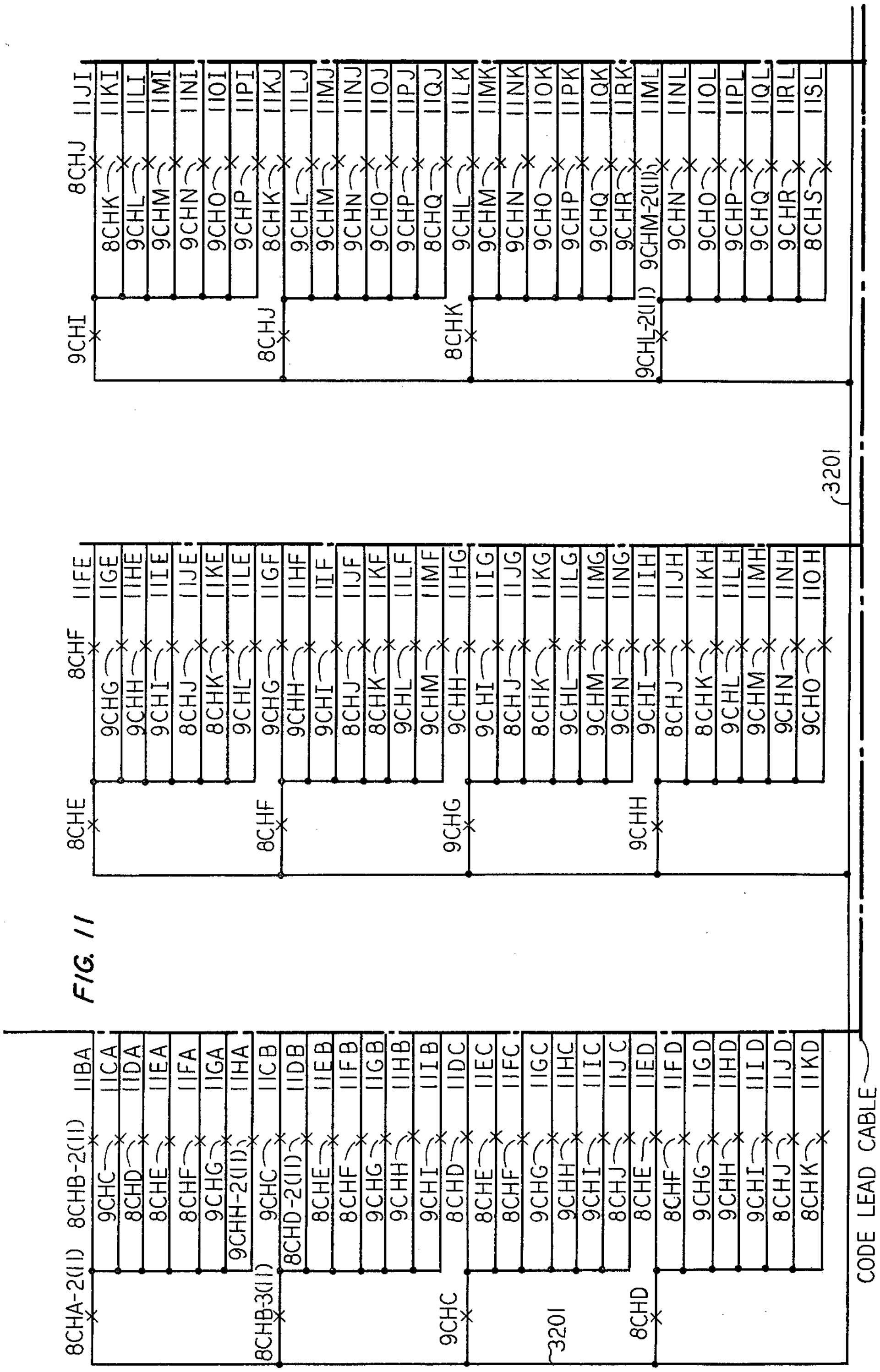
FIG. 11 shows a portion of the code leads together with the controlling contacts of the various character relays.
Figure 12:
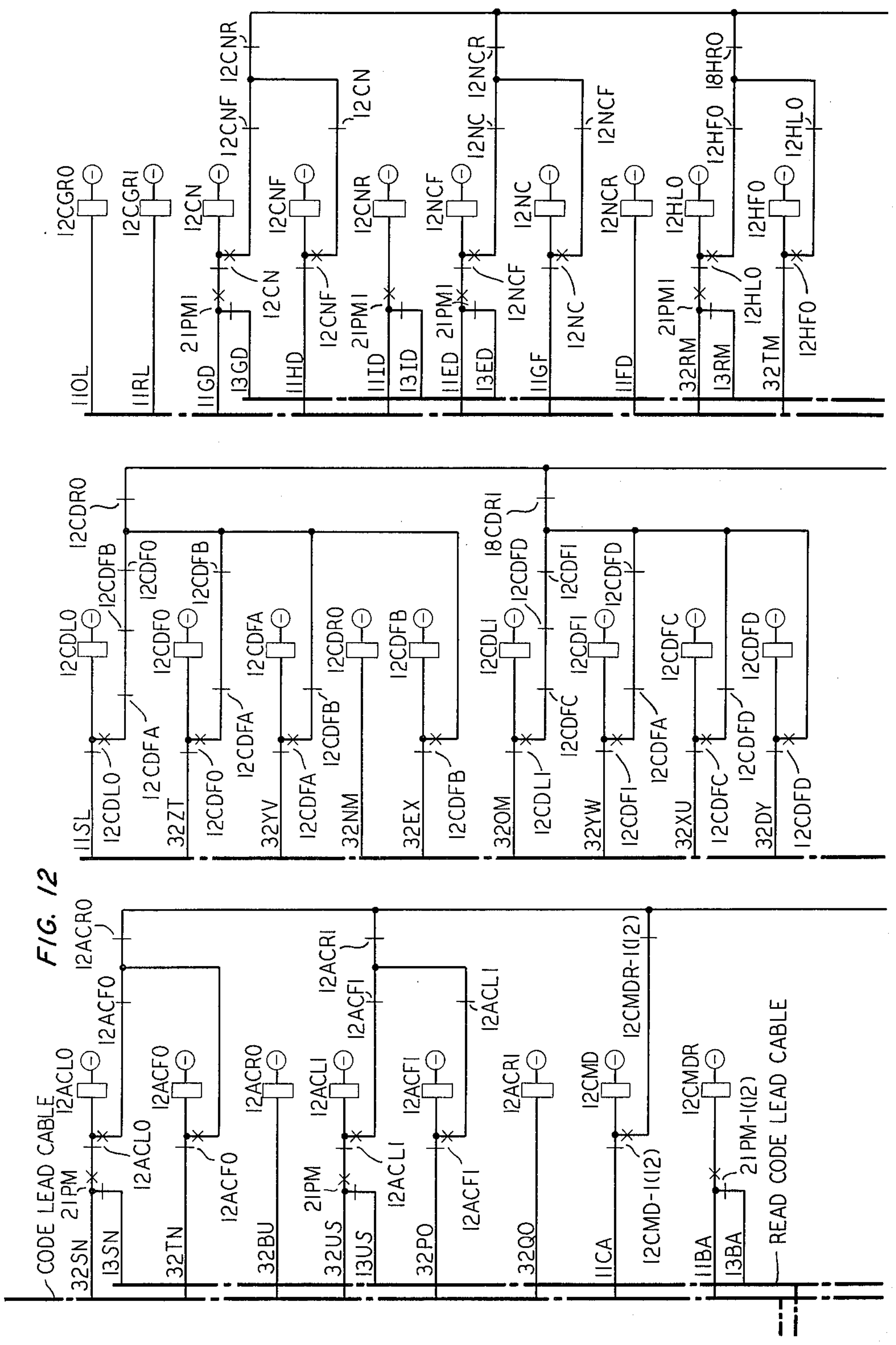
FIG. 12 shows certain of the WRITE code relays.
Figure 13:
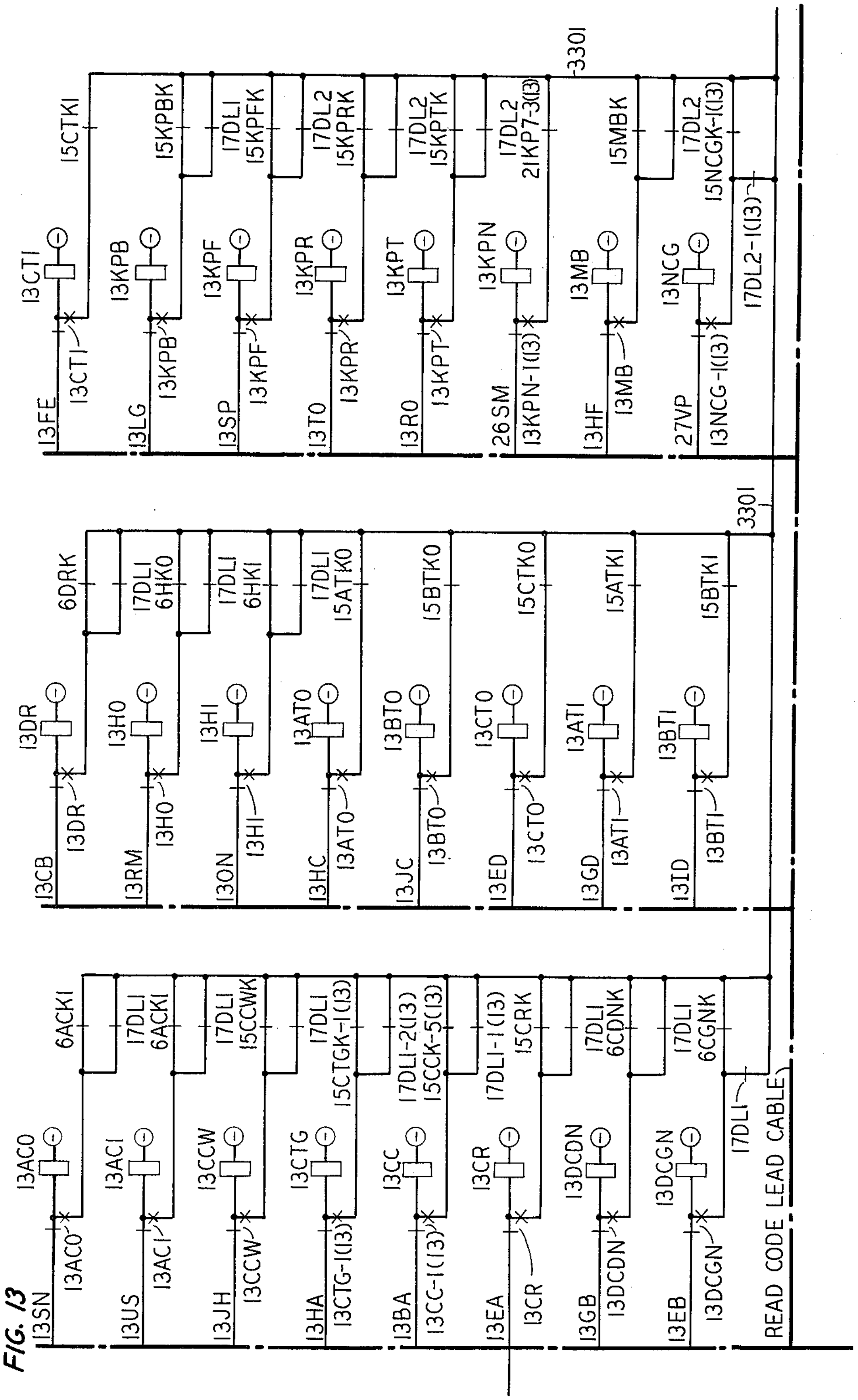
FIG. 13 shows certain of the READ code relays.
Figure 14:
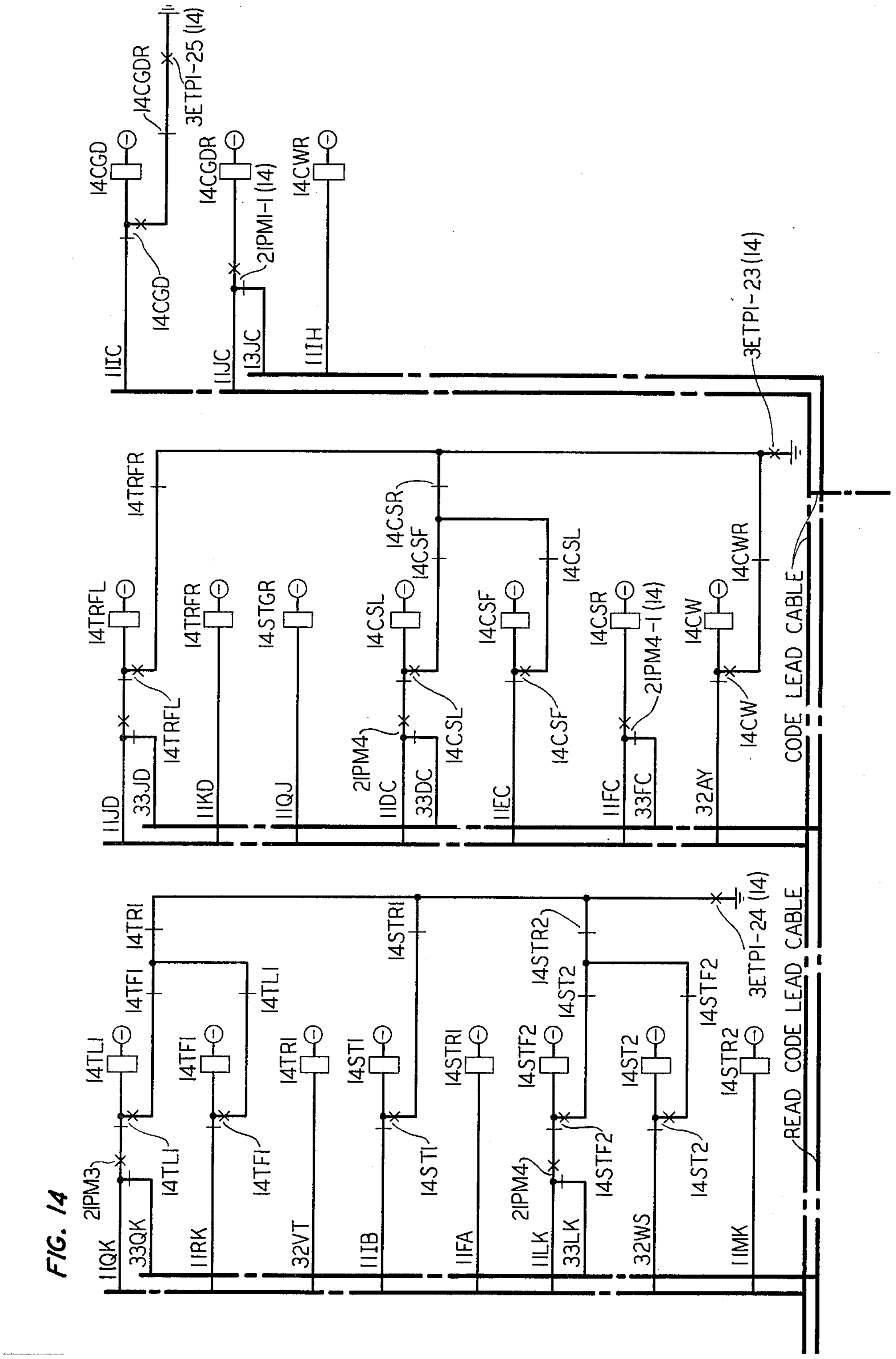
FIG. 14 shows additional code relays, both READ and WRITE.
Figure 15:
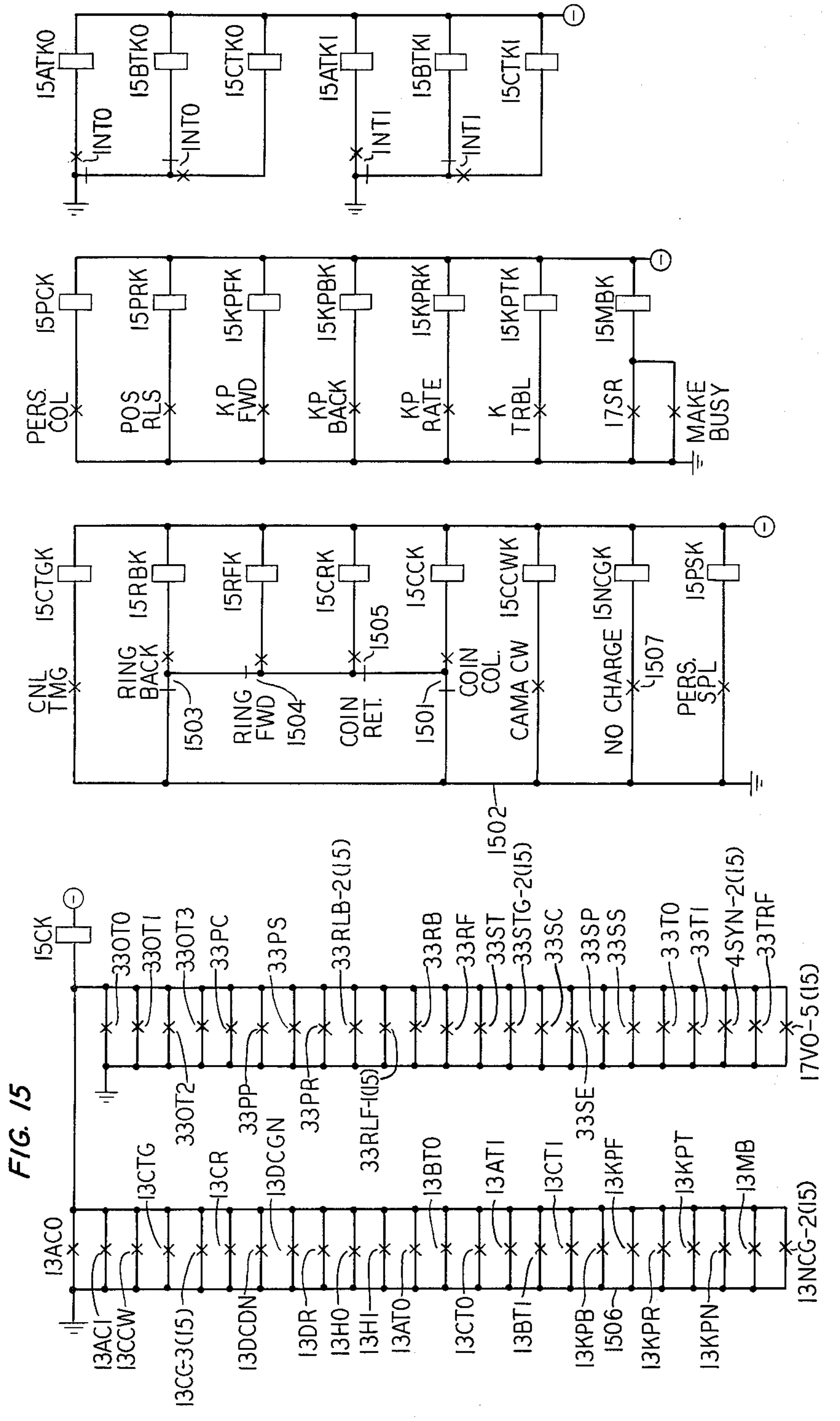
FIG. 15 shows a CHECK relay circuit together with additional position key and relay circuits.
Figure 16:
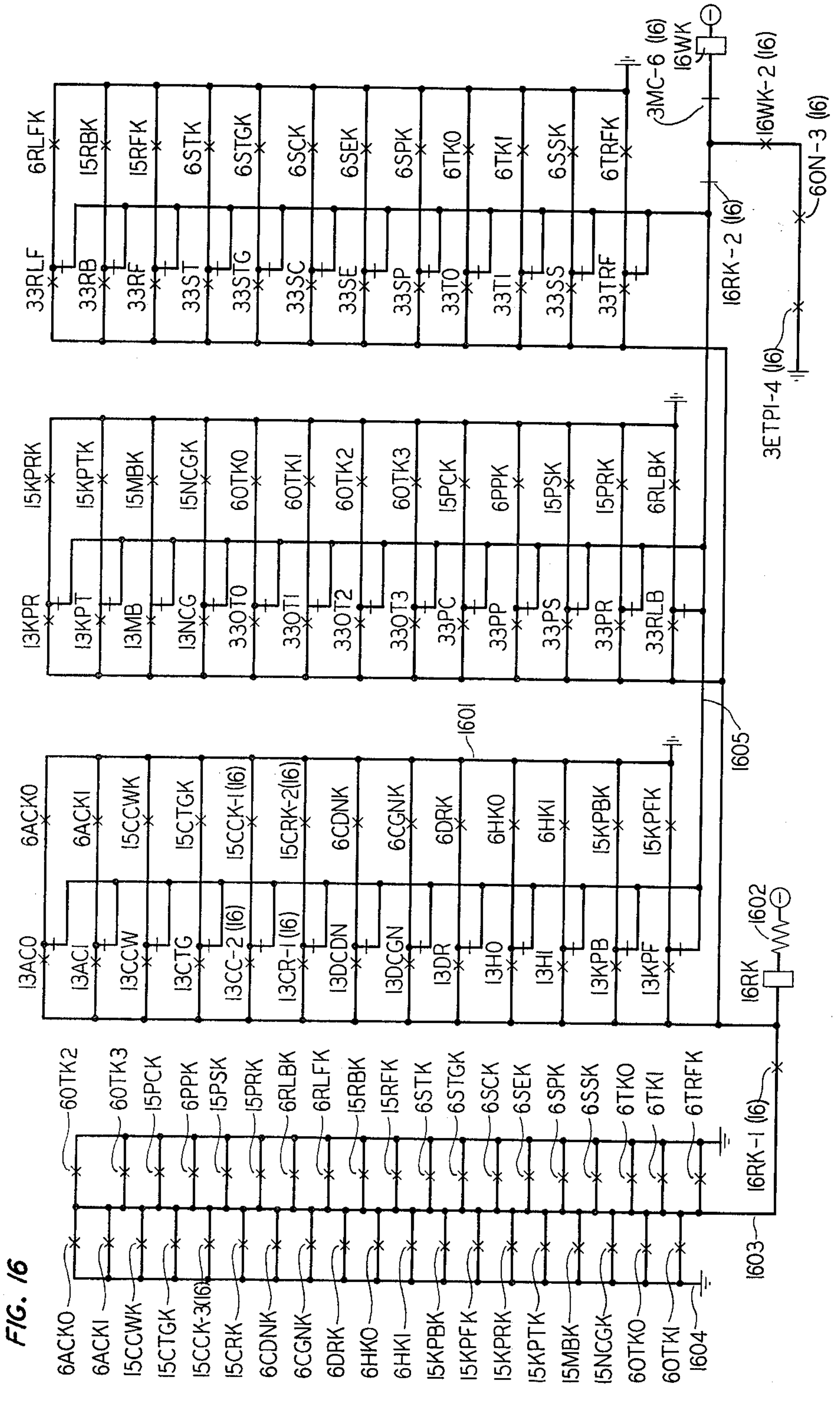
FIG. 16 shows particularly the circuits of the RIGHT KEY relay and the WRONG KEY relay.
Figure 17:
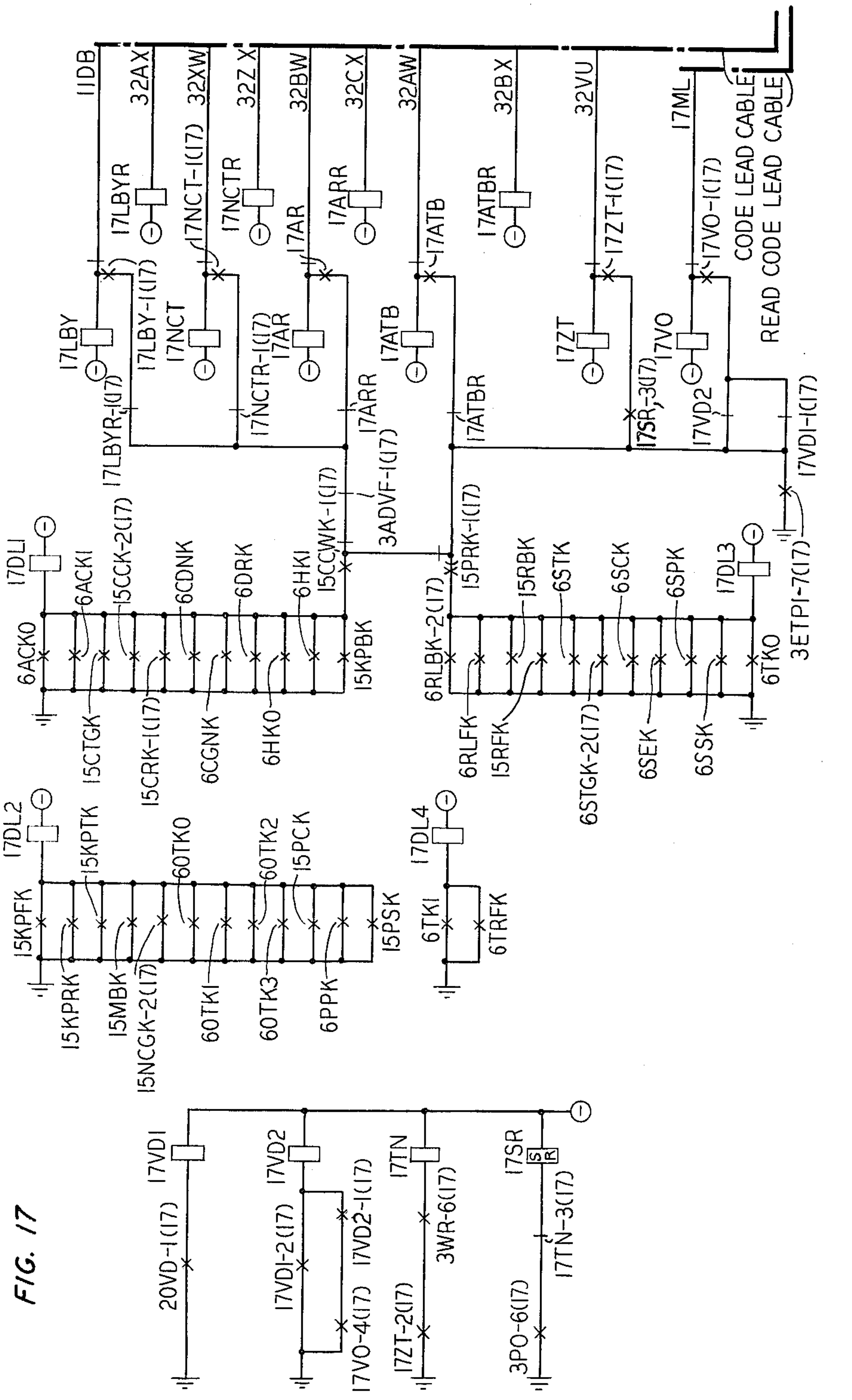
FIG. 17 shows particularly the circuits of the four DELAY relays together with certain code relays involved in application of tones.

When the program requires that a proper response by the attendant include audible response, translator relays 9CHL and 9CHM will be operated whereby to connect the ground on lead 3201 to code lead 11ML (FIG. 11). This ground over the code lead through the cable operates MATCH relay 17VO which locks to ground through the make contact of its transfer pair 17VO–1(17), break contact 17VD1–1(17) and make contact 3ETP1–7(17). Transfer pair 17VO–1(17) is make-before-break continuity. Relay 17VO, operated, completes at its make contact 17VO–5(15) an operate path for relay 15CK and also connects the voice detector circuit (FIG. 20) to the attendant's telephone circuit 2000 through make contacts 17VO–2(20) and 17VO–3(20). As previously pointed out, relay 3PO operates when the attendant's telephone set is plugged into the associated telephone jacks so that, with this condition, battery is connected to the detector circuit through resistor 2001 and make contact 3PO–5(20) of relay 3PO. With no speech present on the line, transistor 20Q2 will switch to "ON" and operate relay 20VD.

Relay 20VD, operated, completes at its make contact 20VD–1(17) an operate path for relay 17VD1 which operates and, in turn, operates relay 17VD2 through make contact 17VD1–2(17). A holding path for relay 17VD2 through its make contact 17VD2–1(17) is controlled by make contact 17VO–4(17) of relay 17VO.

Transistor 20Q1, resistors 20R1, 20R2 and 20R3, and capacitor 20C1 comprise an amplifier which will amplify only negative portions of speech and invert them to positive voltages. Accordingly, when the trainee speaks into microphone 2002, corresponding to microphone 131, FIG. 1, transistor 20Q1 conducts and the normal −24 volt potential on the base swings toward ground. This change of potential is coupled to transistor 20Q2 through capacitor 20C2 and diode 20CR1 then to the base of transistor 20Q2. The base of transistor 20Q2 is thus driven positive with respect to the emitter and is switched to "OFF" releasing relay 20VD. Relay 20VD, released, opens at its 20VD–1(17) make contact the operate path of relay 17VD1. Relay 17VD1 releases and relay 17VO now holds through the break contact 17VD1–1(17) of relay 17VD1, released.

When transistor 20Q2 turns OFF, the potential at the collector changes by a substantial amount, depending upon the particular circuit characteristics, thus changing the potential on the upper side of capacitor 20C3 by an equal amount. The other side of the capacitor immediately changes by the same amount but instantaneously starts to discharge at a rate determined by resistor 20R5 in series with the winding of relay 20VD and capacitor 20C3. Since capacitor 20C3 is across the base and collector electrodes of transistor 20Q2 the collector-base diode 20CR3 is held back-biased until capacitor 20C2 has discharged. Capacitor 20C4 is provided to accumulate the small interval charges resulting from the individual negative spikes of voice currents and hold the base of transistor 20Q2 positive with respect to the emitter long enough to complete the switching operation.

When the speech ends and capacitor 20C3 has discharged, transistor 20Q2 will again turn ON, operating relay 20VD which, in turn, operates relay 17VD1. Relay 17VD1, operated, opens the holding path of relay 17VO, which releases. Relay 17VO, released, releases at its make contact 17VO–5(15) check relay 15CK to complete a successful "MATCH" as above described.

Resistors 20C and 20D connected between the transmitting and receiving pairs of conductors (FIG. 20) provide side tone to the trainee while she is talking.

It will be understood that the operation just described is subject to the timing steps previously described and that time-out registration occurs as before described if the permissible interval is exceeded. If it be considered desirable to give more than a "presence test" for the verbal response, that is, to check the actual correctness of the words spoken, this may be accomplished by the instructor "listening-in" on the circuit.

*Application of tones and voice*

When the program requires the application of tones to the telephone circuit (FIG. 20) corresponding code relays will be operated whereby to connect the respective tones from suitable source 2003 over leads 2004 and 2005 to the telephone circuit. For example, when the application of "line busy" tone is required, character relays 8CHB and 8CHD are operated whereby to apply the ground on lead 3201 through make contacts 8CHB–3(11) and 8CHD–2(11) to code lead 11DB and thence through the code lead cable to operate relay 17LBY. Relay 17LBY, upon operating, locks to ground through the make contact of transfer pair 17LBY–1(17), break contacts 17LBYR–1(17) and 3ADVF–1(17), break contact of transfer pair 15CCWK–1(17), break contact of transfer pair 15PRK–1(17) and make contact 3ETP1–7(17). Also, relay 17LBY, upon operating, connects the respective tone from source 2003 to the telephone circuit through make contacts 17LBY–3(20) and 17LBY–2(20) and respective leads 2004 and 2005. When the line busy tone is to be removed, relay 17LBYR is operated over code lead 32AX, FIG. 32, make contacts 8CHX–3(32) of relay 8CHX and 8CHA–3(32) of relay 8CHA whereby to open at break contact 17LBYR–1(17) the hold path of relay 17LBY.

Similarly, when the program requires the application of "no circuit" tone, relay 17NCT is operated over code lead 32XW and locked over a path including the make contact of its transfer pair 17NCT–1(17) and break contact 17NCTR–1(17) of relay 17NCTR; relay 17NCT is released by operation of relay 17NCTR over code lead 32ZX. When relay 17NCT is operated the respective tone from source 2003 is applied through make contacts 17NCT–2(20) and 17NCT–3(20) to leads 2004 and 2005. As in the instances of previously discussed code relays, transfer pair 17NCT–1(17) has make-before-break continuity.

In the general manner discussed above, "audible ringing" tone is applied by operating relay 17AR over code lead 32BW and "all trunks busy" tone by operating relay 17ATB over code lead 32AW. When relay 17AR is operated the respective tone from source 2003 is applied through make contacts 17AR–1(20) and 17AR–2(20) and when relay 17ATB is operated the respective tone from source 2003 is applied through make contacts 17ATB–1(20) and 17ATB–2(20).

When the program requires that so-called "Zip Tone" be transmitted to the trainee (at the beginning of every call) relay 17ZT is operated over code lead 32VU and locks to ground through the make contact of transfer pair 17ZT–1(17) and make contacts 2SR–3(17) and 3ETP1–7(17). When relay 3WR operates at the end of the segment, and with relay 17ZT operated, a path is completed through make contacts 3WR–6(17) of relay 3WR and 17ZT–2(17) of relay 17ZT for operating relay 17TN. Relay 17TN, operated, connects continuous tone from source 2003 to the telephone line through make contacts 17TN–1(20) and 17TN–2(20), and releases at its break contact 17TN–3(17) slow-to-release relay 17SR (which operated through make contact 3PO–6(17) of relay 3PO at the time the attendant's telephone circuit was closed). Relay 17SR, released, opens at its make contact 17SR–3(17) the holding path for relay 17ZT, which releases and releases, in turn, relay 17TN. Relay 17TN, released, removes the tone from the attendant's telephone circuit and recloses the operate path of relay 17SR.

The program may also require the application to the attendant's telephone circuit of simulated coin deposit signals, and gongs 20A and 20B (FIG. 20) are provided for this purpose. If the amount, the deposit of which is to be simulated, is below 25 cents, code lead 32CW (FIG. 32) will be grounded once for each 5 cents and if the amount is 25 cents or multiple thereof, code lead 32YX is grounded once for each 25 cent deposit to be simulated. In the manner previously described above, code lead 32CW is grounded from lead 3201 when character relays 8CHW and 9CHC are operated under control of the program tape and code lead 32YX is grounded when character relays 8CHX and 8CHY are operated.

When code lead 32CW is grounded, relay 21V operates. Relay 21V, operated, completes at its make contact 21V–1(20) an operate path for relay 20VA and also closes paths at its make contacts 21V–2(20) and 21V–3(20) for connnecting the gong tone pick-up circuit through to leads 2004 and 2005 for connection to the attendant's telephone circuit.

Relay 20VA, operated, closes at its make contact 20VA–1(20) an energizing path for gong 20A. The signal produced by gong 20A is picked up by microphone 2006 and transmitted to the attendant's telephone circuit at a volume controlled by rheostat 2007.

When relay 21XXV is operated, a path is completed at its make contact 21XXV–1(20) for operating relay 20XXVA, and paths are closed at make contacts 21XXV–2(20) and 21XV–3(20) for connecting the gong tone pick-up circuit through to the attendant's telephone circuit. Relay 20XXVA closes at its make contact 20XXVA–1(20) an energizing path for gong 20B. The signal produced by the gong is transmitted to the telephone set as above described.

With further regard to audible response and tone application discussed just above, at such time as the program requires "voice" from the magnetic tape reproducer, 103, FIG. 1, ground applied to code lead 32TQ (FIG. 32) through operation of translator relays 8CHQ and 9CHT will operate relay 4STM which, upon operating, short circuits its secondary winding at make contact 4STM–1(4) whereby to make the relay slow to release, and closes a path for operating relay 3STM1 traced from ground, make contact 4STM–2(3) of relay 4STM, break contact 4MTON–3(3) of relay 4MTON, winding of relay 3STM1 to battery. Relay 3STM1, upon operating, holds to the ground through its make contact 3STM1–2(3) and make contact 4STM–2(3) of relay 4STM. Also relay 3STM1, operated, closes leads (not shown) to start the magnetic tape.

Figure 20:
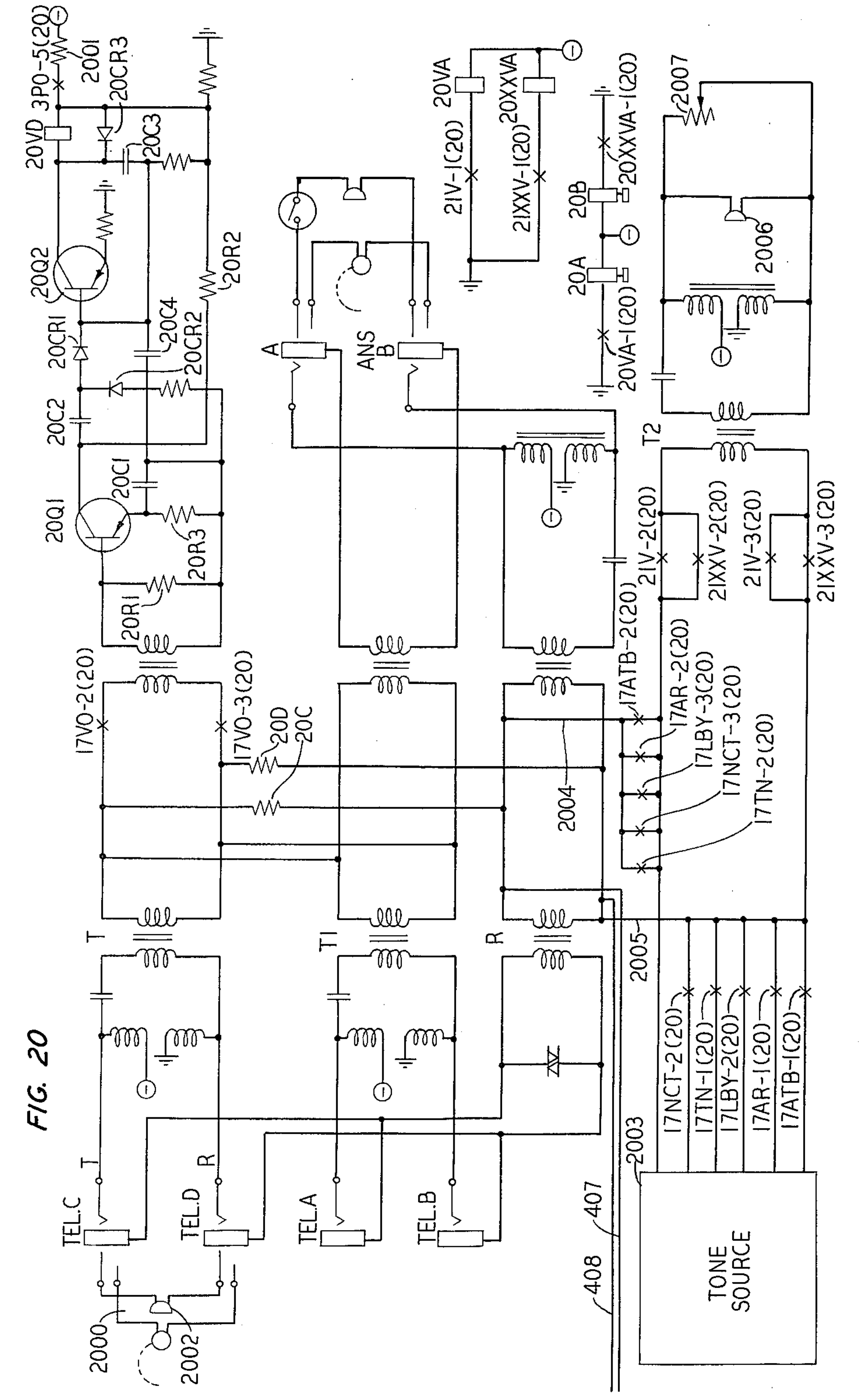
FIG. 20 shows the position telephone circuit, the voice detector, and the circuits for application and detection of tones.
Figure 21:
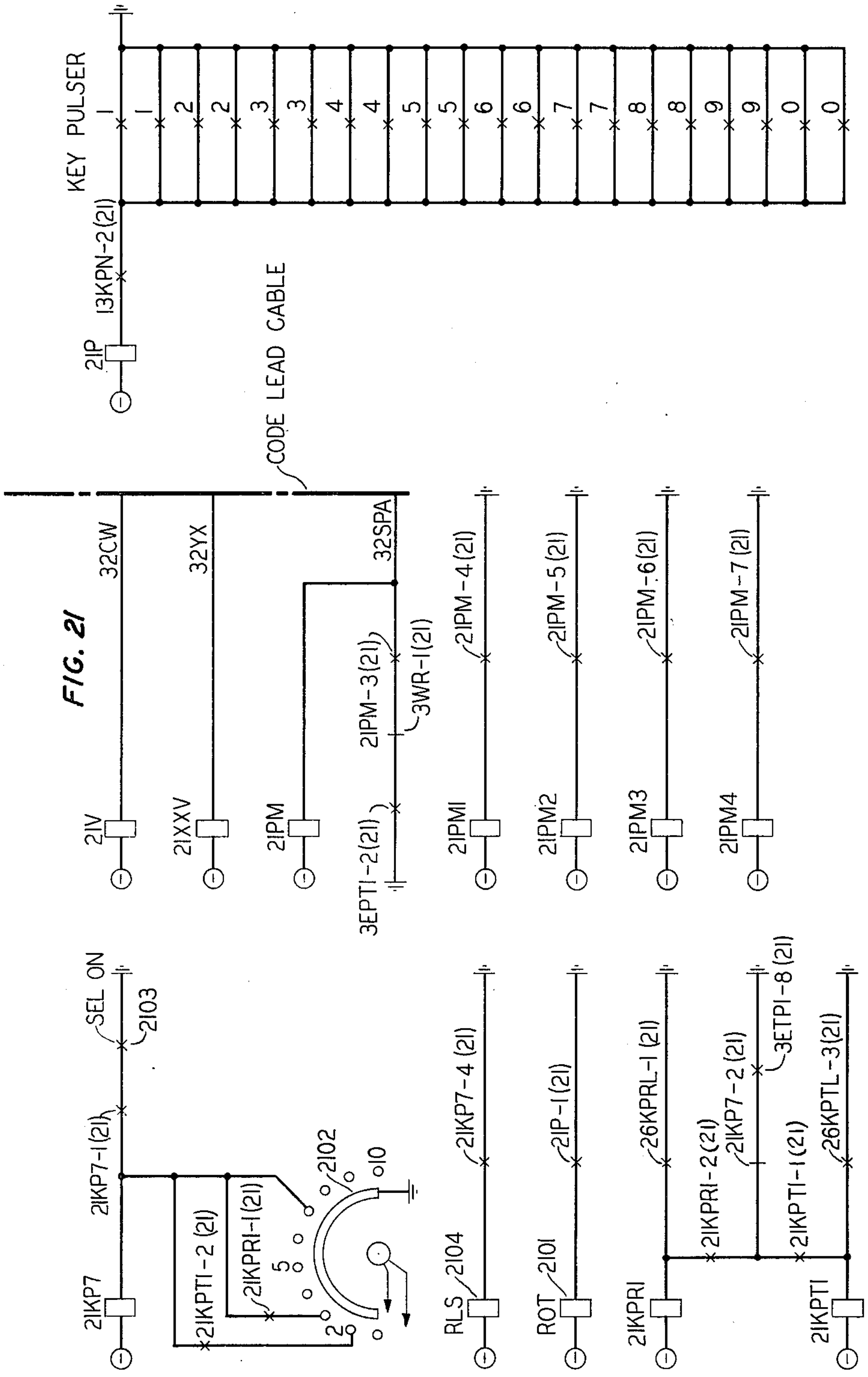
FIG. 21 shows particularly the key pulser, the key pulsing key circuit, and the PRIME relay circuits.
Figure 22:
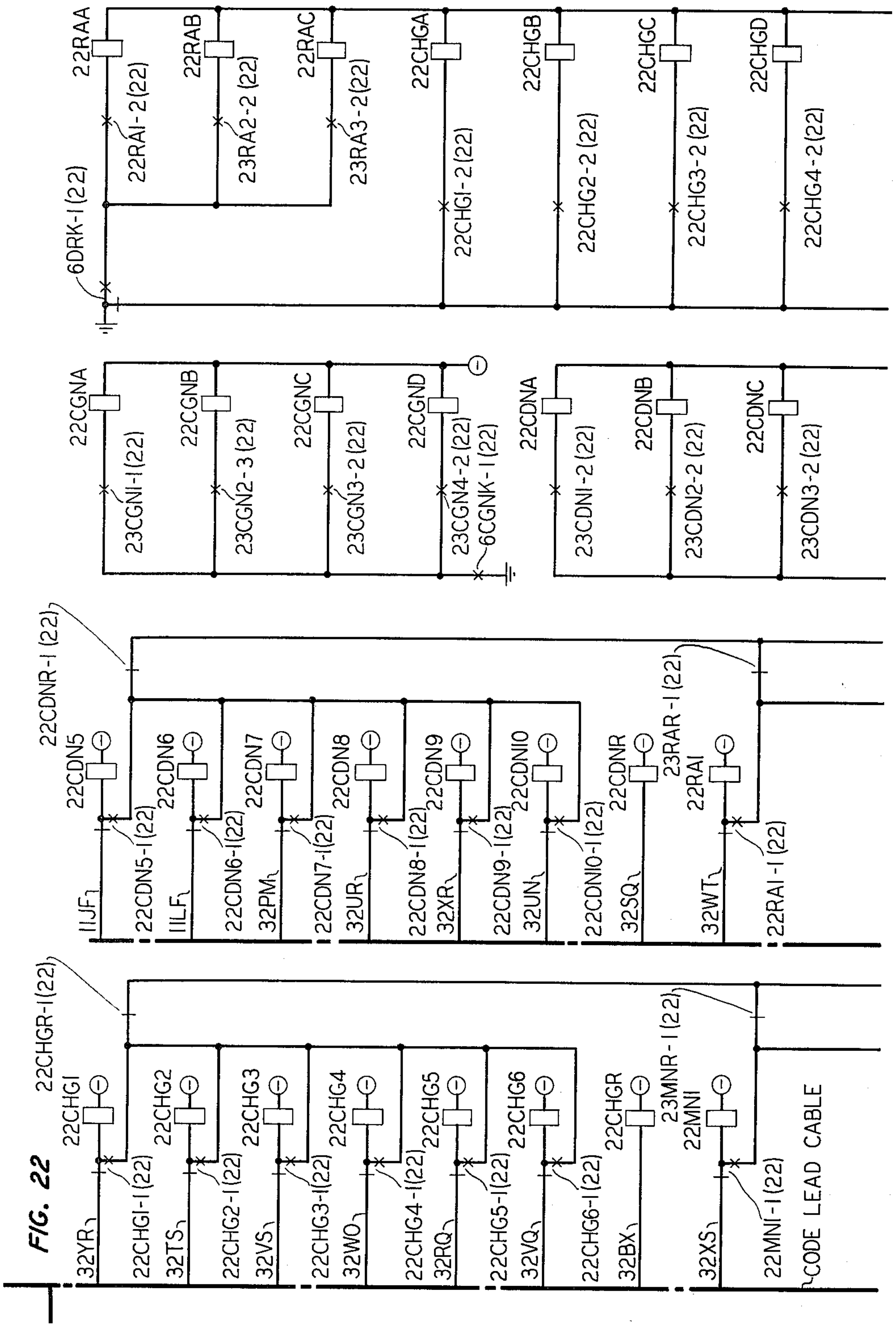
FIGS. 22 and 23 show certain of the WRITE code relays.
Figure 23:
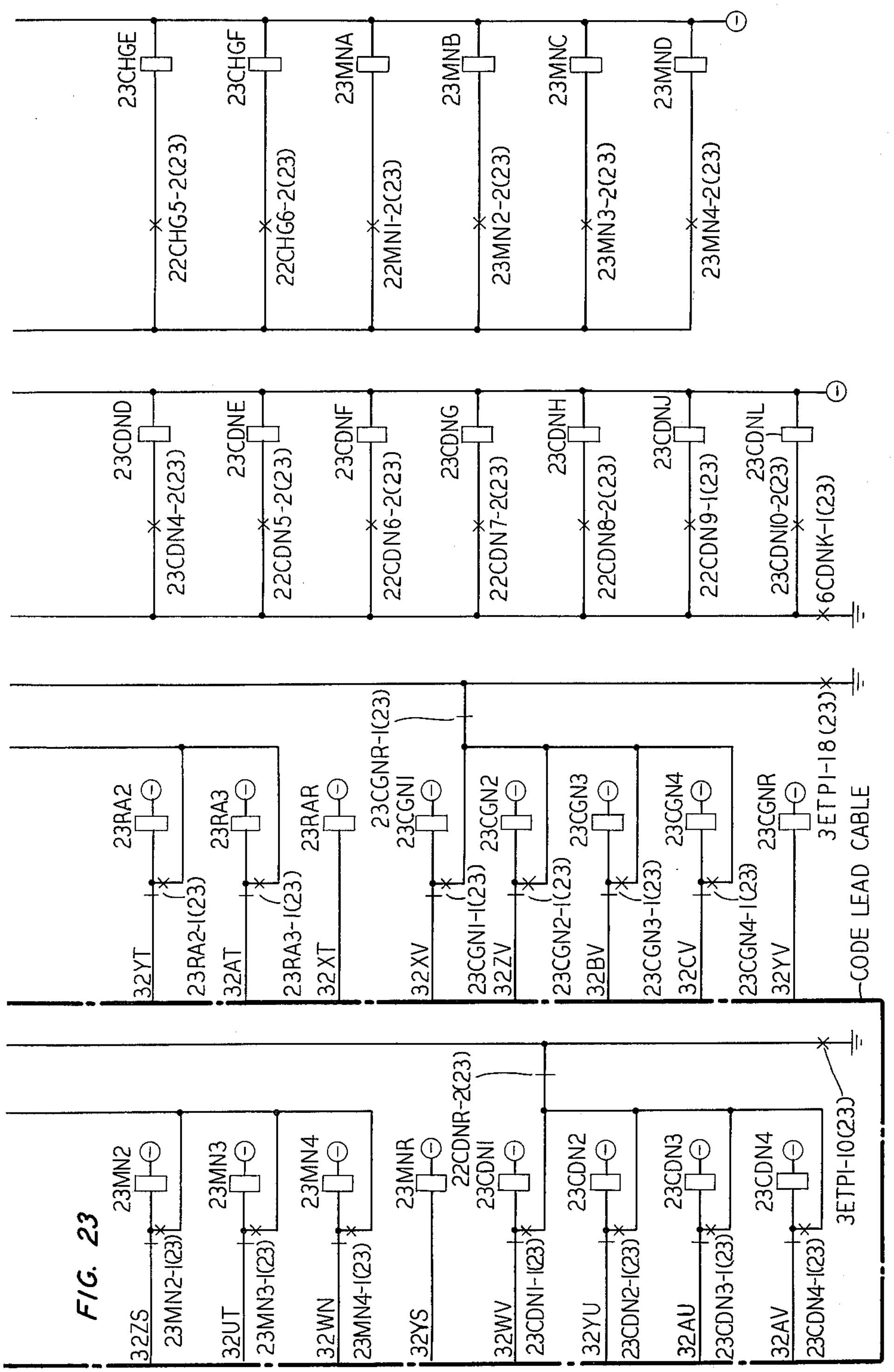

Relay 4MGT operates at this time through make contact 3STM1–4(4) to ground and closes at its make contacts 4MGT–1(4) and 4MGT–2(4) lines 407 and 408 for application of the reproduced voice to the attendant's telephone circuit (FIG. 20). (Lines 407 and 408 correspond to line 136, FIG. 1.) Relay 4MGT, upon operating, locks to ground through its own make contact 4MGT–3(4), break contacts 15PRK–2(4); 3ADVF–7(4);

15CCWK–2(4); 5SYNC–2(4); and make contact 3ETP1–9(4).

When ground is removed from code lead 32TQ as the tape reader completes transmission of the particular code, relay 4STM will release followed by release of relay 3STM1. Relay 4STM being slow to release ensures that a period ensues sufficient to make sure the magnetic reproducer is started. The magnetic tape, once started, runs to the end of the segment. If the magnetic tape has not returned to normal from a previous start at the time a second demand is transmitted, relay 4MTON will be operated through make contact 4MO–2(4) of relay 4MO. As before described, relay 4STM will be operated over code lead 32TQ. The "Hold Start" relay 5HS now operates from ground, make contacts 4MTON–4(5) of relay 4MTON and 4STM–3(5) of relay 4STM, break contact 3STM1–3(5) of relay 3STM1, winding of relay 5HS to battery. Relay 5HS, upon operating, locks to ground through its make contact 5HS–1(5) and make contact 4MTON–4(5), and completes at its make contact 5HS–2(5) an operate path for relay 5HS1. Relay 5HS1, upon operating, closes at its make contact 5HS1–1(5) a path short-circuiting its secondary winding and causing the relay to be slow to release. When ground is removed from code lead 32TQ, relay 4STM releases.

When the magnetic tape comes to rest, relay 4MTON releases (since relay 4MO releases) which, in turn, releases relay 5HS. Relay 3STM1 now operates (before slow-to-release relay 5HS1 has released) from ground, break contact 5HS–3(3) of relay 5HS, make contact 5HS1–2(3) of relay 5HS1, break contact 4MTON–3(3) of relay 4MTON, winding of relay 3STM1 to battery. Relay 3STM1, operated again starts the magnetic reproducer. When relay 5HS1 does release it releases relay 3STM1.

When a "delay period" instead of voice is desired from the magnetic tape code lead 32ZW is grounded, through operation of character relays 8CHW and 8CHZ, whereby to operate relay 4SYN, upon operating, locks to ground through its make contact 4SYN–1(4), break contact 5SYNC–1(4) of relay 5SYNC and make contact 3ETP1–9(4) of relay 3ETP1. Relay 4SYN, operated, completes a path at its make contact 4SYN–2(15) for operating relay 15CK.

Following transmission of ground on code lead 32ZW, ground is transmitted on code lead 32TQ whereby to operate relay 4STM which functions as previously described to again start the magnetic tape which now runs for the prerecorded delay period. At the end of the period, relay 5SYNC is operated following operation of relay 5S from the magnetic tape control circuit. Relay 5SYNC, operated, opens at its break contact 5SYNC–1(4) the holding path for relay 4SYN which releases. Relay 4SYN, released, releases relay 15CK, at make contact 4SYN–2(15). Relay 15CK, upon releasing, opens at its make contact 15CK–2(3) the hold path for relay 3WR, which releases and closes the start circuit for the tape reader as previously described.

*Gas filled indicator tube control*

Figure 24:
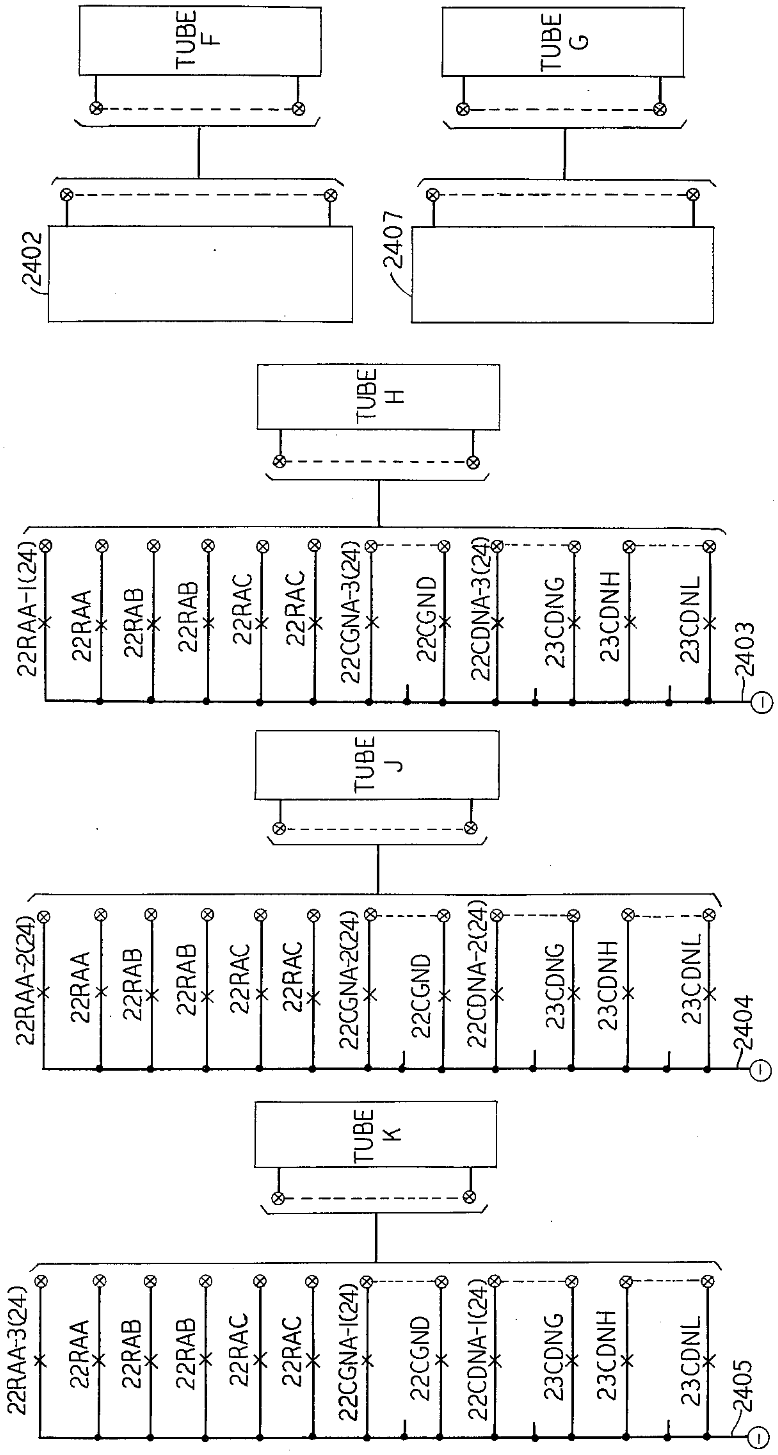
FIG. 24 and 25 shows the control circuits for the gas-filled numerical indicator tubes.
Figure 25:
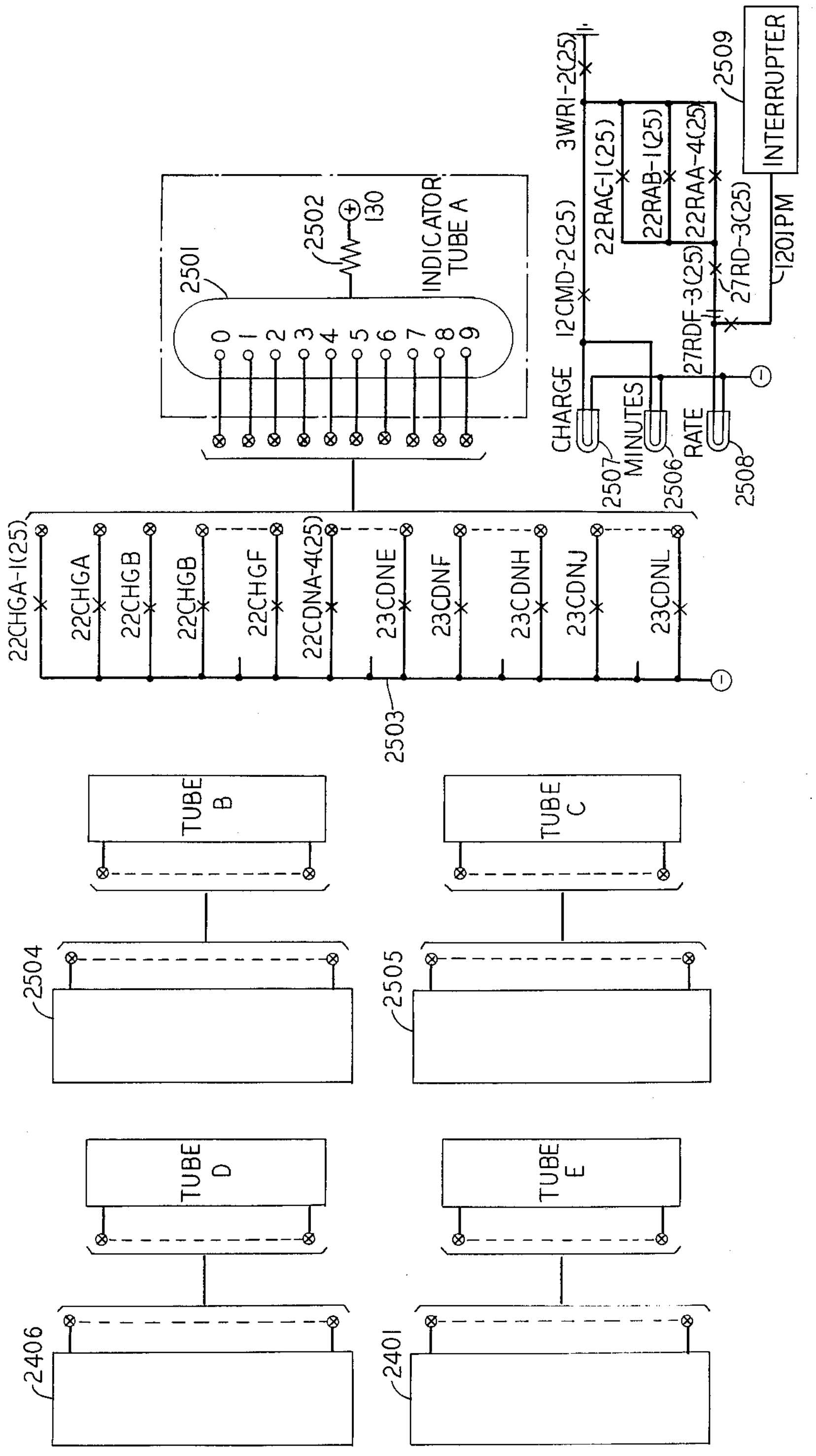
Figure 26:
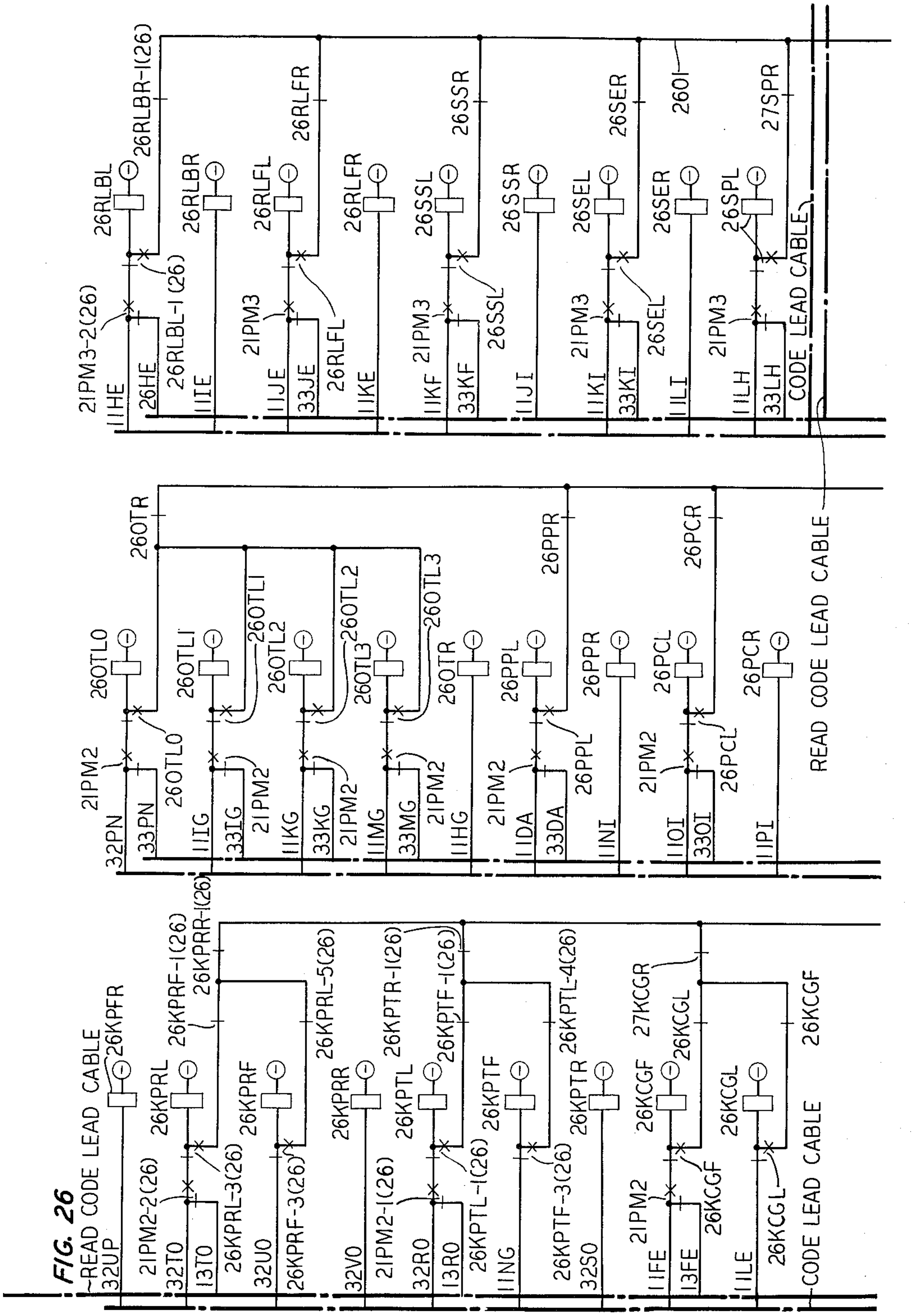
FIGS. 26 and 27 show certain of the READ code relays.
Figure 27:
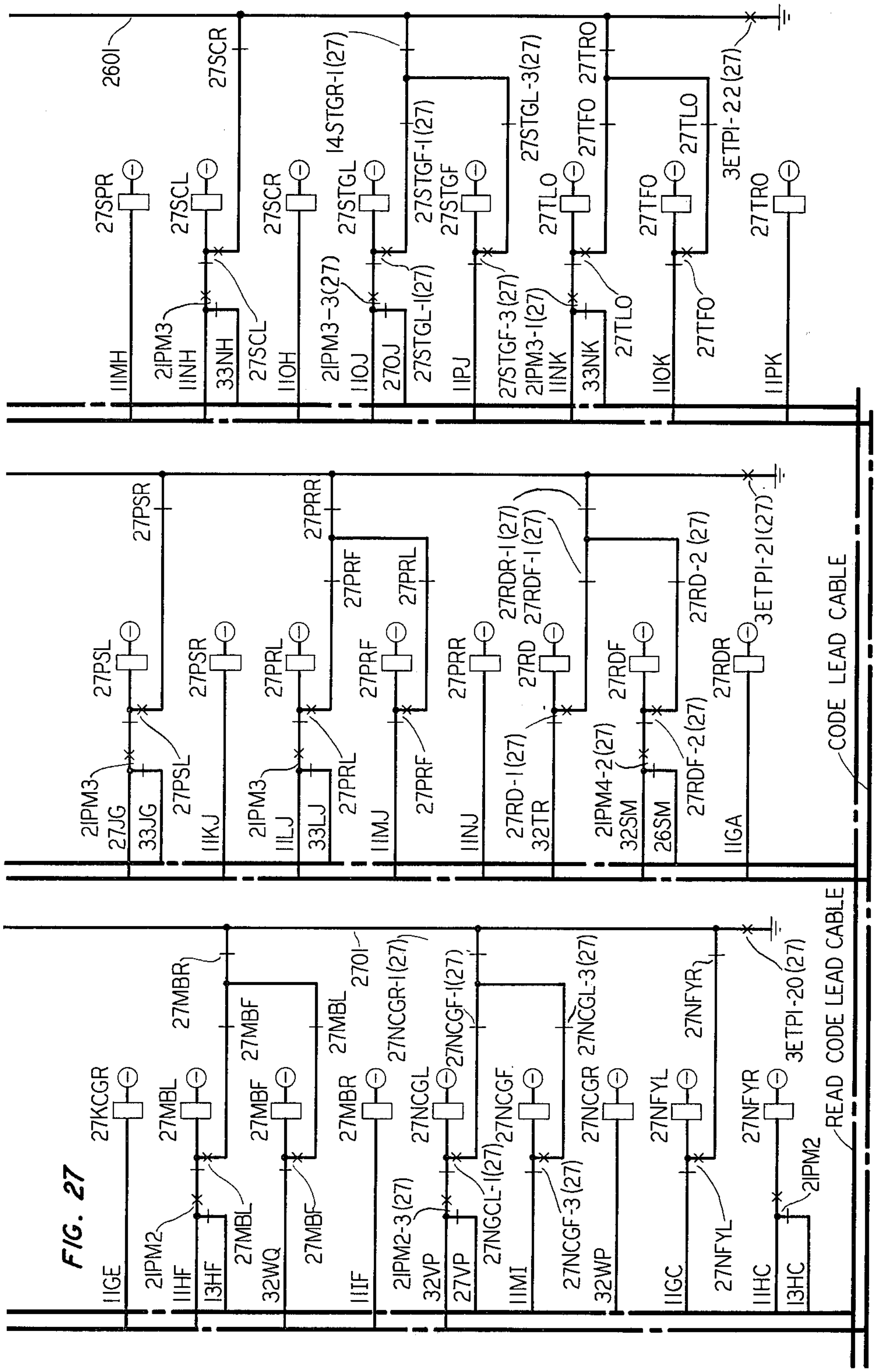
Figure 28:
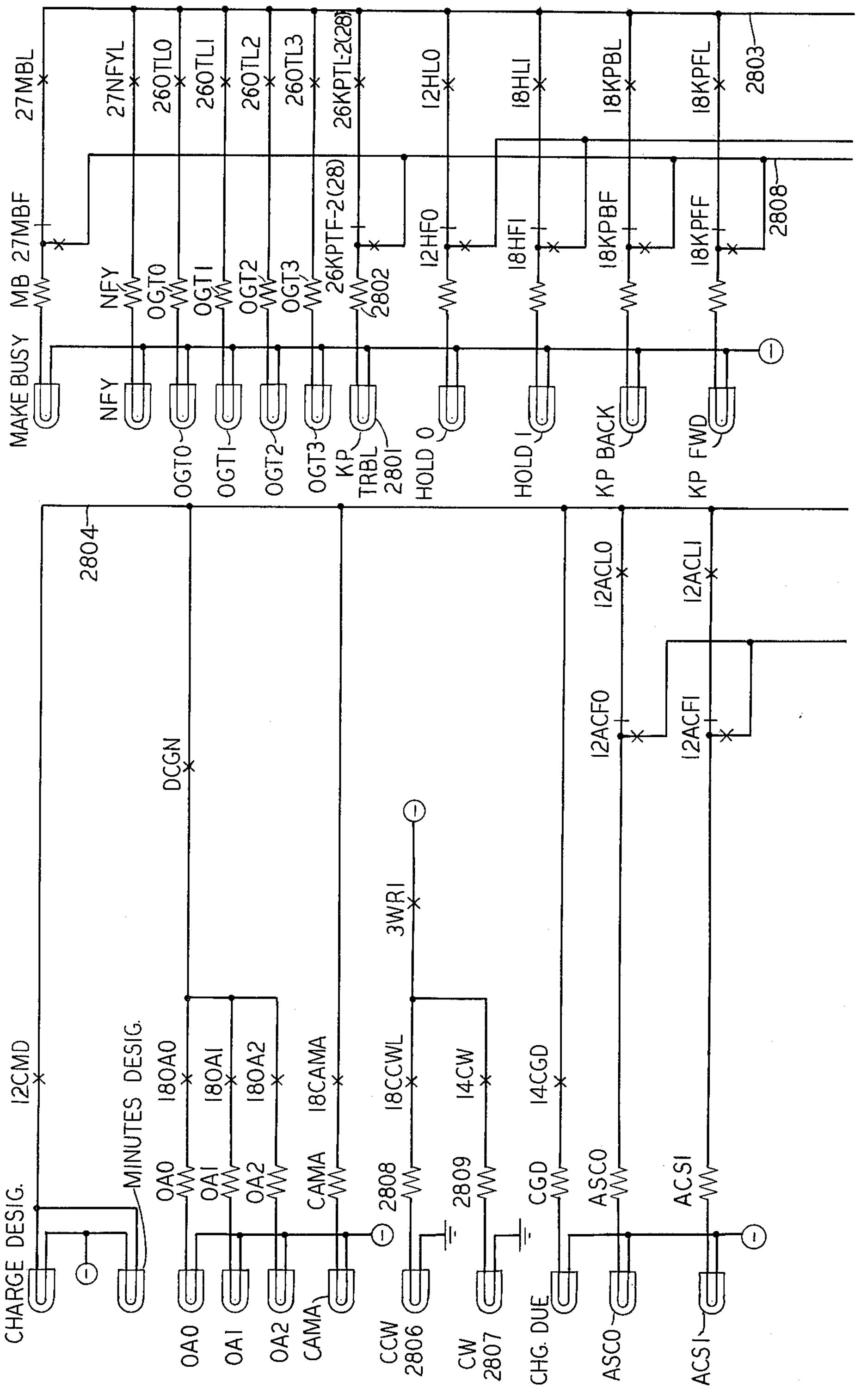
FIGS. 28, 29, 30 and 31 show particularly certain of the lamp energizing circuits.
Figure 29:
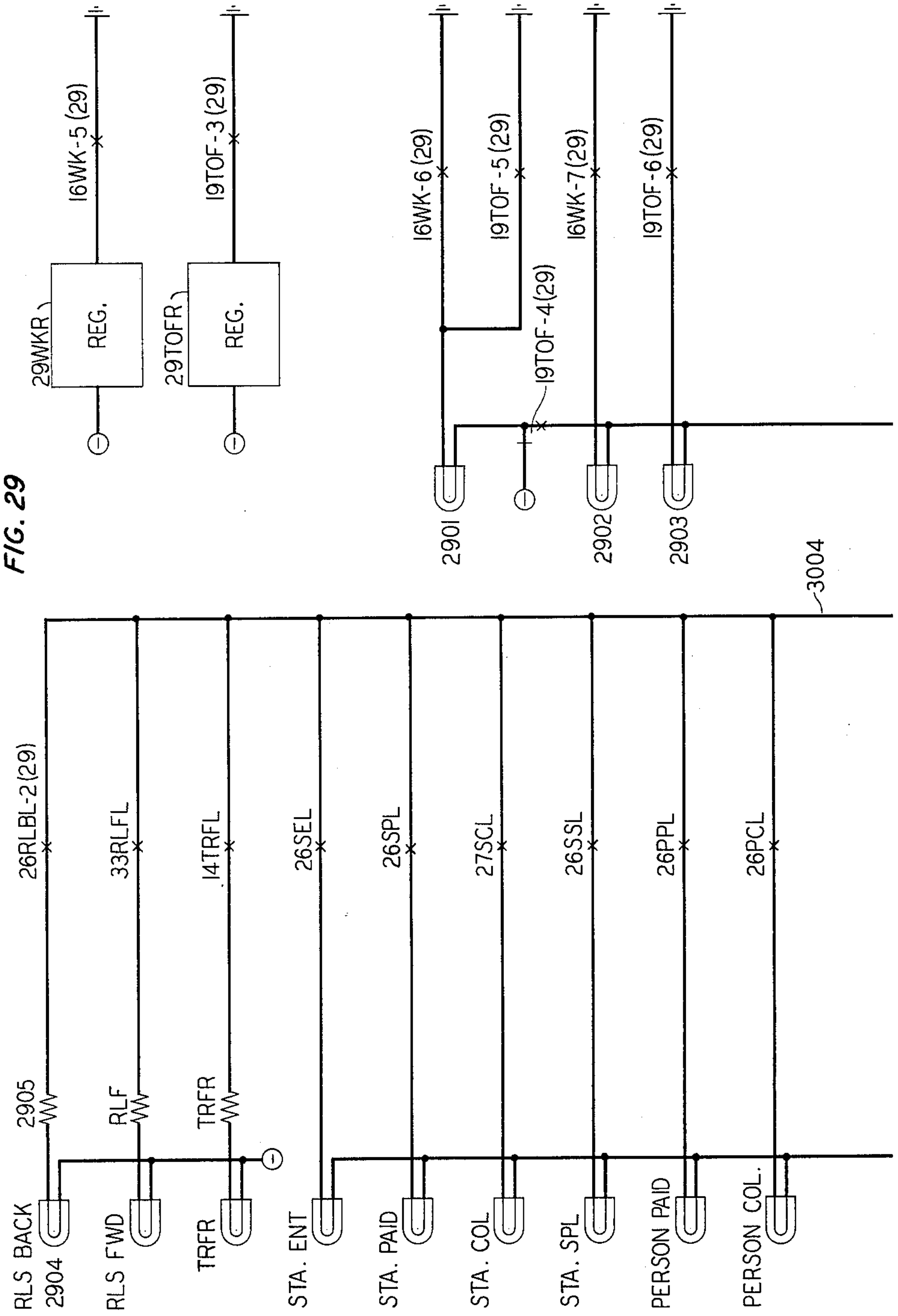
Figure 30:
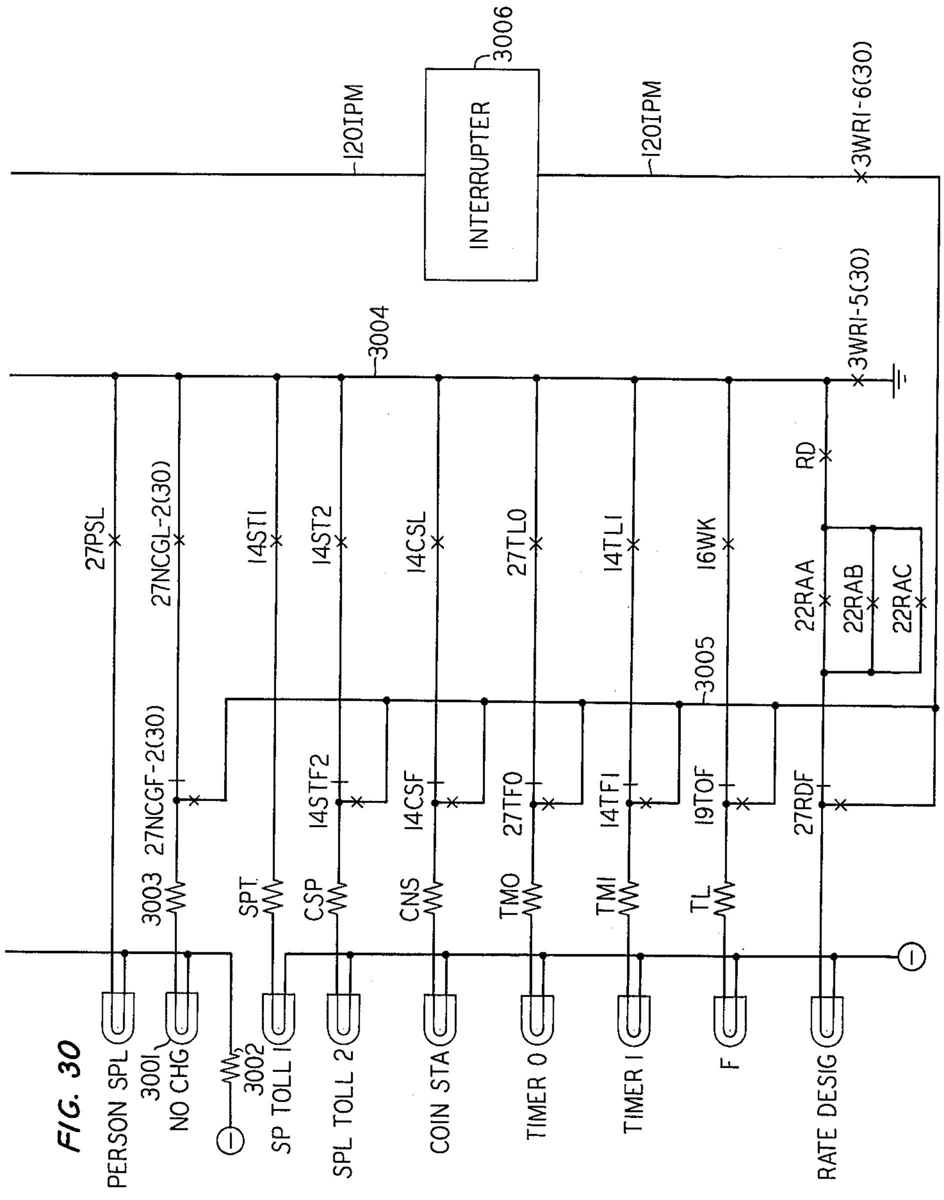
Figure 31:
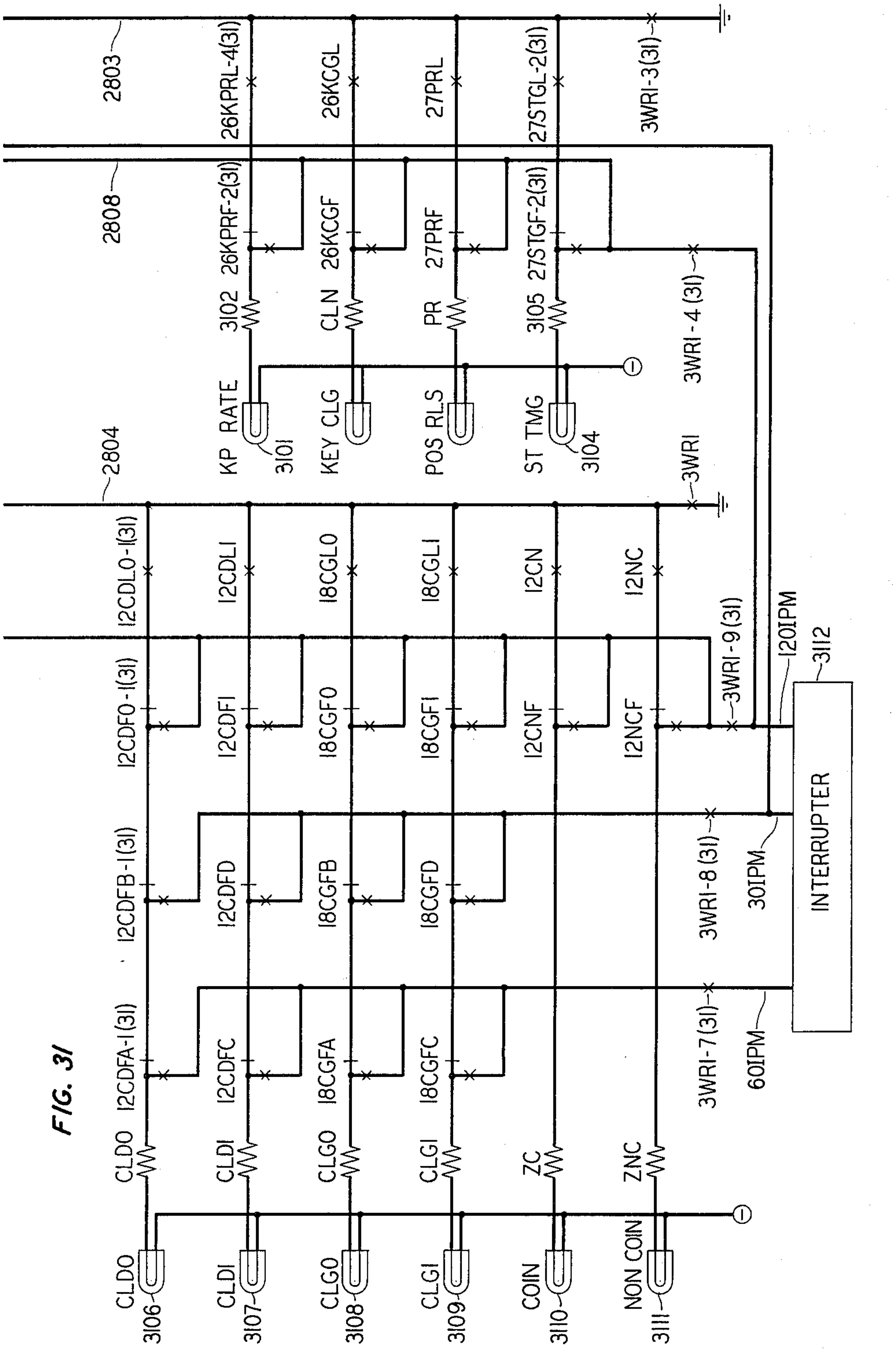

Among the many indicator lamps included in the calls simulation equipment are a group of ten gas-filled numerical indicator tubes or lamps. These are preferably polycathode gas tubes each of which may be caused to break down and conduct in selected ones of its ten positions. The general arrangement may be, for example, as disclosed in C. R. Williams Patent 2,769,939, November 6, 1956 or F. A. Mathamel Patent 2,962,698, November 29, 1960. These indicator tubes are shown on the console 106, FIG. 1, for example tubes 124, 125 and 129. In the present application, each tube can display a character from "1" to "0" depending upon which terminal of the tube is energized. For convenience in the present instance the ten tubes are designated respectively A, B, C, D, E, F, G, H, J and K, and with a view to simplification of the drawing only one, tube 2501, is shown in detail with the other nine indicated by captioned boxes (FIGS. 24 and 25). The respective control leads are shown in FIGS. 24 and 25, in some in some instances being indicated by a captioned rectangle in further effort toward simplification of the drawing.

It will be assumed that either all ten tubes or the last seven of the group are used to display called number simulation (depending upon use of 10-digit or 7-digit members). The last seven of the group, D to K, are used to display calling numbers (always 7 digits). Tubes A, B and C are used to display charge information, tubes E and F are used to display minutes and tubes H, J and K are used to display rate information. Suitable "pilot" designation lamps are provided in conjunction with each of these subgroups of tubes.

Provision is made in the matching and advance circuit for six different charges and four different minute codes. "Charge" and "minutes" are displayed together and automatically upon receipt of the codes. When the program segment requires display of charge and minutes during the transmission of WRITE codes, ground is connected by operation of respective character relays (FIGS. 8 and 9) to one of the code leads 32YR, 32TS, 32VS, 32WO, 32RQ, 32VQ, whereby to operate one of the "charge" relays 22CHG1 to 22CHG6, and to one of the code leads 32XS, 32ZS, 32UT, 32WN, whereby to operate one of the "minute" relays 22MN1 and 23MN1 to 23MN4. The operated charge relay, assumed to be 22CHG1, locks through a make contact of a transfer pair having a make-before-break continuity, in the assumed example to make contact of transfer pair 22CHG1–1(22), break contact 22CHGR–1(22) of relay 22CHGR, and make contact 3ETP1–10(23) of relay 3ETP1 to ground. The operated minutes relay, assumed to be 22MN1, locks to ground through the make contact of transfer pair 22MN1–1(22), break contact 23MNR–1(22) and make contact 3ETP1–10(23).

The charge relay operated operates a corresponding relay in the group 22CHGA, 22CHGB, 22CHGC, 22CHGD, 23CHGE and 23CHGF; in the assumed example with charge relay 22CHG1 operated, relay 22CHGA will be operated through make contact 22CHG1–2(22) of relay 22CHG1 and break contact of transfer pair 6DRK–1(22) of relay 6DRK to ground.

It will be recalled that tubes A, B and C of the group are used for charge display. Accordingly, the operated relay in the group just mentioned, that is, in the illustrative example, the 22CHGA, will connect negative battery to one terminal of each tube A, B and C. Referring to FIG. 25, the energizing path for indicator tube A is traced from negative battery, lead 2503, make contact 25CHGA–1(25) of relay 25CHGA, terminal of tube A (represented by tube 2501), resistor 2502 to positive battery. In the instance of tubes B and C, the respective paths are completed through similar make contacts of relay 25CHGA included in the contact assemblies represented by rectangles 2504 and 2505. A complete charge display is attained.

The operated "minutes" relay, 22MN1 and 23MN2 to 23MN4, operates a corresponding relay in the group 23MNA, 23MNB, 23MNC and 23MND. In the present instance, having assumed operation of relay 22MN1, relay 23MNA operates through make contact 22MN1–2(23) of relay 22MN1 and the break contact of transfer pair 6DRK–1(22) of relay 6DRK. As stated above, tubes E and F are used for "minutes" display. Make contacts of the operated 23MNA relay in the groups represented respectively by rectangles 2401 and 2402 (FIG. 24) complete energizing paths to terminals of tubes E and F in the manner described above whereby to complete the "minutes" display.

The "charge" and "minutes" display may be temporarily extinguished by closing Display Rate key 601 (FIG. 6) whereby to operate relay 6DRK from ground, the respective break contacts of the transfer pairs of Display Called No. key 603 and Display Calling No. key 602, make contact of key 601, winding of relay 6DRK to battery. Operation of relay 6DRK opens the operate paths of relays 22CHGA and 23MNA at the break contact of transfer pair 6DRK–1(22), the relays release and extinguish the display or indicator tubes. However, since the locking paths of the operated charge and minutes relays are not affected, the display again comes on when key 601 is released. The charge display is wiped out when relay 22CHGR is operated over code lead 32BX since the hold path of the charge relays is interrupted at break contact 22CHGR–1(22) of relay 22CHGR. Similarly, the minutes display is wiped out by operating relay 23MNR over code lead 32YS since the holding path of the minutes relay is interrupted at break contact 23MNR–1(22) of relay 23MNR.

Charge lamp 2507 and minutes lamp 2506 are lighted when relay 12CMD is operated over code lead 11CA under conrtol of the program. Relay 12CMD, operated, locks to ground through its make contact 12CMD–1(12), break contact 12CMDR–1(12) of relay 12CMDR, and make contact 3ETP1–11(18) of relay 3ETP1. Lamps 2506 and 2507 are now lighted from ground, through make contacts 3WR1–2(25) of relay 3WR1 and 12CMD–2(25) of relay 12CMD. (Relay 3WR1 operated following operation of relay 3WR and locked to ground through break contact 3ADVF–2(3) of relay 3ADVF, its own make contact 3WR1–1(3) and make contact 3ETP1–3(2) of relay 3ETP1.) The lamps are extinguished by operating relay 12CMDR over code lead 11BA, i.e., a WRITE code with Prime relay 21PM operated, whereby to release relay 12CMD.

Provision is made for three "rate" displays, tubes H, J and K being used to display the rate information. When the program segment requires rate display, one of the rate display code leads 32WT, 32YT, or 32AT, is grounded whereby to operate a respective relay of the group 22RA1, 23RA2, 23RA3. In the present instance it will be assumed that relay 22RA1 is operated and forthwith locks to ground through the make contacts of transfer pair 22RA1–1(22), break contact 23RAR–1(22) and make contact 3ETP1–18(23). Now, when Display Rate key 601 (FIG. 6) is closed, relay 6DRK operates over an obvious path. Relay 6DRK, operated, completes a path for operating either one of the three relays, 22RAA, 22RAB or 22RAC, depending upon which of the three control relays 22RA1, 22RA2, or 22RA3, is operated. In the present example, since relay 22RA1 is operated, relay 22RAA will operate from ground, the make contact of transfer pair 6DRK–1(22) of relay 6DRK, make contact 22RA1–2(22) of relay 22RA1, winding of relay 22RAA to battery. With relay 22RAA operated, potential from respective leads 2403, 2404 and 2405 will be applied to one terminal of each rate tube H, J and K (each similar in arrangement to tube 2501) through make contacts 22RAA–1(24) 22RAA–2(24) and 22RAA–3(24) of the operate relay. Also, with relay 22RAA operated, rate lamp 2508 may be either lighted "steady" or "flashiing" under control of the program by ground applied over code lead 32TR to operate relay 27RD or over code lead 32SM to operate relay 27RDF (a "WRITE" code with relay 21PM4 operated). Either relay 27RDF or relay 27RD, upon operating, would lock to ground at make contact 3ETP1–21(27) of relay 3ETP1 over obvious paths each of which includes break contact 27RDR–1(27) of relay 27RDR. Either operated relay will be released, therefore, when relay 27RDR is operated over code lead 11GA.

Relay 27RD, operated, will complete a "steady" path for lighting RATE lamp 2508 from "steady" ground, make contact 3WR1–2(25) of relay 3WR1, either make contact 22RAA–4(25), 22RAB–1(25) or 22RAC–1(25) depending upon which of the three relays is operated, make contact 27RD–3(25) of relay 27RD, the break contact of transfer pair 27RDF–3(25) of relay 27RDF, through the lamp to battery. Operation of relay 27RDF, on the other hand, will complete a "flashing" path for the lamp from "interrupted" ground at interrupter 2509 through the make contact of its transfer pairs 27RDF–3(25).

Provision is included for ten "called-number" displays under control of the program, relays 23CDN1 to 23CDN4 and 22CDN5 to 22CDN10 being selectively operated by applying ground to the respective code leads for this purpose. Each relay, as operated, will be locked over a respective path through one of its own make contacts and either break contact 22CDNR–1(22) or 22CDNR–2(23) of relay 2CDNR. Accordingly, operation of the last-mentioned relay over code lead 32SQ will release any operated relay in the group. In the present illustrative example it will be assumed that relay 23CDN1 operates and locks in that position.

With a relay in the above group operated, closure of "Display Called No." key 603 and operation of relay 6CDNK will be followed by operation of an associated relay in the group 22CDNA–22CDNC and 23CDND–23CDNL. In the present illustrative example with relay 23CDN1 assumed operated, one relay 22CDNA will operate through make contacts 23CDN1–2(22) and 6CDNK–1(23) to ground. The operated 22CDNA relay will connect battery through respective make contacts to the respective indicator tubes as represented by tube 2501. Such connections will be closed from battery on lead 2405 through make contact 22CDNA–1(24), from battery on lead 2404 through make contact 22CDNA—2(24), from battery on lead 2403 through make contact 22CDNA–3(24), from battery on lead 2503 through make contact 22CDNA–4(25) and through similar contacts not shown but included in the groups represented by rectangles 2407, 2402, 2401, 2406, 2505 and 2504.

Provision is also made for display of four simulated calling numbers under control of the program. When the program segment requires a calling number display ground on the appropriate code lead 3XV, 32ZV, 32BV or 32CV will operate respective code relays 23CGN1, 23CGN2, 23CGN3 or 3CGN4; the respective relays, upon operating, will lock to ground through a make contact of its respective transfer pair (make-before-break continuity) break contact 23CGNR–1(23) of relay 23CGNR, and make contact 3ETP1–18(23) of relay 3ETP1. In the present illustrative example, it will be assumed that relay 23CGN1 operates and locks to ground through the make contact of its transfer pair 23CGN1–1(23) and the path just described. Now when "Display Calling No." key 602 is closed and relay 6CGNK operated, relay 22CGNA will operate to ground through make contact 23CGN1–1(22) of relay 23CGN1 and make contact 6CGNK–1(22) of relay 6CGNK. Battery will now be supplied to respective terminals of the display tubes, for example from lead 2405 through make contact 22CGNA–1(24) to tube K, from lead 2404 through make contact 22CGNA–(24) to tube J, and from lead 2403 through make contact 22CGNA–3(24) to tube H.

*Result of failure, time out, alarm or premature disconnect*

As described above, if the trainee operates a "wrong key" relay 16WK operates and opens at its break contact 16WK–4(2) magnet start lead 203 whereby to stop the reader tape. Similarly, if the trainee does not "respond" within a predetermined period, relay 19TOF operates which also opens start lead 203 to break contact 19 to F–8(2). If the trainee disconnects her headset from the position telephone jack before the program tapes have run out (premature disconnect) the resulting release of relay 3PO, with relay 2TTO still operated, will operate relay 2PD from ground, the break contact of transfer pair 3PO–7(2) of relay 3PO, make contact 2TTO–3(2) of relay 2TTO, winding of relay 2PD to battery. Relay 2PD, operated, locks to ground through its make contact 2PD–2(2) and break contact 3ETP–4(2) of relay 3ETP. Relay 2PD, upon operating, opens start lead 203 at its break contact 2PD–3(2) stopping the reader tape. If an alarm condition arises in the teletypewriter read control circuit, the operation of relay 7ALM (as described above and as will be described in greater detail subsequently) closes a path for operating alarm relay 3ALM from ground, make contact 7ALM–3(3) of relay 7ALM, winding of relay 3ALM to battery. Relay 3ALM, upon operating, locks to ground through its make contact 3ALM–1(3) and make contact 3ETP1–3(2) of relay 3ETP1, and opens at its break contact 3ALM–2(2) lead 203 whereby to stop the tape reader.

It will be readily apparent from examination of FIGS. 11 and 32 that operation of any of the above referred to "trouble" relays, 19TOF, 3ALM, 16WK, 2PD, will remove ground from all of the code leads except code lead 32WU which has a separate ground connection through make contact 8CHU–2(32) of relay 8CHU. This, of course, effectively eliminates any further code relay operation while the tape is being advanced through the remainder of that particular program.

After any of the above "irregularities" has occurred, the training operation can be resumed only by closing the ADVANCE key 302 (key 122, FIG. 1). In addition, in the case of "premature disconnect" the telephone circuit plug must be restored in the jack (to reoperate relay 3PO) and in the event of an alarm the condition causing the alarm must be cleared. When ADVANCE key 302 is closed, relay 3ADV operates over an obvious path through make contact 3PO–1(3) of relay 3PO.

Relay 3ADV, operated, reoperates off-normal relay 60N (in the case the relay had been released through premature disconnect) through its make contact 3ADV–5(6) and make contacts 3PO–3(6) and 2PD–4(6). Also relay 3ADV, operated, will operate relay 3ADVF through its make contact 3ADV–6(3) and over one of four shunt paths depending upon which "trouble" relay has operated, that is, a path through make contact 19TOF–9(3) of relay 19TOF, a path through make contact 16WK–9(3) of relay 16WK, a path through make contacts 2PD–5(3) of relay 2PD and 3PO–8(3) of relay 3PO, or a path through make contact 3ALM–4(3) of relay 3ALM and break contact 7ALM–4(3) of relay 7ALM. Relay 3ADVF, operated, locks to ground through its make contact 3ADVF–4(3) and make contact 3ETP1–3(2) of relay 3ETP1. Also, relay 3ADV, upon operating, closes a shunt path through its make contact 3ADVF–5(2) around the break contacts of the "trouble" relays in start lead 203.

With both relays 3ADV and 3AVF now operated, a path is closed to operate relay 4A of the magnetic tape control circuit from ground, break contact 3MC–2(4) of relay 3MC, make contacts 3ADV–2(4) of relay 3ADV and 3ADVF–6(4) of relay 3ADVF, break contacts 6EP1–2(4) of relay 6EP1 and 4WU–1(4) of relay 4WU, winding of relay 4A to battery. Relay 4A operated, closes at its 4A-1(4) make contact an operate path for relay 4B, and also closes (before relay 4B operates) a path for operating relay 4ADV from ground, make contact 5EP-1(4) of relay 5EP, make contact 4A–2(4) af relay 4A, break contact 4B–1(4) of relay 4B, winding of relay 4ADV to battery. Relay 4ADV, upon operating, locks to ground through its 4ADV-1(4) make contact, and closes at its make contact 4ADV–2(4) a path for starting the magnetic reproducer. At the same time the tape reader start lead 203 is opened at break contact 4ADV–4(2). When the ADVANCE key 302 is opened, relay 3ADV releases.

When the magnetic tape reaches the end of program, relay 5EP is released from the magnetic tape control circuit which opens the hold path of relay 4ADV at make contact 5EP–1(4). Release of relay 4ADV recloses start lead 203 at break contact 4ADV–4(2) and causes the reader tape to run to end of program at which point ground is transmitted over code lead 32WU to operate relay 3ETP. Relay 3ETP, operated, closes an operate path for relay 4WU from ground, break contact 3MC–2(4) of relay 3MC, make contact 3ETP-5(4) of relay 3ETP, winding of relay 4WU to battery; releases relay 3ETP1 which in turn releases all relays held operated to ground through make contacts of that relay, this including the 3ADVF relay; holds start lead 203 open at break contact 3ETP–2(2); and closes through its make contact 3ETP–1(3) an operate path for relay 3SYT in the event the magnetic tape is still running and relay 4MTON is operated.

Removal of ground form code lead 32WU releases relay 3ETP. If relay 3SYT is normal, start lead 203 will now be closed at break contact 3ETP–2(2). If the magnetic tape is still running, the teletypewriter tape reader start lead 203 will be held open at break contact 3SYT–2(2) of relay 3SYT. When the magnetic tape does come to rest, relay 4MTON releases as previously described thereby releasing relay 3SYT and closing the start lead 203 of the tape reader.

When relay 4WU operates as above described it locks to ground through its make contact 4WU–2(4) and through parallel paths through make contacts 6EPI–3(4) of relay 6EP1 and 4EPA–3(4) of relay 4EPA. Also, upon operating, relay 4WU opens at its break contacts 4WU–1(4) the hold path of relay 4A which releases. After the magnetic tape has stopped and relay 4MO, released, has released relay 4EPA, the operation of relay 4WU is effective to release relay 6EP1 since it opens the holding path thereof at break contact 4WU–3(6). Relay 6EP1, released, releases relay 4WU at make contact 6EP1–3(4) and the magnetic tape control circuit is now normal.

During the course of the magnetic tape reproduction when a TONE pulse is generated, relay 5TN is released by the magnetic tape control circuit. At this point relay 4W will operate from battery, resistor 405, winding of relay 4W, break contact of transfer pair 4W–1(4), make contact 4MO–3(4), break contact 4ADV–3(4), break contact of transfer pair 4EPA–1(4), break contact 5TN–1(4) to ground. When the tone ceases, relay 4Z will operate from battery, resistor 406, winding of relay 4Z, the make contact of transfer pair 4W–1(4), break contact 5S1–1(4) to ground. Relay 5S now operates from ground through make contacts 4W–2(5) of relay 4W and 4Z–2(5) of relay 4Z and, when operated, closes an operate path for relay 5S1 at make contact 5S–2(5). Also, relay 5S, operated, stops the reproducer by opening at its break contact 5S–3(4) a control lead to the reproducer circuit 401, and closes a path at its make contact 5S–4(5) for operating relay 5SYNC.

Relay 5S1, operated, releases relays 4W and 4Z by opening the hold path at break contact 5S1–1(4); relays 4W and 4Z, released, release relay 5S. Relay 5S, released, releases relay 5S1.

When the magnetic reproducer stopped following operation of relay 5S as above described, relay 4MO released. Following operation of relay 4WU as above described the magnetic reproducer circuit restores to normal.

*Translator check failure alarm*

In the event a "character" relay of the translator circuit, for example 8CHW or 9CHT, should fail to operate in a particular cycle due to some operational difficulty, or if more than one "character" relay should operate for similar reason, or if one or both of the operated character relays should fail to release at the end of the second cycle of a pair, resulting in two or more character relays being operated in the next cycle, the operating path of the 7CK relay through the 1-out-of-*n*-check or 2-out-of-*n*-check networks (FIGS. 7 and 10) would not be closed. The action of the circuit upon failure of relay 7CK to operate for the above reasons is as now described.

With relay 7CK released, the opening of the tape reader contacts, as 208, 209 etc., at the 80 ms. point in the tape reader cycle will release the particular operated relays in the group 2A1–2A5; this in turn will release relay 2STP. The operated relays in the group 2B1–2B5, however, will remain operated being locked to ground at break contact 7CK–4(2) of relay 7CK; the 2STP1 relay is therefore held operated. With relay 7CK released and relay 2STP1 operated, the operating path for the intended character relay is maintained at break contact 7CK–1(8) and make contact 2STP1–5(8), while a locking path for operated character relays is also maintained at make contact 2STP1–6(9).

With the failude of the 7CK relay to operate, start lead 203 of the clutch magnet is not closed at the shunt path through make contact 7CK–6(2), and with relay 2STP1 held operated, the lead is open at break contact 2STP1–1(2). Accordingly the tape reader stops at the end of the rotation. The opening of auxiliary contact 207 at the 80 ms. point in the tape reader cycle removes one of the short circuit paths around the lower winding of relay 2Z (which was referred to above in the early portion of the detailed description) if this is the first cycle of a pair, or removes one of the holding paths of the 2Z and 2A relays in series if the failure occurs in the even cycle. In either event the 2A, 2Z and 2W relays do not change condition at this point due to the second short-circuiting path or holding path, as the case may be, through break contact 7CK–2(2) of relay 7CK and make contact 2SR–2(2) of relay 2SR. Since the 2STP and 7CK relays are released and the 2STP1 relay is operated, the operate path for ALARM relay 7ALM is now complete except for the 2W and 2Z relays being in the transient state, that is one operated and the other released whereby the path at transfer contacts 2Z–6(7) and 2W–5(7) is open. This condition of the 2W–2Z relays also results in the locking path of relay 2SR remaining open.

When the slow-to-release relay 2SR does release, the short-circuit or holding path in the 2Z-2W relay circuit through make contact 2SR-2(2) is opened permitting relay 2Z to operate or relays 2Z and 2A to release, respectively. Thus, we have relays 2W and 2Z compatible, either both operated or both released and relay 7ALM operates from ground, make contact 2STP1–4(7) of relay 2STP1, either the respective make or the respective break contacts of transfer pairs 2Z–6(7) and 2W–5(7) of relays 2Z and 2W, break contacts 7CK–5(7) of relay 7CK and 2STP–2(7) of relay 2STP, winding of relay 7ALM to battery.

The release of relay 2SR referred to above is effective through the break contact of its transfer pair 2SR–1(2) to insert resistor 221 in series with the operating winding of relay 2STP1 whereby to reduce heating of the low resistance winding during the prolonged period of operation.

Relay 7ALM, upon operating, as above described, locks to ground through its make contact 7ALM–5(7) and break contacts of TROUBLE RELEASE keys 701 and 702. Also relay 7ALM, operated, closes at its 7ALM–6(7) contact a path for lighting ALARM lamps 703 and 704; closes a path at its make contact 7ALM–3(3) for operating relay 3ALM, which upon operating opens tape reader start lead 203 at break contact 3ALM–2(2), and removes at its break contact 3ALM–3(32) ground from all the code leads except code lead 32WU. Also relay 7ALM, upon operating, opens at its break contact 7ALM–4(3) an operate path for relay 3ADVF, and closes at its make contact 7ALM–7(7) an operate path for relay 7ALM1. Relay 7ALM1 upon operating locks to ground through its make contact 7ALM1–2(7) and either break contacts 9CHLF–5(7) of relay 9CHLF and 9CHSP–4(7) of relay 9CHSP or break contact 7CK–7(7) of relay 7CK.

Relay 7ALM1, operated, partially completes at its make contact 7ALM1–3(2) an operate path for relay 2STP2 and transfers at the make contact of its transfer pair 7ALM1–1(7) control of the 7CK relay operate circuit to either keys 701 and 702 or to relays 2STP1 and 2STP2.

The circuit is now locked in an ALARM condition with all components of the transmitting portion of the circuit except relays of the 2A1–2A5 group held in their operated or working condition, with the reader tape stopped at the end of the character which was not properly translated, and with its ALARM relays 7ALM and 7ALM1 operated and CHECK relay 7CK released.

In order to resume "training" the reader tape must be made to skip over the remainder of the "call" in which the alarm occurred to the next program. To avoid a possible immediate recurrence of the alarm condition a special cycling sequence, without checking, is utilized to bring the tape up to the next single character code, either WRITE or READ, at which point the normal checking sequence is continued to the end of the call. This method is based on the fact that a single character code cycle can be used as an identifiable landmark since it always results in the restoral of the circuit to the odd cycle condition. Output codes are not transmitted during either phase of the "trouble running" sequence, except for the "end of program" code.

When the trouble has been cleared, or when "training" is to be resumed, either trouble release key 701 or 702 is closed whereby to operate relay 7CK through the make contact of transfer pair 7ALM1–1(7) of relay 7ALM1. Relay 7ALM releases following operation of the trouble release key and operation of relay 7CK.

Relay 7CK operated, releases operated relays in the group 2B1–2B5 by opening the locking path at break contact 7CK–4(2); this in turn releases relay 2STP1. With relay 7CK operated and relay 2STP1 released, clutch magnet start lead 203 is closed at make contact 7CK–6(2) of relay 7CK and break contact 2STP1–1(2) of relay 2STP1 although it is open at another point under control of the ADVANCE key.

Relay 7ALM, released, extinguishes ALARM lamps 703 and 704. Release of the TROUBLE RELEASE key 701 or 702 releases relay 7CK.

Operation of relay 3ADV, following closure of ADVANCE key 302 by the trainee, closes at its make contact 3ADV–7(2) an operate path for relay 2SR; relay 2SR, operated, closes through its make contact 2SR–6(2) a shorting path for its secondary winding, whereby to impart slow-to-release characteristics, and locks to ground through its make contact 2SR–5(2), either make or break transfer contacts of relays 2W and 2Z (both either operated or released) and the make contact of transfer pair 3PO–7(2) of relay 3PO. The magnetic tape is now advanced to its end-of-program point, at which time the teletypewriter tape reader starts running. The teletypewriter tape reader control circuit (FIG. 2) functions as in a normal cycle as previously described to operate a "character" relay (FIGS. 8 and 9) and to "flip" or "flop" the 2W–2Z relay combination into the first or second cycle off-normal condition depending upon its condition at the time the alarm occurred. Under this condition, however, with relays 2SR and 7ALM operated a path is completed upon operation of relay 2STP1 for operating relay 2STP2 from ground, make contacts 2STP1–7(2), 7ALM1–3(2) and 2SR–4(2), winding of relay 2STP2 to battery. Relay 7CK now operates from ground, make contacts 2STP1–3(7), and 2STP2–1(7), make contact of transfer pair 7ALM1–1(7), winding of relay 7CK to battery; relay 7CK, upon operating, locks to ground through its make contact 7CK–3(7) and make contact 2STP1–3(7) of relay 2STP1. At the end of the cycle relay 2STP1, released, releases relays 2STP2 and 7CK. The operate time of the 2STP2 relay is such as to permit the selected "character" relay (FIGS. 8 and 9) to operate before the common ground connection is opened at break contact 7CK–1(8) of relay 7CK.

The circuit continues cycling in this manner until the next single character code is reached. Upon operation of either "single character" relay 9CHLF or 9CHSP, one of the two holding paths of relay 7ALM1 will be opened either at break contact 9CHLF–5(7) or 9CHSP–4(7). Then when the 7CK relay operates in the cycle, the other holding path is opened at break contact 7CK–7(7) of relay 7CK, and relay 7ALM1 releases. Relay 7ALM1, released, releases relay 2STP2 by opening the operate path at make contact 7ALM1–3(2), and restores through the break contact of transfer pair 7ALM1–1(7) the operate path of relay 7CK to the check circuit.

The alternate hold path for relay 7ALM1 through a break contact of relay 7CK, as described above, is provided to prevent operation of the single character relays 9CHLF or 9CHSP from releasing relay 7ALM1 before relay 7CK has operated following operation of relay 2STP2 (over a path which includes a make contact of relay 7ALM1). Operation of relays 9CHLF or 9CHSP also opens at break contacts 9CHLF–2(2) or 9CHSP–1(2) break contacts the combined 2Z relay operating and 2W relay holding path of the odd cycle state of these relays. When the tape reader contacts open near the end of the cycle, relays 2W and 2Z, if operated, release and relay 2STP1 releases in the normal manner releasing relay 7CK.

When the "end of program" code is reached by the tape reader, ground is restored to the code leads (FIGS. 11 and 32) and operator training may resume.

*Key pulsing key check and counting circuit*

On certain training calls a trainee may be required to key pulse given numbers of pulses. For example, when the program segment requires the trainee to key pulse a "trouble code" the KP TRBL lamp 2801 must be lighted before the trainee may key. Ground applied to code lead 32RO as a WRITE code, i.e., with Prime relay 21PM2 operated, will operate relay 26KPTL through the make contact of transfer paid 21PM2–1(26) of relay 21PM2; relay 26KPTL, operated, locks to ground through the make contact of transfer pair 26KPTL–1(26), break contacts 26KPTF–1(26) and 26KPTR–1(26) and make contact 3ETP1–20(27) of relay 3ETP1. Relay 26KPTL, upon operating, closes a path for lighting lamp 2801 "steady" through resistor 2802, the break contact of transfer pair 26KPTF–2(28) of relay 26KPTF, make contact 26KPTL–2(28) of relay 26KPTL, lead 2803, make contact 3WR1-3(31) of relay 3RW1 to ground. Also relay 26KPTL, operated, closes a path at its make contact 26KPTL–3(21) for operating relay 21KPT1; relay 21KPT1, operated, in turn completes a path through its make contact 21KPT1–2(21) for connecting relay 21KP7 to No. 2 terminal of rotary switch 2102. Relay 21KPT1 locks to ground through its make contact 21KPT1–1(21), break contact 21KPT–2(21) of relay 21KP7, make contact 3ETP1–8(21) of relay 3ETP1.

When the segment requires the trainee to key pulse a rate code, KP RATE lamp 3101 must be lighted before the trainee may key. Ground applied to code lead 32TO (FIG. 32) as a WRITE code, i.e., with PRIME relay 21PM2 operated, will operate relay 26KPRL through make contact 21PM2–2(26) of relay 21PM2; relay 26KPRL, operated, locks to ground through the make contact of transfer pair 26KPRL–3(26), break contacts 26KPRF–1(26) and 26KPRR–1(26) and make contact 3ETP1–20(27). Relay 26KPRL, operated, closes a path for lighting lamp 3101 "steady" through resistor 3102, the break contact of transfer pair 26KPRF–2(31) of relay 26KPRF, make contact 26KPRL–4(31) of relay 26KPRL, lead 2803, make contact 3RW1–3(31) of relay 3RW1 to ground. Also relay 26KPRL, operated, closes at its make contact 26KPRL–1(21) a path for operating relay 21KPR1; relay 21KPR1, operated, connects relay 21KP7 through make contact 21KPR1–1(21) to #3 contact of the bank of rotary switch 2102.

At this point relay 13KPN, the "match" relay is operated, having been operated by ground applied to code lead 32SM as a READ code with the Prime relays unoperated through the break contact of transfer pair 21PM4–2(27) of relay 21PM4, to code lead 26SM and over that lead to operate relay 13KPN, which upon operating locks to ground through the make contact of its transfer pair 13KPN–1(13), break contact 21KP7–3(13), lead 3301, break contact 3MA–1(33) and make contact 3ETP1–1(33). (Transfer pair 13KPN–1(13) is make-before-break.) Accordingly, when the first key of the Key Pulser (FIG. 21) is closed, relay 21P will be operated over an obvious path through make contact 13KPN–2(21) of relay 13KPN. Relay 21P, operated, closes a path through its make contact 21P–1(21) for energizing rotary magnet 2101 of selector 2102; this causes the selector to step to contact #1. When the selector moves off normal, the OFF NORMAL contact 2103 closes.

Release of the Key Pulser key releases relay 21P. Each subsequent operation and release of a Key Pulser key results in the operation and release of relay 21P with resultant advance of the selector to the next terminal. As rotation continues if a Trouble Code is being pulsed, with relay 21KPT1 operated, relay 21KP7 will operate when the contact #2 of the rotary bank is engaged; if a rate code is being pulsed with relay 21KPR1 operated, relay 21KP7 will operate when contact #3 is engaged; and for a different code will operate when contact #7 is engaged. At each operation of relay 21KP7 it opens at its break contact 21KP7–3(13) the hold path of relay 13KPN which releases; locks to ground through its own make contact 21KP7–1(21) and the selector OFF NORMAL contact 2103; and closes at its make contact 21KP7–4(21) a path for energizing release magnet 2104 of the selector.

Relay 13KPN, released, opens at its make contact 13KPN–2(21) the operate path for relay 21P whereby to prevent any further key operation from interfering with release of the selector 2102. Operation of release magnet 2104 as just described causes selector 2102 to return to normal. When it has returned to normal, OFF NORMAL contact 2103 opens, releasing relay 21KP7 whereby to de-energize release magnet 2104.

Lamp 2801, lighted "steady" as above described, is extinguished by operating relay 26KPTR by application of ground to code lead 32SO; the hold path for relay 26KPTL is opened at break contact 26KPTR–1(26) of relay 26KPTR and relay 26KPTL releases and opens the energizing path of lamp 2801 at make contact 26KPTL–2(28). Lamp 3101, lighted "steady" as above described, is extinguished by operating relay 26KPRR by application of ground to code lead 32VO. This releases relay 26KPRL by opening the hold path at break contact 26KPRR–1(26) of relay 26KPRR; relay 26-KPRL, released, opens the energizing path of lamp 3101 at make contact 26KPRL–4(31).

The lamps may be "flashed" over circuits generally similar to those described above. In order to "flash" lamp 2801, however, relay 26KPTF is operated instead of relay 26KPTL, and in order to "flash" lamp 3101, relay 26KPRF is operated instead of 26KPRL. Relay 26KPTF is operated by applying ground to code lead 11NG, and upon operating, locks to ground through the make contact of transfer pair 26KPTF–3(26), break contact 26KPTL–4(26), break contact 26KPTR–1(26), and make contact 3ETP1–20(27). (The relay may be subsequently released by operation of relay 26KPTR.) Relay 26KPRF is operated by applying ground to code lead 32UO and when operated, locks to ground through the make contact of transfer pair 26KPRF–3(26), break contacts 26KPRL–5(26) and 26KPRR–1(26) and make contact 3ETP1–20(27). (The relay may be subsequently released by operation of relay 26KPRR.)

Lamp 2801 is now "flashed" over a path through the make contact of transfer pair 26KPTF–2(28) of relay 26KPTF, lead 2808, make contact 3WR1–4(31) of relay 3WR1, to interrupted ground at interrupter 3112, while lamp 3101 is "flashed" over a similar path through the make contact of transfer pair 26KPRF–2(31) of relay 26KPRF.

*Manual control*

As previously pointed out above, the novel arrangement provided is such that, on occasion, the training supervisor may assume manual control of the training procedure and advance the program step-by-step as desired. Such a procedure may be advisable, for example, at the very start of the training, or during portions of the program that are found particularly difficult by a trainee. The magnetic tape is not utilized during the manually controlled procedure, the "voice" being that of the supervisor. The teletypewriter tape is used to supply "command" information to the trainees and "match" information. The tape does not, however, advance automatically upon a successful MATCH but waits for the supervisor to momentarily operate her control key.

To start the manually controlled training period, the proper teletypewriter program tape is placed in the tape reader, but no magnetic tape is provided in the magnetic reproducer. The MANUAL CONTROL key (FIG. 3), a locking key, is now closed whereby to close a path through its make contact 304 for operating relay 3MC. Relay 3MC, operated, closes an operate path for relay 3MA1 from ground, make contact 3MC–3(3) of relay 3MC, break contact 3MA–3(3) of relay 3MA, winding of relay 3MA1 to battery. Also relay 3MC upon operating, partially establishes at its make contact 3MC–4(6) an operate path for relay 60N; opens at its break contact 3MC–2(4) the ground connection to the 4A and 4WU relays whereby to disable the magnetic tape control circuit; opens at the break contact of its transfer pair 3MC–11(3) the operate path of relay 3STO whereby to disable the timing circuit; and opens at its break contact 3MC–6(16) the operate path of relay 16WK, whereby to disable the WRONG KEY operation circuit.

The trainee connects her telephone set to the telephone circuit, which operates relay 3PO as previously described, and then closes the ADVANCE key 302 whereby to operate relay 3ADV. Relay 60N now operates from ground, make contacts 3ADV–5(6), 3MC–4(6) and 3PO–3(6) of relay 3PO, winding of relay 60N to battery. When the trainee releases the ADVANCE key 302, relay 3ADV releases and closes at its break contact 3ADV–1(2) start lead 203 of the tape reader clutch magnet. The teletypewriter tape now starts to run, as described above, and continues to run into the first segment of the program.

It will be recalled from the above description of the automatically controlled training procedure that when the trainee attains a successful MATCH of the information stored in the matching and advance circuit, the release of the particular MATCH relay releases the 15CK relay, which, in turn, releases the 3WR relay whereupon the reader tape is advanced into the next segment. In the instance of manual control, however, the 15CK relay does not release at this point since the involved "MATCH" relay is held operated to ground through a break contact of the 3MA relay. For example, assume that MATCH relay 33RLF had operated and that relay 15CK was held operated through make contact 33RLF–1(15) of relay 33RLF. Now relay 33RLF does not release at MATCH since it is locked to ground through break contact 3MA–1(33) of relay 3MA, and relay 15CK is accordingly held.

When key 305 of the JACK and KEY circuit (not shown) is momentarily closed, relay 3MA (MANUAL ADVANCE) operates from ground, closed contact of key 305, closed contact 306 of MC key winding, of relay 3MA to battery; relay 3MA, operated, releases at its 3MA–1(33) break contact any operated MATCH relays (FIG. 33), thereby releasing relay 15CK, and opens at its 3MA–3(3) break contact the operate path of relay 3MA1 whereby to release that relay; relay 3MA1 is slow-to-release.

Relay 3MA1, when released, re-establishes at its break contact 3MA1–1(33) the holding path for MATCH relays as they operate, and in turn, operate relay 15CK. The slow-to-release characteristic of relay 3MA1 assures a measure "open" period long enough to assure the release of any operated MATCH relays and the release of relay 15CK, and yet short enough to make sure that these relays will lock on the next segment even though the supervisor may be slow in releasing key 305. When key 305 is released, relay 3MA releases and relay 3MA1 is reoperated.

At the completion of the manually controlled training period the MC key (contacts 304 and 306) is restored to normal whereby to release relay 3MC.

*Additional match situations and lamp controls*

It is believed that it may be of value to consider additional MATCH situations at this point as well as additional lamp controls.

Let us assume now, therefore, that a READ code is transmitted whereby ground is connected to code lead 32VP through operation of CHARACTER relays 9CHP (make contact 9CHP–2(32)) and 9CHV (make contact 9CHV–3(32)). Since the PRIME relays are released on READ codes, the ground on code lead 32VP is connected to code lead 27VP (FIG. 27) through the break contact of transfer pair 21PM2–3(27) of relay 21PM2 and transmitted thereover through the READ CODE LEAD cable to operate relay 13NCG. Relay 13NCG, operated, locks to ground through the make contact of transfer pair 13NCG–1(13), break contact 15NCGK–1(13), lead 3301, break contact 3MA–1(33) and make contact 3ETP1–1(33). This is in effect, the "correct answer" stored in the matching and advance circuit.

After the READ transmission has been completed and the PRIME relays have operated as above described, ground applied to code lead 32VP as a WRITE code will operate relay 27NCGL through the make contact of transfer pair 21PM2–3(27) of relay 21PM2; relay 27NCGL, upon operating, locks to ground through the make contact of transfer pair 27NCGL–1(27) having make-before-break continuity, break contacts 27NCGF–1(27) and 27NCGR–1(27) and make contact 3ETP1–20(27). Also, relay 27NCGF upon operating closes a path for lighting NO CHARGE lamp 3001 "steady" from battery, resistor 3002, lamp 3001, resistor 3003, the break contact of transfer pair 27NCGF–2(30) of relay 27NCGF, make contact 27NCGL–2(30) of relay 27NCGL, lead 3004, make contact 3WR1–5(30) of relay 3WR1 to ground; NO CHARGE lamp 3001 lights whereby to present the "question" or "problem" to the attendant.

The "proper response" by the trainee to the lighted NO CHARGE lamp 3001 is closure of her NO CHARGE key 1507 (FIG. 15) whereby to operate relay 15NCGK. Assuming, therefore, that this is done, and that the operation is performed within the predetermined time interval assigned to that particular problem, a MATCH is attained; relay 15NCGK, operated, operates relay 17DL2 through make contact 15NCGK–2(17), and the hold path of the MATCH relay 13NCG is opened at break contacts 15NCGK–1(13) and 17DL2–1(13). Relay 13NCG, released, opens at its make contact 13NCG–2(15) the operate path of relay 15CK; release of relay 15CK is followed by release of relay 3WR and the other circuit functions following MATCH is previously described above.

At different points in the program it may be in order to light lamp 3001 "flashing." To accomplish this ground is applied to code lead 11MI which operates relay 27NCGF; relay 27NCGF, upon operating, locks to ground through the make contact of its transfer pair 27NCGF–3(27), break contacts 27NCGL–3(27) and 27NCGR–1(27), lead 2701 and make contact 3ETP1–20(27). Lamp 3001 is now lighted "flashing" from battery, resistor 3002, lamp 3001, resistor 3003, the make contact of transfer pair 27NCGF–2(30) of relay 27NCGF, lead 3005, make contact 3WR1–6(30) of relay 3WR1 to source of interrupted ground 3006.

Relay 27NCGR is operated by application of ground over code lead 32WP, and since break contact 27NCGR–1(27) of this relay is included in the hold path of relays 27NCGF and 27NCGL, either of the two last-mentioned relays, if operated, will be released by operation of relay 27NCGR.

For purpose of further description let it be assumed now that a READ code, that is with the PRIME relays unoperated, is transmitted over code lead 11HE; since relay 21PM3 is unoperated, the code ground is passed through the break contact of transfer pair 21PM3–2(26) of relay 21PM3 to code lead 26HE and thereover through the READ CODE LEAD cable to operate relay 33RLB. Relay 33RLB, operated, locks to ground through the make contact of transfer pair 33RLB–1(33), break contacts 6RLBK–1(33) and 17DL3–2(33), lead 3301, break contact 3MA–1(33) and make contact 3ETP1–1(33). The "correct answer" is now stored in the matching and advance circuit.

Upon completion of the READ codes the PRIME relays operate as above described after which the WRITE codes are transmitted. The code ground now applied to code lead 11HE passes through the make contact of transfer pair 21PM3–2(26) of relay 21PM3 and operates relay 26RLBL; relay 26RLBL, operated, locks to ground through the make contact of its transfer pair 26RLBL–1(26), break contact 26RLBR–1(26), lead 2601 and make contact 3ETP1–22(27). Relay 26RLBL, operated, lights RLS BACK lamp 2904 from battery, lamp 2904, resistor 2905, make contact 26RLBL–2(29) of relay 26RLBL, lead 3004, make contact 3WR1–5(30) of relay 3WR1 to ground. Lamp 2904, lighted, presents the "problem" to the trainee.

The proper "response" by the trainee to the "problem" is operation of RELEASE BACK key 604 whereby to operate relay 6RLBK. Assuming that the trainee so responds and does so within the preassigned interval, a MATCH is attained; relay 6RLBK, operated, completes a path through its make contact 6RLBK–2(17) for operating relay 17DL3, following which the holding path of MATCH relay 33RLB is opened at break contacts 6RLBK–1(33) of relay 6RLBK and 17DL3–2(33) of relay 17DL3. Relay 33RLB, released, opens at its make contact 33RLB–2(15) the operate path of relay 15CK; relay 15CK releases followed by release of relay 3WR and the other circuit functions following MATCH as previously described above.

Relay 26RLBL may be released by operating relay 26RLBR since break contact 26RLBR–1(26) of the latter relay is included in the hold path of relay 26ELBL; relay 26RLBR is operated by applying code ground over code lead 11IE.

As an additional illustrative example let it be assumed that as a READ code, ground be applied to code lead 11OJ through the break contact of transfer pair 21PM3–3(27) of relay 27PM3 to code lead 27OJ and thereover through the READ CODE LEAD cable to operate MATCH relay 33STG; relay 33STG, operated, locks to ground on lead 3301 through the make contact of transfer pair 33STG–1(33) and break contacts 6STGK–1(33) and 17DL3–3(33).

Upon completion of the READ codes transmission, the PRIME relays operate, as above described, and ground now applied to code lead 11OJ passes through the make contact of transfer pair 21PM3–3(27) of relay 21PM3 to operate relay 27STGL; relay 27STGL, operated, locks to ground through its own make contact 27STGL–1(27), break contacts 27STGF–1(27) and 14STGR–1(27) and make contact 3ETP1–22(27). Relay 27STGL, operated, closes a path for lighting ST.TMG lamp 3104 "steady" from battery, lamp 3104, resistor 3105, the break contact of transfer pair 27STGF–2(31) of relay 27STGF, make contact 27STGL–2(31) of relay 27STGL, lead 2803, make contact 3WR1–3(31) of relay 3WR1 to ground. The "correct answer" has now been "stored" by operation of MATCH relay 33STG, and the "problem" has been presented to the trainee by lighting lamp 3104.

The correct response by the trainee to lighted lamp 3104 is closure of TS.TMG key 605 whereby to operate relay 6STGK. Assuming that the trainee does so act, and does so within the permissible time limit, a MATCH is attained since when relay 6STGK operates, relay 17DL3 is operated through make contact 6STGK–2(17), following which the hold path of relay 33STG is opened at break contacts 6STGK–1(33) and 17DL3–3(33); relay 33STG opens at its make contact 33STG–2(15) the operate path of relay 15CK which releases and initiates the circuit functions following MATCH as previously described.

In the event the program segment required lamp 3104 to be "flashed" instead of lighted "steady," relay 27STGF would have been operated over code lead 11PJ, and, having operated, would lock to ground through its own make contact 27STGF–3(27), break contacts 27STGL–3(27) of relay 27STGL and 14STGR–1(27) of relay 14STGR and make contact 3ETP1–22(27) of relay 3ETP1. Lamp 3104 will then be lighted "flashing" through the make contact of transfer pair 27STGF–2(31) of relay 27STGF and make contact 3WR1–4(31) of relay 3WR1 to interrupted ground at interrupter 3112.

Either relay 27STGL or relay 27STGF may be released by operating relay 14STGR over code lead 11QJ whereby to interrupt the holding path at break contact 14STGR–1(27).

It is believed the operation of the other lamps shown but not described in detail with regard to their circuits, will be clear from the above detailed description of similar circuits. For example, it will be clear that CW lamp 2807 is lighted by operation of relay 14CW and CCW lamp 2806 by operation of relay 18CCWL. Also that lamps in the group 3106 to 3109 can be flashed at three different rates, or lighted steady, and lamps 3110 and 3111 can be flashed at 120 l.p.m. or lighted steady. For example, it will be clear that CLDO lamp 3106 can be flashed at 60 l.p.m. by operating relay 12CDFA; at 30 l.p.m. by operating relay 12CDFB; at 120 l.p.m. by operating relay 12CDFO; and can be lighted "steady" by operating relay 12CDLO with the other relays released.

It will be understood that the training equipment contemplated by our invention may also be utilized, particularly in the earlier stages of instruction, as a means of issuing complete instructions to the trainee. For example, the magnetic tape might be arranged to "inform" the trainee, "The customer has just deposited a coin through error; you are now required to operate your 'Coin Return' key." The response of the trainee to these direct instructions would then be observed.

It is contemplated, and the novel arrangement permits, that routine maintenance of the equipment will be facilitated by the use of properly programmed test tapes instead of the written type of maintenance information normally used in similar situations.

It is to be understood that the above-described arrangements are illustrative of the principles of the invention. Numerous other arrangements may be devised by those skilled in the art without departing from the spirit and scope of the invention.

What is claimed is:

1. In training equipment for control board attendants, a training position, visual indicators at said position for indicating program problems to a trainee, a first group of relays for controlling said visual indicators, a group of match relays, a program tape perforated to control the origination of problem codes and of response codes, a plurality of code transmission leads, means for connecting said code transmission leads to said match relays, means for transmitting response codes over said leads when so connected whereby to selectively operate match relays in accordance with the particular program segment, means effective upon completion of the transmission of said response codes for connecting said same code transmission leads to said first group of relays, means for transmitting problem codes over said code transmission leads when so connected whereby to selectively activate said visual indicators in accordance with the particular program segment, a plurality of keys at said position for use by a trainee in responding to indicated problems, and a respective responding circuit closed by each of said keys, each of said responding circuits corresponding respectively to one of said match relays, closure of a respective responding circuit being effective to release the corresponding match relay if operated whereby to indicate a correct response by the trainee.

2. In training equipment for control board attendants, a training position, visual indicators at said position for indicating program problems to a trainee, a first group of relays for controlling said visual indicators, a group of match relays, a program tape perforated to control the origination of problem codes and of response codes, a plurality of code transmission leads, means for connecting said code transmission leads to said match relays, means for transmitting response codes over said leads when so connected whereby to selectively operate match relays in accordance with the particular program segment, means effective upon completion of the transmission of said response codes for connecting said code transmission leads to said first group of relays, means for transmitting problem codes over said code transmission leads when so connected whereby to selectively activate said visual indicators in accordance with the particular program segment, a plurality of keys at said position for use by a trainee in responding to indicated problems, a respective responding circuit closed by each of said keys, each of said responding circuits corresponding respectively to one of said match relays, closure of a respective responding circuit being effective to release the corresponding match relay if operated whereby to indicate a correct response by the trainee, additional responding means for the trainee comprising a microphone, and means associated with said responding circuits for detecting sounds picked up by said microphone.

3. In training equipment for control board attendants, the combination defined by claim 2 further characterized in advancing means for said program tape, and means effective upon indication of a correct response by the trainee for activating said advancing means.

4. In training equipment for control board attendants, the combination defined by claim 3 further characterized in means for rendering said advancing means ineffective and additional manually controlled means for advancing said program tape.

5. In training equipment for control board attendants, the combination defined by claim 3 further characterized in means for indicating an incorrect response by the trainee.

6. In training equipment for control board attendants, the combination defined by claim 5 further characterized in a register and means effective upon operation of said last-mentioned indicating means for actuating said register.

7. In training equipment for control board attendants, the combination defined by claim 6 further characterized in a second program tape having voice segments recorded thereon and means for reproducing said voice segments at said training position.

8. In training equipment for control board attendants, the combination defined by claim 7 further characterized in means for timing the interval between completion of transmission of said problem codes and the response by the trainee.

9. In training equipment for control board attendants, the combination defined by claim 8 further characterized in means controlled by said response codes for starting said timing means.

10. In training equipment for control board attendants, the combination defined by claim 9 further characterized in means controlled by one of said program tapes for adjusting said timing means whereby to indicate different predetermined intervals.

11. In training equipment for control board attendants, the combination defined by claim 10 further characterized in a second register and means effective upon failure of the trainee to respond within a respective one of said predetermined intervals to actuate said second register.

12. In training equipment for control board attendants, the combination defined by claim 11 further characterized in that said means for rendering said advancing means ineffective is effective both upon operation of said first-mentioned register and operation of said second register.

13. In training equipment for control board attendants, the combination defined by claim 12 further characterized in that said means for connecting said code transmission leads to said first group of relays includes an additional relay operated by a code transmitted after said response codes and while said code transmission leads are still connected to said match relays.

14. An automatic training equipment for switchboard attendants comprising a training position having visual indicators, keys and an attendant's headset thereat, first program means storing coded problems and coded responses thereto, second program means storing vocal instructions, additional storage means, means for first transferring said responses from said first program means to said additional storage means and for then transferring said problems from said first program means to said indicators, means for transferring said vocal instructions from said second program means to said attendant's headset, means for comparing the response of the trainee with said responses in said additional storage means, means controlled by said comparing means for advancing said first program means on proper key or vocal response within a predetermined time interval, and means controlled by said first program means for varying said time interval during the comparing of the response of the trainee with said responses in said additional storage means.

15. An automatic training equipment in accordance with claim 14 further characterized in that said means for transferring said responses from said first program means to said additional storage means includes means for temporarily storing a first portion of each coded response, combining it with a second portion of the same coded response, and subsequently transmitting the combined portions.

16. An automatic training equipment for switchboard attendants comprising a training position having visual indiactors thereat, an attendant's telephone circuit at said position, a first program means storing coded responses and coded problems to be presented to the position, second program means storing vocal instructions to be presented to said position, code leads connected to said first and said second program means, additional storage means, transfer means for initially connecting said code leads to said additional means to store said responses thereat and for then reconnecting said same code leads whereby to selectively energize said indicators for presenting said problems to said training position, means for comparing responses from said training position with said responses stored in said additional storage means, means for stopping said first program means on presentation of a problem to said training position, means for subsequently advancing said first program means, a first relay operating upon improper operation of said comparing means, a second relay operating upon a failure of said comparing means to operate within a predetermined interval after presentation of a problem to said position, a third relay operating upon an alarm condition in said equipment, a fourth relay operating upon disconnection of said attendant's telephone circuit from said position, and means effective upon operation of any one of said relays for rendering said advancing means ineffective.

17. An automatic training equipment for switchboard attendants comprising a training position, visual indicators and an attendant's telephone circuit at said position, a first program record storing coded problems and coded responses, a second program record storing vocal announcements, each of said program records comprising a plurality of discrete segments and an initial start portion, said segments being grouped to simulate complete calls, additional storage means, a first advancing means for said first program record and a second advancing means for said second program record, means for first activating both of said advancing means whereby to synchronize both of said program records with respect to the respective initial start portions, means for then activating said first advancing means whereby to advance said first program record through successive segments in turn, means effective during the advance of said first record for first transferring said responses therefrom to said additional storage means and for then transferring said problems therefrom to said visual indicators, means controlled by said first record during the advance thereof for activating said second advancing means whereby to intermittently advance said second program record, and means effective during the advance of said second program record for transferring said vocal announcements therefrom to said attendant's telephone circuit.

18. An automatic training equipment in accordance with claim 17 further comprising means for comparing the response of the trainee with said responses in said additional storage means, and means for interrupting the advance of said first program record at the end of each respective segment and for resuming the advance upon proper response by the attendant.

19. An automatic training equipment in accordance with claim 18 further comprising means effective upon an incorrect response by the attendant for inactivating both said first and said second advancing means.

20. An automatic training equipment in accordance with claim 19 further comprising additional means effective upon an incorrect response by the attendant for bypassing the remaining segments of the respective groups and advancing both program records to the next respective group of segments.

21. Training equipment for switchboard attendants comprising a training position, visual indicators at said position, control means for said indicators, storage means, control means for said storage means, program means containing groups of answer codes and groups of problem codes, a plurality of code transmission leads, means for connecting said code leads to said second-mentioned control means for transmission of said answer codes for control of said storage means, means effective upon completion of the transmission of said answer codes for connecting said code leads to said first-mentioned control means for transmission of said problem codes for control of said visual indicators, trainee responding means including a microphone at said position, and means for comparing the trainee's response with information stored in said storage means, said last-mentioned means including a voice detector for detecting voice picked up by said microphone.

22. Training equipment for switchboard attendants comprising a training position, visual indicators at said position, control means for said indicators, storage means, control means for said storage means, program means containing groups of answer codes and groups of problem codes, a plurality of code transmission leads, means for connecting said code leads to said second-mentioned control means for transmission of said answer codes for control of said storage means, means effective upon completion of the transmission of said answer codes for connecting said same code leads to said first-mentioned control means for transmission of said problem codes for control of said visual indicators, trainee responding means at said position, means for comparing the trainee's response with information stored in said storage means, first registering means, means effective upon failure of a match between the trainee's response and information stored in said storage means for actuating said first registering means, second registering means, means for timing the interval between the completion of transmission of said problem codes and the trainee's response, means effective upon said interval exceeding a predetermined limit for actuating said second registering means, and means controlled by one of said codes during transmission thereof for varying said timing means whereby to indicate different time intervals.

23. An automatic training equipment for switchboard attendants comprising a training position having visual indicators thereat, a first program means storing coded responses and coded problems to be presented to the position, second program means storing vocal instructions to be presented to the position, additional storage means, code leads connected to said first programs means, transfer means for initially connecting said code leads to said additional storage means to store said responses thereat and for then reconnecting said same code leads whereby to selectively energize said indicators for presenting said problems to said training position, means for comparing responses from said training position with said responses stored in said additional storage means, means for stopping said first program means on presentation of said problems to said training position and for subsequently advancing said first program means on proper operation of said comparing means, means for disconnecting said second program means from said training position and for connecting a supervisor's headset thereto, means for preventing operation of said means for advancing said first program means on proper operation of said comparing means, and manual means for advancing said first program means.

References Cited by the Examiner

UNITED STATES PATENTS

| | | | |
|---|---|---|---|
| 1,929,872 | 10/1933 | Lavery et al. | 35—9 X |
| 3,114,210 | 12/1963 | Uttal | 35—6 |
| 3,121,959 | 2/1964 | Uttal | 35—9 |
| 3,121,960 | 2/1964 | Uttal et al. | 35—9 |

JEROME SCHNALL, *Primary Examiner.*

EUGENE R. CAPOZIO, *Examiner.*

HARLAND SKOGQUIST, *Assistant Examiner.*